US005812994A

United States Patent [19]
Imlah

[11] Patent Number: 5,812,994
[45] Date of Patent: Sep. 22, 1998

[54] APPARATUS AND METHOD FOR DATA PROCESSING AND/OR FOR CONTROL

[75] Inventor: William George Imlah, Guildford, United Kingdom

[73] Assignee: Canon Kabushiki Kaisha, Tokyo, Japan

[21] Appl. No.: 246,702

[22] Filed: May 20, 1994

[30] Foreign Application Priority Data

May 20, 1993 [GB] United Kingdom .................... 9310410

[51] Int. Cl.$^6$ .................................................. G06F 15/18
[52] U.S. Cl. ............................................................ 706/45
[58] Field of Search .......................... 395/50, 54; 706/45, 706/50

[56] References Cited

U.S. PATENT DOCUMENTS

| 5,018,075 | 5/1991 | Ryan et al. ................................ 395/51 |
| 5,712,960 | 1/1998 | Chiopris et al. ........................... 395/77 |

OTHER PUBLICATIONS

Thirunarayan, Abduction in annoted logic programming, IEEE Intl conference on system, man and cybernatics, pp. 682–687, Oct. 21, 1992.

Bhatnagar et al., Structural and probabilistic knowledge for abductive reasoning, IEEE transactions on pattern analysis and machine intelligence. pp. 233–245, Mar. 1993.

Fischer et al., Extending the indexing vocabulary of case based reasoning with task specific features, Proceedings of the eighth conference on AI for applications, pp. 226–232, Mar. 6, 1992.

Marquis, Mechanizing skeptical abduction and its applications to AI, Third Intl. conference on tools for AI, Nov. 13, 1991.

Kean, Revision in ACMS, Journal of Experimental And theoretical artificial intelligence, pp. 233–246, Sep. 1992.

Stickel, A prolog like inference system for computing minimum cost abductive explanations in natural language interpretation, pp. 89–105, Jun. 1991.

Garvey et al., Abductive and approximate reasoning models for characterizing inference channels, The computer security foundations workshop IV, pp. 118–126, Jun. 20, 1991.

Bhatnagar et al., Abduction of precise situation models, Proceedings second Intl symposium on uncertainty modelling and analysis. pp. 73–78, Apr. 28, 1993.

Kean: "Revision in ACMS", Journal of Experimental and Theoretical Artificial Intelligence, vol. 4, No. 3, pp. 223–246 (Jul.–Sep. 1992).

(List continued on next page.)

Primary Examiner—Allen R. MacDonald
Assistant Examiner—Sanjiv Shah
Attorney, Agent, or Firm—Fitzpatrick, Cella, Harper & Scinto

[57] ABSTRACT

A computer implemented abductive reasoner checks for contradictions in the reasoning operations during processing and determines subsequent processing dependent upon the results of the checking. Constraints on variables may be imposed to permit proofs to be pursued which otherwise would involve contradictions. Different types of abductive reasoning step may be assigned different costs and proofs or future processing steps selected dependent upon the costing. Alternatively or in addition, reasoning operations and the resulting proofs, if any, may be grouped according to the types of reasoning steps involved and provision may be included for pursuing operations involving less costly reasoning steps in preference or prior to operations which may be more costly. Where successive goals are to be proved, the proof of each successive goal may be performed by reference to hypotheses established in proofs of previous goals. In applications involving the production of control signals, commands defining required control signals may be provided in the form of premises in rules contained in a knowledge base with which the abducer operates and means may be provided for outputting said commands and converting them to the required control signals.

67 Claims, 28 Drawing Sheets

OTHER PUBLICATIONS

Stickel: "A Prolog–Like Inference System for Computing Minimum–Cost Abductive Explanations In Natural–Language Interpretation", Annals of Mathematics and Artificial Intelligence, vol. 4, No. 1–2, pp. 89–106 (Jun. 1991).

Nonfjall et al.: "Detection of Potential Inconsistencies in Knowledge Bases", International Journal of Intelligent Systems, vol. 7, pp. 81–86, (Feb. 1992).

Medhi et al.: "Testing for Inconsistencies in Rule–Based Knowledge Bases", Expertsys–90, pp. 281–286 (Oct. 1990).

Integrity Recovery via Updates for Interactive Knowledge Base Applications A. Guessoum, J.P. Gallagher, University of Bristol, Computer Science Dept. Mar. 1992.

"Abductive Logic Programming", Oct. 1991, revised Jan. 1992 by Kakas et al. (pp. 38–41).

DF: DISABLE FACTS

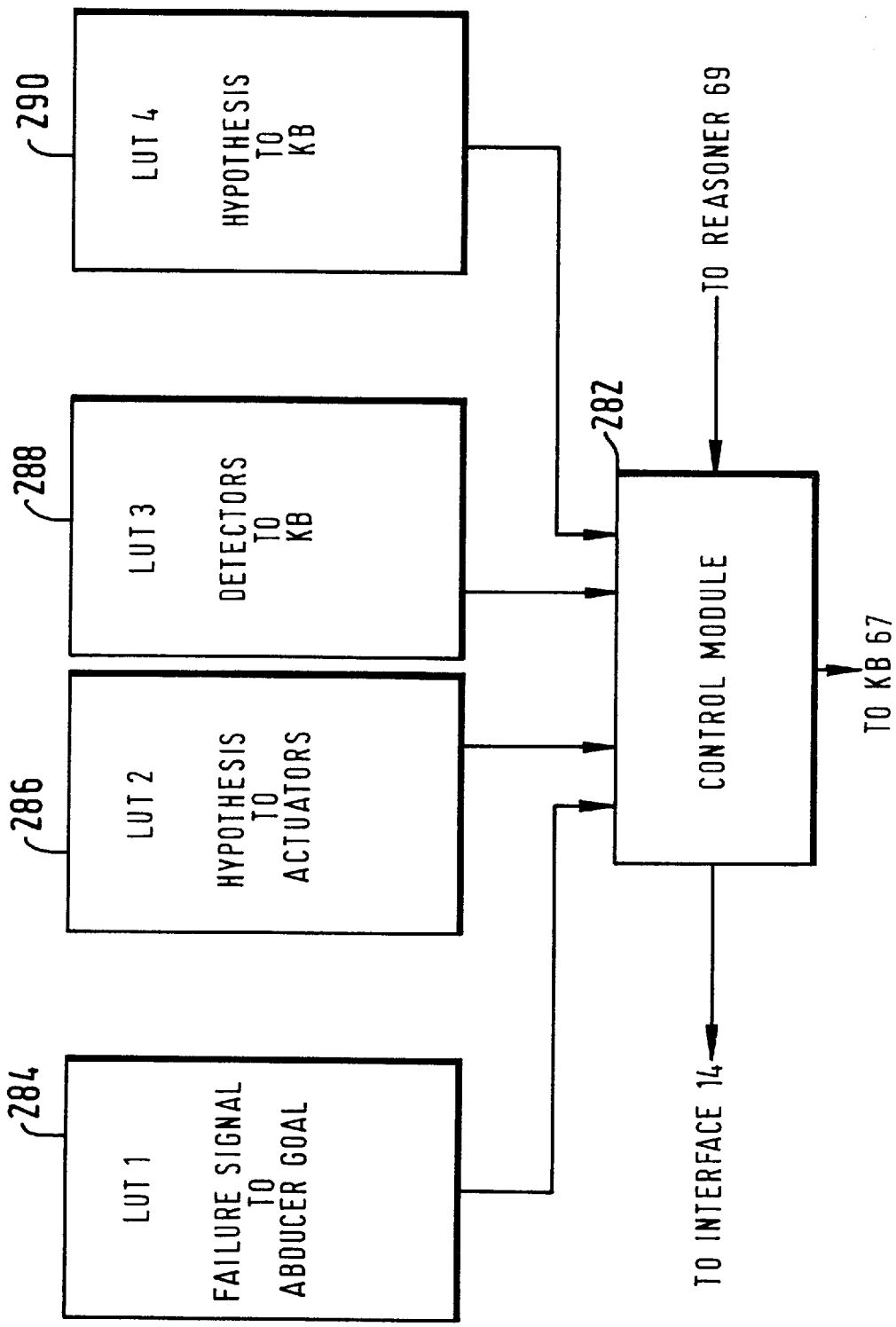

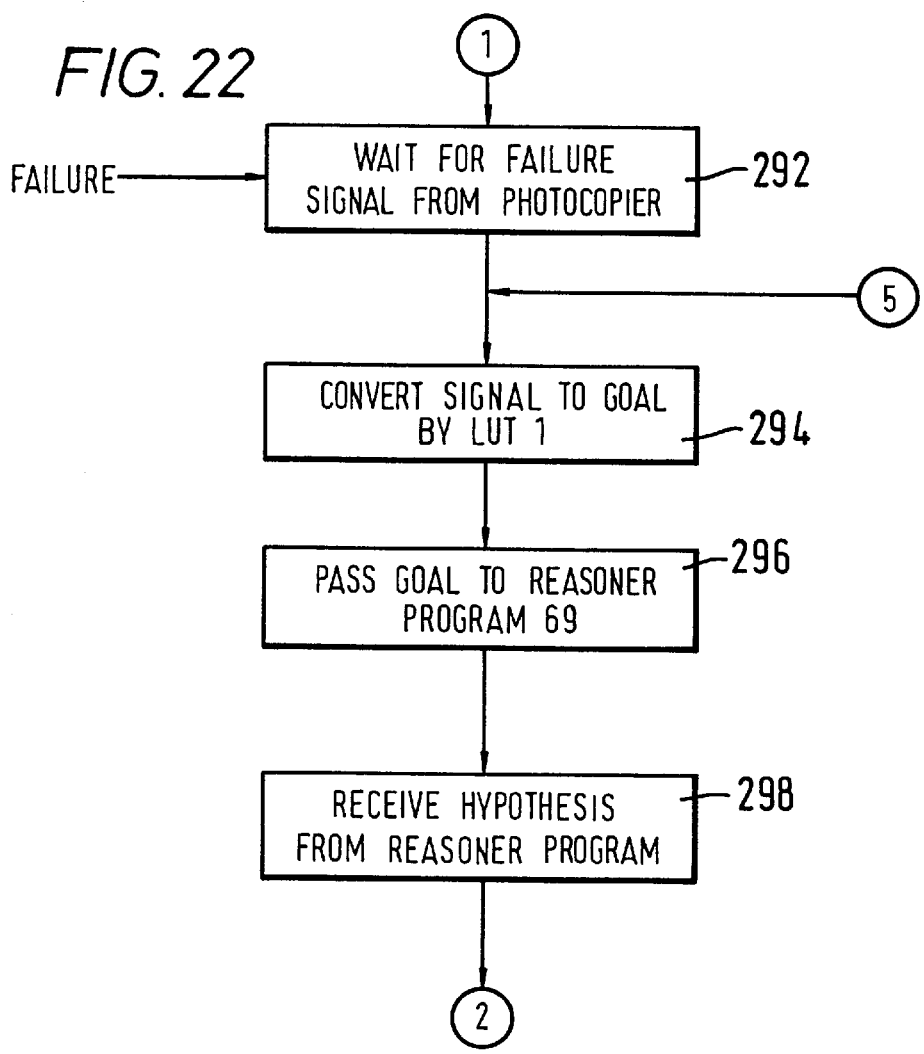
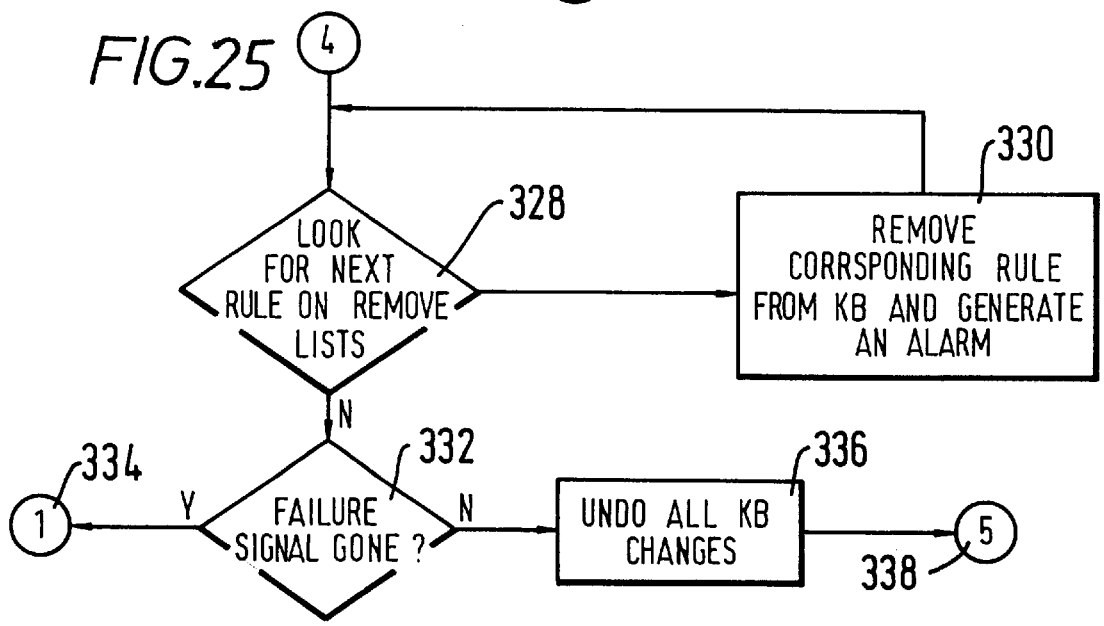

APPARATUS AND METHOD FOR DATA PROCESSING AND/OR FOR CONTROL

This invention relates to apparatus and method for data processing and/or for producing control signals, for example for controlling a further process or system or for controlling a display or other output device for providing information about the further process or system. The invention may be used in a wide range of applications.

Methods and apparatus for generating signals for Information which may be used for control purposes have long been known. An example of a very simple form of control is the thermostatic control of a heating system in which a temperature sensor provides a signal indicating the value of the temperature to be controlled and a signal to switch a heater on or off is generated so as to maintain the temperature within required limits. A wide variety of other simple control systems are known in the prior art in a wide variety of applications including the control of machinery and industrial processes where the value of a variable is sensed and a control signal generated, for example, to enable the variable to be maintained within desired limits. The control signals may be generated as part of a feedback arrangement so that the variable may be automatically maintained within the desired limits or may be used for providing a display or other output, such as a printed output or a warning signal, the information from which is used by an operator for monitoring or control purposes.

As technology progressed, more complex control systems of hard-wired digital form were developed. Such digital control systems would comprise a logic circuit consisting of numerous logic gates for providing various logical functions, such as AND functions, OR functions, NAND functions, NOR functions or exclusive OR functions, and various registers for storing signals to be applied to and processed by the various logic gates. The logic circuit implements a set of logical operations in accordance with logical rules which would be determined by an engineer familiar with the system to be controlled and which specify the output signals to be produced in response to different input signals or combinations thereof. Thus, for example, if a particular output signal is represented as x and if a to d represent certain input signals, a logic circuit might be designed to produce the output signal x if input signals a, b and c but not d are present. A rule expressing such logical operation could therefore be expressed as follows:

x if a and b and c and not d.

The circuit for implementing such a rule could be a four-input AND-gate, there being one input for each of the signals a to d and the input for signal d being provided with a negator.

Thus, input signals indicative of various parameters in the system being controlled would be applied to the logic circuit which would then produce appropriate output signals which, for example, may be used for control purposes or for indicating to an operator the status of various aspects of the system.

Although each logical operation performed by such prior art digital control circuits is relatively simple, complex control systems require a large number of such logical operations and thus hard wired digital logic circuits for implementing complex control operations become highly complex and expensive.

Modern control systems avoid the need for complex wiring of extensive circuitry by employing digital computers since these are capable of implementing large numbers of logical operations utilising electrical signals which are stored in the computer memory and (like the hard-wired circuitry discussed above) define logical rules determined by an engineer familiar with the system to be controlled. Input signals indicative of various parameters in the system being controlled are supplied to the computer, in a form suitable for reception by the computer, and the computer stores and processes these input signals in accordance with the logical rules defined therein, to produce appropriate output signals. Such processing may be termed "reasoning" and the portion of the computer memory storing the signals defining the logical rules may be termed a "knowledge base" and usually also stores further signals representing parameters of the system being controlled. Such parameters may be termed "facts".

Computer implemented reasoning systems are known in which the input signal is in a form known as a "goal" and the system performs the required logical operations by trying to prove or disprove the goal against the knowledge base which, as indicated, normally comprises a set of rules and facts specific to the application with which the reasoning system is concerned.

One form of computer implemented reasoning system utilises deductive reasoning operations. However, such a system may be incapable of producing useful results if, at any given time during its operation, its knowledge base is incomplete.

Another form of reasoning which has been proposed for computer implementation, which may avoid the problems of deductive reasoning, is abduction. Prior proposed abductive reasoners attempt to prove an input goal deductively against the facts and/or rules in the knowledge base and, if the system fails to find a proof, a hypothesis is established and the knowledge base is updated taking the hypothesis into account. The system then attempts to prove the goal deductively against the updated knowledge base and in this way an output may be obtained on the basis of the knowledge base updated with the hypothesis. This would thus overcome the problem, at least to a degree, of deductive reasoners that a solution or proof cannot be obtained where the knowledge base is incomplete or where contradictions arise in the reasoning.

One problem with prior proposals for computer implemented abducers is that they operate relatively slowly. An object of one form of the present invention is to alleviate this problem.

In one aspect, the invention provides an abducer having means for identifying in the reasoning process that the procedure which it is following will not produce a solution.

In another aspect, the invention provides an abducer which is provided with means for checking for contradictions in the reasoning process and for discontinuing or modifying the process when a contradiction is found.

By virtue of the above means in accordance with the invention, wasted time pursuing reasoning processes which cannot give a solution may be reduced or avoided thus resulting in speeding-up of the overall reasoning process.

The invention has a number of aspects, as will be apparent from the following descriptions and is not limited to the above identified preferred means.

Although, as will be appreciated from the above discussion, the invention can be employed in a wide variety of complex systems, it will be described further by way of an example in a relatively simple embodiment as a diagnostic and control system for a photocopier, for ease of understanding. In the accompanying drawings:

FIG. 21 is a block diagram representing in generalised form another of the programs of FIG. 3;

FIGS. 22 to 25 are flow-charts illustrating the operation of the program shown in FIG. 22.

OVERVIEW

Figure 1:
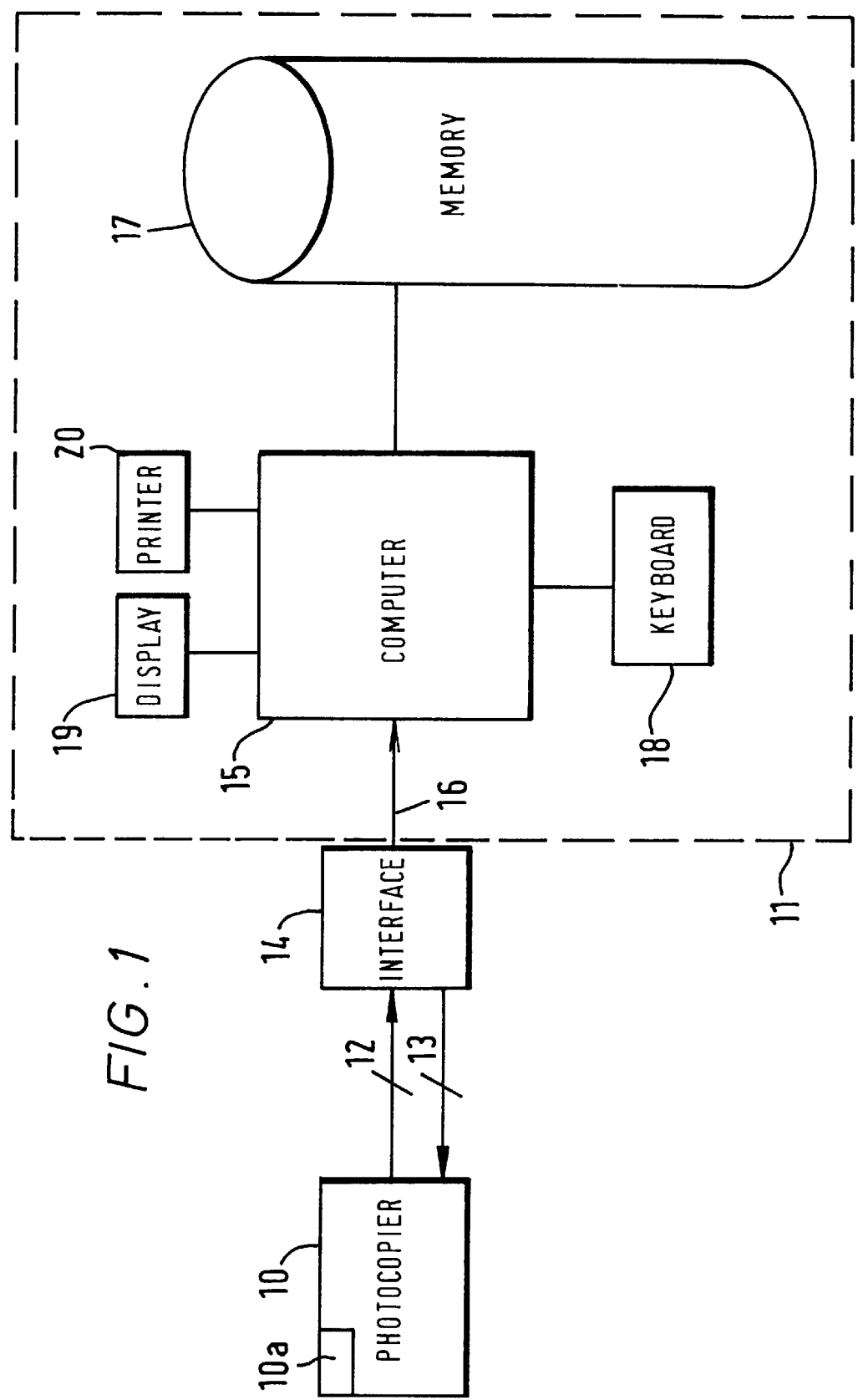
FIG. 1 is a block diagram in simple form illustrating a photocopier provided with a diagnostic and control system in accordance with an embodiment of the invention.

With reference to FIG. 1, a photocopier 10 is connected to a diagnostic and control system 11 via lines 12 and 13, an interface 14 and a communication link 16. The diagnostic and control system 11 comprises an electronic computer 15, memory 17 which may in practice comprise, for example, RAM, ROM and/or magnetic or optical disks or any other form of data storage medium or memory, a keyboard 18 for inputting data and instructions to the computer 15 in a conventional manner, and a display device 19 and printer 20 for outputting information for an operator of the diagnostic and control system 11.

The computer 15 may receive signals from the photocopier 10 and the memory 17 stores programs and data for performing diagnostic operations in dependence upon the signals and for sending to the photocopier 10 control signals dependent upon the results of the diagnostic operation. The control signals may be utilised by the photocopier 10 for rectifying faults to which the diagnostic and control system 11 has been alerted by the signals transmitted thereto or may be used for activating a display 10*a* provided on the photocopier for instructing the copier operator as to the action which should be taken with a view to rectifying the fault.

The diagnostic and control system 11 may be an integral part of the copier 10 or, alternatively, may be separate therefrom and may be remotely located. The link 16 may therefore, for example, be a telephone line or a radio or other form of communication link.

The interface 14 thus converts signals received from the photocopier to a form suitable for supply to the diagnostic and control system 11 and converts signals received from the diagnostic and control system 11 to a form suitable for supply to the computer. Since such interface forms no part of the present invention, further description is unnecessary.

PHOTOCOPIER

Figure 2:
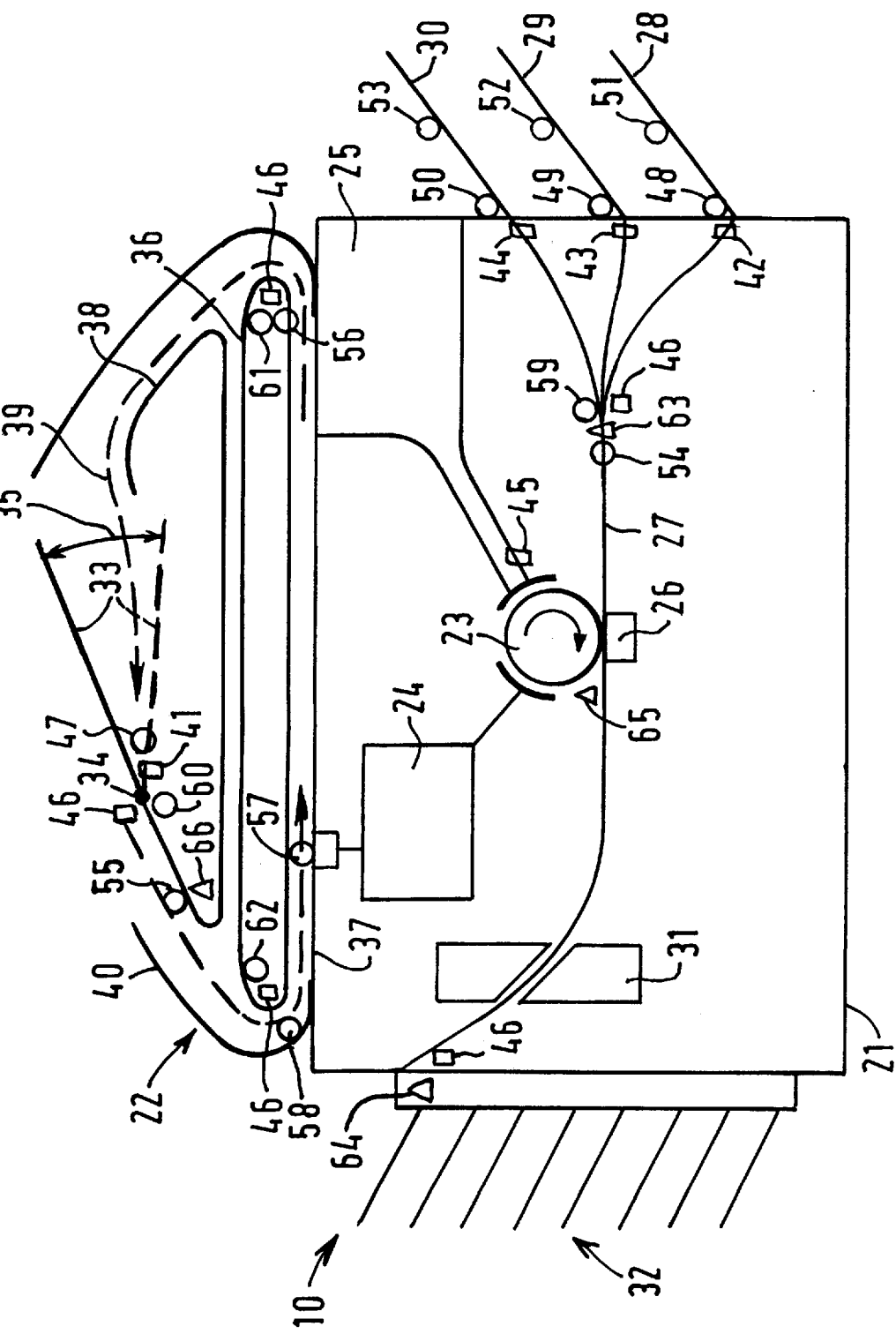
FIG. 2 is a diagram of the photocopier included in the system of FIG. 1 and showing various elements of the photocopier and the position of various detectors, signals from which are utilised by the diagnostic and control system.

As shown diagrammatically in FIG. 2, the photocopier 10 comprises a housing 21 on top of which an original feeder 22 is provided, a photosensitive drum 23, an image projection system 24 for projecting an image of original documents from the feeder 22 to the drum 23, a developer apparatus 25 for developing the images and an image transfer apparatus 26 for transferring developed images from the drum 23 to copying paper transported along a paper path 27. Three paper trays 28, 29 and 30 are provided for supplying paper to the path 27. Trays 28 and 30 are for supplying A4 paper and tray 29 is for supplying A3 paper. These trays will be referred to in subsequent discussion of the diagnostic and control operations which are performed by computer 15 as paper tray (A4, 1), paper tray A4, 2) and paper tray (A3, 1) respectively. Paper path 27, which is defined by a variety of feeder rollers and guides which are not shown but are conventional, receives paper from the trays 28, 29 and 30 for transport through the transfer unit 26 and through an image fixing unit 31 to a collator 32.

The document feeder 22 comprises a document receiving tray 33 which can be pivoted about a horizontal axis 34 between the broken and full line positions shown in the drawing and as indicated by arrow 35, a belt conveyor 36 for transporting originals from the tray 33 across a platen 37 so that they may be imaged by the imaging apparatus 24 and a guide 38 for guiding originals back to the tray 33, when pivoted down to its broken line position, as indicated by the arrow 39. A guide 40 is provided for guiding originals from the tray 33 to the platen 37 when the conveyor 36 is operated.

The photocopier 10 is provided with a conventional internal control system (not shown) which, during normal operation of the machine, energizes and de-energizes a number of actuators with which the machine is provided, so that required photocopying operations are performed. In the event of a failure in the copying operation, however, the internal control system can be overridden by signals supplied to these actuators by the computer 15 for the purpose of attempting to rectify the cause of the failure. In a practical machine, there may be a large number of such actuators but for the purpose of exemplifying the operation of the present invention, it is only necessary to refer to a relatively small number of them. Thus, in FIG. 2, reference number 41 indicates an actuator for pivoting the document receiving tray 33, reference numbers 42, 43 and 44 indicate respective actuators for putting the paper trays 28, 29 and 30 respectively into an operative condition ie. for selecting the required one of the paper trays, reference number 45 indicates an actuator for energizing the developing apparatus 25, and reference numbers 46 indicate, firstly, actuators for energizing the belt conveyor 36 and various associated feed rollers (not shown) for feeding originals to be copied and, secondly, actuators for energizing various feed rollers (not shown) for conveying copying paper from the trays 28 to 30 along the path 27 to the collator 32.

The copier is also provided with a number of detectors for providing signals indicative of the operative condition of various elements thereof. Again, in a practical apparatus, there may be a large number of such detectors but for the purpose of exemplifying the operation of the present invention it is only necessary to refer to a relatively small number of such detectors. Thus, in FIG. 2, reference number 47 indicates a detector for sensing the position of the pivotable tray 33, reference numbers 48, 49 and 50 indicate detectors for sensing respectively whether the paper trays 28, 29 and 30 are engaged, and reference numbers 51, 52 and 53 sense whether the paper trays 28, 29 and 30 are empty. In addition to the foregoing detectors, five paper detectors are provided to indicate whether or not paper is present in five different areas of the machine herein referred to as area 1, area 2, area 3, area 4 and area 5. Such detectors are indicated in FIG. 2 by reference numbers 54, 55, 56, 57 and 58 respectively. Further detectors, indicated in FIG. 2 by reference numbers 59, 60, 61 and 62 are provided for detecting whether the drivers for the paper feeder rollers in areas 1 to 4 respectively are engaged.

In addition to the above mentioned detectors, the machine is provided with four further detectors for providing signals indicating that a particular copying operation has failed. The first of these detectors, which is indicated by reference number 63 in FIG. 2, detects whether or not copying paper has passed that detector. Detector 63 thus detects failure of the supply of paper from the paper trays to the path 27. Such failure will be referred to herein as failure (1). The second failure detector, indicated by reference number 64 in FIG. 2, is positioned at the end of the copy path 27 to detect the failure of a copy to be discharged from the path 27 to the collator 32. Such failure will be referred to herein as failure (2). The third of these detectors, indicated by reference number 65, is a device for detecting whether an image has been formed on the copying paper passing along path 27 and is thus downstream of the transfer apparatus 26. Detector 65 may comprise, for example, an opto-electronic device for sensing light reflected from the copy paper and determining whether there is contrast therein. Failure to form an image on the copy paper will be referred to herein as failure (3). The fourth of these detectors is indicated by reference number 66 in FIG. 2 and this detector detects whether an original has been supplied from the tray 33 to the conveyor 36. Failure of such supply will be referred to herein as failure (4).

It will be recognised from the above description that any of failures (1) to (4) can arise from a number of different causes. For example, failure (1) could arise either because the selected paper tray is empty or because the paper tray which was required has not been properly engaged or because of a combination of those two conditions. Failure (2) can arise as a consequence of failure (1) or as a consequence of failure to engage the drivers for the feeder rollers for supplying the paper along the path 27. Failure (3) could arise because an original has not been fed across the platen 27 or because the developing apparatus 24 was not actuated. Failure (4) could arise because of failure to operate the original feeder 22 and because originals have not been fed correctly.

GENERAL FUNCTION OF DIAGNOSTIC AND CONTROL SYSTEM

It will be appreciated from the foregoing description that the signals from the detectors 63 to 66 represent information of a kind different from that represented by signals from the detectors 47 to 62. In particular, signals from the detectors 47 to 62 represent conditions of specific parts of the apparatus. On the other hand, the signals from detectors 63 to 66 indicate a failure of a copying operation without indicating the conditions which have given rise to that failure. The function of the diagnostic and control system 11 is to perform, in response to receipt of a failure signal from any of the detectors 63 to 66 and utilising knowledge of the conditions of specific parts of the photocopier derived from signals from the detectors 47 to 62, a reasoning operation in order to derive an instruction which can be transmitted to the copier 10 to change specific conditions therein to try to rectify the cause of the failure or to display on display 10*a* an indication to the operator of the likely conditions causing the failure. If it were possible to guarantee that all relevant specific conditions within the copier were at all times known correctly, simple logic operations could be utilised to produce the required control signal to rectify or display the condition causing the failure. However, in complex machines, the true conditions in all parts of the machine may not be known at the time of failure. This may be due, for example, to failure of a detector or due to the fact that at any given instant a change in a particular specific condition might not have been recorded even though the corresponding detector is operating correctly. The latter is particularly true in the case of a diagnostic system which may be remote from the apparatus which it is controlling, for example being connected thereto by a radio or telephone link. Thus, simple logic operations are not adequate in all situations and, in the present invention, abductive reasoning operations are performed instead by the system 11 as will be described hereinafter.

DERIVATION OF RULES

For the generation of control signals for the rectification of failures (1) to (4) by a reasoning process, it is necessary to establish a number of rules defining the conditions in the copier which should give rise to recovery from these different types of failure. Each rule comprises a conclusion and one or more premises which, if true, imply that the conclusion is also true. These rules are developed in practice by an engineer knowledgable about the copier in question. Thus, in the present embodiment and by way of example, such engineer would recognise that failure (1) would occur if a particular paper tray is selected but empty and that recovery could be achieved if an alternative suitable paper tray is engaged, not empty and a signal for selecting the alternative tray is sent to the copier. Thus, for example, if A4 paper tray 30 is selected but empty, recovery from failure (1) could be achieved if A4 paper tray 28 is engaged and is not empty and a signal is sent to select tray 28. A rule for defining the conditions necessary for recovery from failure (1) may therefore be expressed as follows:

failure-recovery (1) if
    detecting (selected-tray (x, m)) and
    detecting (tray-empty (x, m)) and
    detecting (tray-engaged (x, n)) and
    not detecting (tray-empty (x, n)) and
    signalling (select-tray (x, n)).

In the above rule, the statement on the left-hand side ie. preceding the word "if" is the conclusion and the five statements on the right-hand side are the premises. x, m and n are variables. x indicates the size of the paper tray (A3 or A4) and m and n are for indicating which of the paper trays is being referred to when there is more than one for the same size of paper. Thus, if A4 paper tray 28 is designated as A4 paper tray 1 and A4 paper tray 30 designated as A4 paper tray 2, the conditions necessary for recovery from failure (1) utilising the above rule can be expressed as follows:

failure-recovery (1) if
    detecting (selected-tray (A4, 1)) and
    detecting ( tray-empty (A4, 1)) and
    detecting (tray-engaged (A4, 2)) and
    not detecting (tray-empty (A4, 2)) and
    signalling (select-tray (A4, 2)).

In practice, the engineer will derive, where possible and necessary, a number of rules for defining conditions which, if satisfied, may provide for recovery from the particular failure in question.

The engineer similarly will derive a rule or rules defining the conditions for recovery from each of failures (2), (3) and (4) and, in a practical system where there are more possibilities for detecting failure, the engineer will derive appropriate rules defining the conditions for recovery from each.

The rules as referred to above for defining the conditions for failure recovery from the different failures (1) to (4) may be regarded as main rules. In addition to the main rules, the engineer may derive a number of sub-rules defining those specific conditions of different parts of the photocopier which are dependent on other specific conditions therein such as a rule stating that paper is present in area 1 if it is not present in area 4. Whilst it will be recognised immediately that this is not a logical statement true under all conditions, it does specify a condition which will arise at a certain time if the machine is operating correctly. Thus, a set of sub-rules will be derived specifying conditions at specific parts of the photocopier 10 which will be true at some time during the operation of the photocorrectly if it is operating correctly.

EXAMPLE OF RULES

For the purpose of exemplifying the operation of the invention, it will be assumed that the engineer setting up the copier 10 and diagnostic and control system 11 under discussion has derived the rules as set out in the following Table 1:

TABLE 1
Main Rules
Rule 1
  failure-recovery (1) if
    detecting (selected-tray (x, m)) and
    detecting (tray-empty (x, m)) and
    detecting (tray-engaged (x, n)) and
    not detecting (tray-empty (x, n)) and
    signalling (select-tray (x, n)).
Rule 2
  failure-recovery (2) if
    not ((detecting (paper-present (ix)) and
    detecting (driver-engaged (x)))) and
    signalling (engage (drivers)).
Rule 3
  failure-recovery (3) if
    developing-apparatus (off) and
    document-receiving-tray (up) and
    signalling (document-receiving-tray (down)).
Rule 4
  failure-recovery (3) if
    document-receiving-tray (up) and
    developing-apparatus (off) and
    signalling (developing-apparatus (on)).
Rule 5
  failure-recovery (4) if
    not document-receiving-tray (up) and
    not signalling (engage (drivers)).
Rule 6
  failure-recovery (4) if
    not detecting (driver-engaged (area 2)) and
    not detecting (driver-engaged (area 3)) and
    signalling (engage (drivers)).
Sub Rules
Rule 7
  detecting (paper-present, area 1) if
    not detecting (paper-present (area 4)).
Rule 8
  developing-apparatus (off) if
    detecting (driver-engaged (area 4)).
Rule 9
  developing-apparatus (off) if
    detecting (driver-engaged (area 1)).
Rule 10
  document-receiving-tray (up) if
    not detecting (driver-engaged (area 4)).

It will be noted that each of the main rules, namely rules 1 to 6, refers to "signalling". Such signalling refers to the transmission to the copier 10 by the system 11 of control signals for energizing the above referred to actuators 41 to 46. Table 2 below relates the references to signalling in the above rules 1 to 6 to the actuators 41 to 46:

TABLE 2

(1) signalling (document-receiving-tray (up/down))—actuator 41.
(2) signalling (developing-apparatus (on/off))—actuator 45.
(3) signalling (engage (drivers))—actuator 46.
(4) signalling (select-tray (A4, 1))—actuator 42.
(5) signalling (select-tray (A4, 2))—actuator 43.
(6) signalling (select-tray (A3, 1))—actuator 44.

It should be understood that the rules set out in Table 1 are highly simplified to facilitate understanding of the invention and that in practice a much more comprehensive and complex set of rules would be derived. The manner in which said such rules may be derived is well-known and need not be described further. When setting up the diagnostic and control system 11, the rules which are derived for the specific application (ie. the rules of Table 1 in the present exemplification of the illustrated embodiment of the invention) are stored in memory 17. These may be input via keyboard 18.

FACTS

For reasoning operations to be performed utilising rules as discussed above, it is also necessary for the diagnostic and control system 11 to contain facts indicative of the conditions within the copier 10. Such facts are also stored in memory 17 and relate to the conditions of specific parts of the apparatus and in particular (in the present example) the conditions of the actuators 42 to 45 and the conditions sensed by detectors 47 to 62. An initial set of facts may be inserted into memory 17 by the engineer setting the machine up, which facts would represent specific conditions which had been verified by the engineer, such as that each of the three paper trays has been engaged and is not empty. As will become apparent from the following description, the facts stored in memory 17 do not remain constant but will change dependent upon signals transmitted to the diagnostic and control system 17 from the photocopier 2. Because of this it is not actually essential that an initial set of facts should be inserted in memory 17 by the engineer setting the system up since the operation of the diagnostic and control system 11 is such that, as it and the copier 10 operate, a set of facts will automatically be built up, stored and modified as the system operates. Table 3 below lists all of the facts which can be stored in the memory 17 in the example under discussion and relates them to the detectors where applicable.

TABLE 3

Fact 1
detecting (tray-engaged (A4, 1))—detector 48.
Fact 2
detecting (tray-engaged (A4, 2))—detector 50.

Fact 3
  detecting (tray-engaged (A3, 1))—detector 49.
Fact 4
  detecting (tray-empty (A4, 1))—detector 51.
Fact 5
  detecting (tray-empty (A4, 2))—detector 53.
Fact 6
  detecting (tray-empty (A3, 1))—detector 52.
Fact 7
  detecting (paper-present (area 1))—detector 54.
Fact 8
  detecting (paper-present (area 2))—detector 55.
Fact 9
  detecting (paper-present (area 3))—detector 56.
Fact 10
  detecting (paper-present (area 4))—detector 57.
Fact 11
  detecting (paper-present (area 5)—detector 58.
Fact 12
  detecting (driver-engaged (area 1))—detector 59.
Fact 13
  detecting (driver-engaged (area 2))—detector 60.
Fact 14
  detecting (driver-engaged (area 3))—detector 61.
Fact 15
  detecting (driver-engaged (area 4))—detector 62.
Fact 16
  detecting (document-receiving-tray (up/down))—detector 47.
Fact 17
  detecting (developing-apparatus (on/off)).
Fact 18
  detecting (selected-tray (A4, 1)).
Fact 19
  detecting (selected-tray (A4, 2)).
Fact 20
  detecting (selected-tray (A3, 1)).

At different times during the operation of the copier, different combinations of the above facts will be stored in memory 17 dependent upon the condition of the photocopier. In addition, all the facts contained in Table 3 above and the "signalling" outputs contained in Table 2 above are stored in memory 17 in a list called "abduceables", which defines the only facts which may hypothesised. The use of this list will be explained later.

CONTENTS OF MEMORY 17

Figure 3:
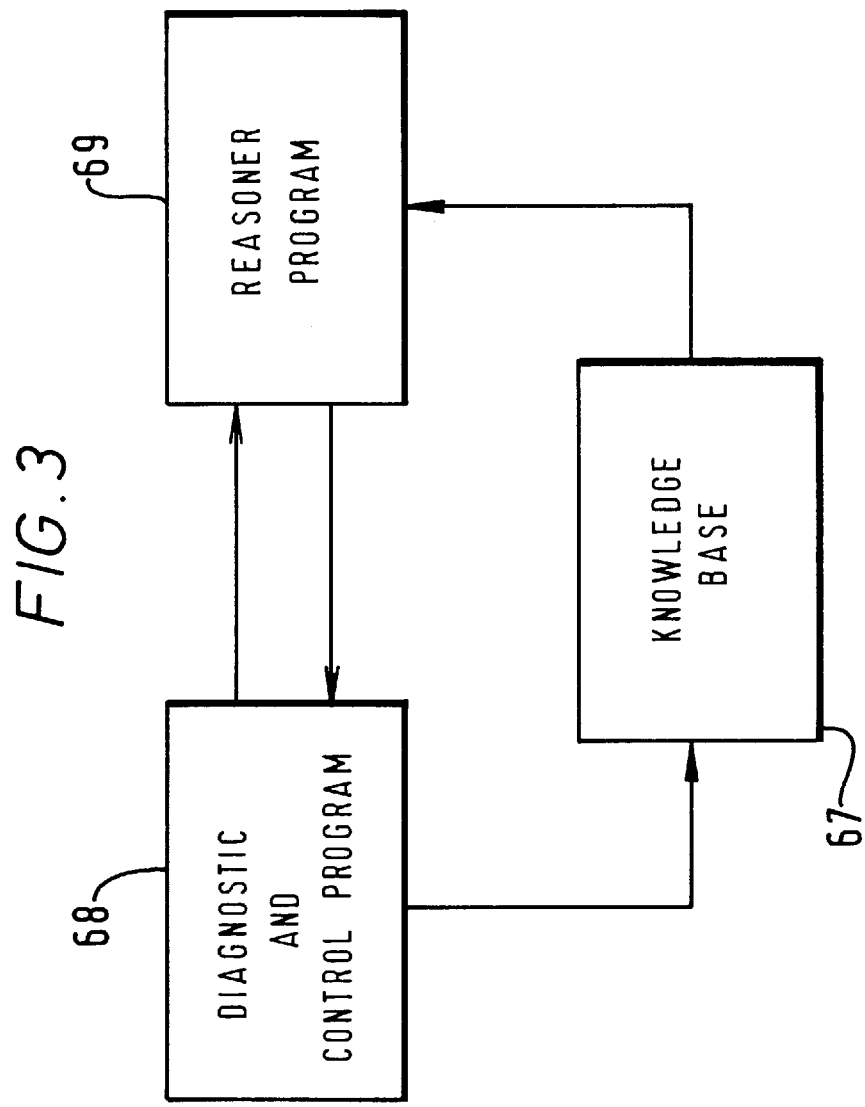
FIG. 3 is a block diagram representing in generalised form programs, including a reasoner program, and data stored in the diagnostic and control system of FIG. 1.

As shown in FIG. 3, the memory 17 contains (so far as relevant to the present invention) three main sections, namely a knowledge base 67 which stores rules and facts as discussed above, a diagnostic and control program 68 which responds to signals received by computer 15 from copier 10 and provides control signals for transmission to copier 10, and a reasoner program 69 for performing reasoning operations when called upon to do so by diagnostic and control program 68.

In very general terms, when the computer 15 receives a signal from any of the detectors 63 to 66 indicating that one of failures (1) to (4) has occurred, the diagnostic and control program 68 is called upon and this creates a goal which is passed to the reasoner program 69 for processing with the knowledge base 67 to derive one or more possible solutions to the failure by a reasoning process. In the example utilising Tables 1 to 3 above, the goals which the diagnostic and control program 68 can supply to the reasoner program 69 are limited to four, namely:

failure-recovery (1)
failure-recovery (2)
failure-recovery (3)
failure-recovery (4).

Where there may be more than one possible solution, the reasoner program 69 provides the one most likely to be best to the diagnostic and control program 68 for the generation of a corresponding control signal for transmission to the copier 10 via the line 16, interface 14 and line 13.

The reasoner program 69 is, in a preferred form of the invention, a general purpose program which operates independently of the nature of the conditions represented by the input goals and the nature of the rules and facts stored in the knowledge base and it relies only upon the presentation thereto of goals and knowledge in a form appropriate to the design of the reasoner program 69. This program 69 will be described in detail below. However, before this description is given, and to assist in understanding the basis on which the reasoner program 69 operates, some examples of reasoning processes, for the derivation of control signals needed for recovering from failure of the copier 10 will be described with reference to the rules and facts set out in Tables 1 and 3 above.

REASONING EXAMPLES

For the purpose of assisting in understanding the present invention, and illustrating the way in which it may operate, the above rules 1 to 10 have been formulated such that there is the possibility that contradictions will arise during reasoning processes utilising those rules. A knowledge base which allows reasoning involving contradiction (ie. the reliance in the reasoning process on the same fact or rule being both true and false, in respective reasoning steps) is known as a "non-strict" knowledge base. It is possible to construct "strict" knowledge bases, that is to say knowledge bases in which the rules are such that there is no potential for contradiction during reasoning processes. Non-strict knowledge bases may permit more versatile reasoning processes than strict knowledge bases and permit the reasoning process to derive more solutions than possible from a strict knowledge base of similar size. The present invention is advantageously used with non-strict knowledge bases and, accordingly, a number of the following examples have been chosen to show contradictions arising during reasoning, as a consequence of the knowledge base being non-strict. Thus, the following Examples 1 to 7 illustrate reasoning processes but it should be understood that they are given by way of background to the invention to assist in its understanding but do not illustrate reasoning processes according to the invention.

EXAMPLE 1

Deductive Reasoning

This Example illustrates simple deductive reasoning utilising above rule 1. The following assumptions are made:
  (a) The aim is to recover from failure (1).
  (b) The current state of the knowledge base includes facts 1, 2, 4 and 18, namely:
    detecting (tray-engaged (A4, 1)),
    detecting (tray-engaged (A4, 2)),
    detecting (tray-empty (A4, 1)),
    detecting (selected-tray (A4, 1))

The absence from the knowledge base of fact 5 ie.

tray-empty (A4, 2)

indicates that, so far as the knowledge base is concerned, tray (A4, 2) is not empty.

In this Example, therefore, failure-recovery (1)

is a goal and inspection of Table 1 shows that this goal matches the conclusion to rule 1. Deductive reasoning implies that if each of the premises of rule 1 can be satisfied, the conditions necessary for recovery from failure (1) are satisfied. Thus, in order to "prove" rule 1 it is necessary to prove each of its premises. This proof can be attempted by inspection of the knowledge base as follows.

The first premise of rule 1 is detecting (selected-tray (x, m)).

Provided the variables x, m are given the values (A4, 1) this premise matches fact 18 which, as indicated above, is present in the knowledge base in this Example. Thus, the first premise is proved.

The second premise of rule 1, namely detecting (tray-empty (x, m)), matches fact 4, which is in the knowledge base, again provided that the variables x and m have the same values as previously indicated, namely (A4 ) and (1). Thus, the second premise is proved.

The third premise of rule 1, namely detecting (tray-engaged (x, n)), matches fact 2, which is in the knowledge base, provided that the variable x is again given the value (A4) and that the variable n is given the value (2). Thus, the third premise is proved.

The fourth premise of rule 1, namely not detecting (tray-empty, (x, n)), is again satisfied provided that the variables x and n have the values previously given ie. x is (A4) and n is (2) since, as already indicated, fact 5 is absent from the knowledge base. Thus, the fourth premise is proved.

The last premise of rule 1, namely signalling (select-tray (x, n))

will be satisfied if a signal is sent to select paper tray (A4, 2).

Thus, the deductive process involves finding a rule (in this example rule 1) whose conclusion matches the goal (in this Example failure-recovery (1)) and attempting to prove the premises of the rule against the facts in the knowledge base. Since the premises contain variables, the proof involves the assigning of values to the variables such that the premises match the corresponding facts in the knowledge base. The step of assigning values to the variables to achieve this matching is termed "unification" and thus unification results in the premise in the rule being made identical with the fact in the knowledge base.

Although the above deductive reasoning process has been explained step-by-step and in detail, it will be readily apparent in this Example that simple inspection of rule 1 and of the facts in the knowledge base reveals by simple deduction that selection of paper tray (A4, 2) by signalling may cause recovery from failure (1) since the knowledge base indicates that paper tray (A4, 2) is engaged and is not empty whereas paper tray (A4, 1) although engaged and selected is in fact empty.

It will further be observed that the final premise of rule 1, namely signalling (select-tray (x, n))

does not correspond to a fact stored in the knowledge base but corresponds to the instruction which needs to be transmitted in order to achieve recovery For the purpose of explaining deductive reasoning, it can be assumed that such premise will be true upon sending the appropriate control signal.

It will also be noted that in the above deductive reasoning process, fact 1, namely tray-engaged (A4, 1) has not been used. However, it has been included as one of the facts in the knowledge base in this example since it is consistent with the fact that the knowledge base records that the paper tray (A4, 1) has been selected but is empty.

EXAMPLE 2

Successful Abductive Reasoning

In this Example, the aim again is to recover from failure (1), but in this case it is assumed that the knowledge base contains facts 4 and 18, but not fact 2 and not fact 5. Thus, the knowledge base contains the following facts:

detecting (tray-empty (A4, 1)), detecting (selected-tray (A4, 1)).

In this Example, deductive reasoning as in Example 1 would fail because the absence from the knowledge base of fact 2 indicates that paper tray (A4, 2) is not engaged. It is possible, however, that the tray might be engaged and the fact that it is engaged has, for one reason or another, not yet been stored in the knowledge base. Abductive reasoning involves assuming that such a missing fact is true ie. hypothesising that the fact is true and then continuing with the deductive reasoning on the basis of that assumption ie. on the basis of the knowledge base as it would be with the addition of the hypothesised fact. Thus, the abductive reasoning process involves considering the goal failure-recovery (1), recognising that the knowledge base contains rule 1 which specifies the conditions for achievement of that goal, further recognising that whilst two of the facts necessary for achieving the goal are present in the knowledge base (namely facts 1 and 4) the third fact necessary (namely fact 2) is absent and then hypothesising a solution by hypothesising the addition of the missing fact (fact 2) to the knowledge base. Once missing fact 2 has been hypothetically added to the knowledge base, continued reasoning determines that signalling selection of tray (A4, 2) may achieve recovery from failure (1).

Of course, it will be readily appreciated that since fact 2 has been hypothesised in this reasoning process, it may well be that is an incorrect hypothesis and that tray (A4, 2) is actually not engaged and therefore signalling selection of that tray would not result in recovery from failure (1). However, the deductive reasoning process of Example 1 cannot even attempt a recovery operation from failure (1) in the circumstances where the knowledge base does not contain the required facts. The abductive reasoning process, however, as in this Example 2, produces a possible solution and the control circuitry can attempt to rectify the fault by acting upon that possible solution.

The abductive reasoning process is therefore more powerful than the deductive reasoning process. This will further be illustrated by the following Example 3.

EXAMPLE 3

Successful Abductive Reasoning

In this Example the aim again is to recover from failure (1) and it is assumed that facts 1, 2, 4, 5 and 18 are present in the knowledge base, namely:

detecting(tray-engaged (A4, 1)),
detecting(tray-engaged (A4, 2)),
detecting(tray-empty (A4, 1)),
detecting(tray-empty (A4, 2)),
detecting(selected-tray (A4, 1)).

From these facts it would appear that there is no possibility of recovery from failure (1) because the facts indicate that both A4 trays are empty. However, it is possible that not all of these facts are true because, for example, the fact that tray (A4, 2) has been refilled with paper may not yet have been recorded in the knowledge base. Deductive reasoning, as in Example 1, could not find a solution in these circumstances. Abductive reasoning, however, can hypothesised that certain of the facts in the knowledge base are untrue and, in this Example, could hypothesised that fact 5 is untrue. The abductive reasoning process would, therefore, involve hypothetically removing fact 5 and determining whether the conditions for recovery from failure (1) might then be established. Once fact 5 has been removed, it can be seen by deduction using rule 1 and the knowledge base with fact 5 removed, that generating a signal to select tray (A4, 2) may cause recovery from failure (1). Thus, a control system using abductive reasoning in these circumstances would produce a possible solution where no solution at all could be produced by deductive reasoning or simple logic.

Thus it will be recognised that, in the abduction process, after a hypothesis has been established by notionally adding a fact to the knowledge base or notionally removing a fact from the knowledge base as the case may be, the abductive process proceeds in the same manner as the deductive process.

During abductive reasoning with a non-strict knowledge base contradictions can arise in the reasoning as will be illustrated by the following Examples 4 to 7.

EXAMPLE 4

Unsuccessful Abductive Reasoning

In this Example, the aim is to recover from failure (3) and it is assumed that the knowledge base contains fact 15, namely that the driver is engaged in area 4.

As clear from Table 1, both rules 3 and 4 relate to recovery from failure (3). In this Example, it will be assumed that rule 3 is utilised. Rule 3 provides recovery from failure (3) if the knowledge base contains the facts that the developing apparatus is off and the document receiving tray is raised and if a signal (ie. signalling document-receiving-tray (down)) is sent to lower the document receiving tray. It may at first sight appear that rule 3 is illogical in providing for recovery from failure (3) if the developing apparatus is off rather than on and without any provision for turning it on. However, this rule has been formulated on the assumption that the internal control system (not shown) for the copier requires the developing apparatus to be off at the beginning of a copying operation and turns it on when that operation starts or during the operation.

The first premise of rule 3, namely developing-apparatus (off), forms the conclusion of rule 8 and of rule 9. The reasoning process could at this point continue either utilising rule 8 or utilising rule 9. Both possibilities will be described in this example but the first to be described will be use of rule 8.

The premise of rule 8 is detecting (driver-engaged, (area 4)).

As will be immediately recognised, the premise of rule 8 corresponds to fact 15, namely detecting (driver-engaged (area 4)).

In this Example, this fact is in the knowledge base and thus the conclusion of rule 8 is proved and, since the conclusion of rule 8 corresponds to the first premise of rule 3, the first premise of rule 3 is also proved.

The second premise of rule 3, namely document-receiving-tray (up)

does not correspond to any fact in the knowledge base but does correspond to the conclusion of rule 10. However, the premise of rule 10 is:

not detecting (driver-engaged (area 4)).

That is to say the premise of rule 10 corresponds to the absence from the knowledge base of fact 15. It will be immediately recognised that the second premise of rule 3 requires the absence of fact 15 from the knowledge base. The abductive process will at this point hypothesised the removal of fact 15 in order to try to find a solution although, as will be appreciated, that hypothesis contradicts the proof of the first premise of rule 3 based upon rule 8.

After the creation of this hypothesis, the reasoning process proceeds to try to prove rule 3 deductively against the modified knowledge base. The deductive reasoning proceeds by again seeking to prove the first premise of rule 3, namely developing-apparatus (off), and finding that this premise is not present as a fact in the modified knowledge base but that it does correspond to the conclusion of rule 8. However, the premise of rule 8, namely fact 15, has been removed as described above and thus at this point the conventional abductive reasoning process would determine that recovery from failure (3) is not achievable by proving the first two premises of rule 3 by means of rules 8 and 10.

It has already been pointed out earlier in this example that the first premise of rule 3 corresponds also to the conclusion of rule 9. The reasoning process, having failed to find a solution utilising rules 3, 8 and 10 may thus now continue to try to find a solution but this time using rules 3, 9 and 10 but of course reverting to the original knowledge base in which fact 15 is present ie. the knowledge base in the form before it was hypothetically modified by removal of fact 15 in the preceding abduction process of this Example.

As will be seen from inspection of rules 3, 9 and 10, a non-contradictory solution is available and may be found by the abductive reasoning process. This solution involves, in accordance with rule 9, hypothetically adding to the knowledge base fact 12, namely detecting (driver-engaged (area 1))

which corresponds to the premise of rule 9.

EXAMPLE 5

Unsuccessful Abductive Reasoning

In this Example, the aim is again to recover from failure (3). It is assumed that fact 15, namely (driver engaged (area 4)), is not contained in the knowledge base. However, in the abductive reasoning process, when it is found that the first premise of rule 3 corresponds to the conclusion of rule 8 and that the premise of rule 8, namely detecting (driver-engaged (area 4)), is not present in the knowledge base, the abduction process hypothesises the addition of this fact to the knowledge base and the reasoning process then proceeds.

The second premise of rule 3, namely detecting (document-receiving-apparatus (up))

corresponds to the conclusion of rule 10 but the premise of that rule corresponds to the absence of fact 15 from the knowledge base. The abduction process proceeds to remove fact 15 from the knowledge base, even though it had previously been added in the abductive reasoning process. Thereafter, as with Example 4, when the final deductive reasoning process is carried out, following abduction, it is found that a solution is not available utilising rules 8 and 10 to prove the first and second premises of rule 3.

The reasoning process may then proceed, as in Example 4, to find a solution which does not involve contradictions utilising rules 3, 9 and 10.

EXAMPLE 6

Unsuccessful Abductive Reasoning

This Example also assumes that the aim is to recover from failure (3), but in this case rule 4 is considered and it is assumed that fact 15 is absent from the knowledge base. The first premise of rule 4, namely detecting (document-receiving-tray (up)), corresponds to the conclusion of rule 10 whose premise corresponds to the absence of fact 15.

The second premise of rule 4 corresponds to the conclusion of rule 8 whose premise corresponds to fact 15 and thus the abduction process hypothesises the addition of fact 15.

In the final deductive process, it is found that the first premise of rule 4 cannot be proved since it corresponds to the conclusion of rule 10 and the premise of rule 10 contradicts fact 15 which was previously added in the abductive reasoning process. Thus, as with Examples 4 and 5, reasoning is found to have been unsuccessful.

EXAMPLE 7

Unsuccessful Abductive Reasoning

In this Example, it is again assumed that the goal is to recover from failure (3) and that rule 4 is to be employed. It is assumed in this case that fact 15 is present in the knowledge base.

The first premise of rule 4 corresponds to the conclusion of rule 10, whose premise corresponds to the absence of fact 15. Thus, the abductive reasoning process hypothesises removal of fact 15 from the knowledge base. The second premise of rule 4 corresponds to the conclusion of rule 8, whose premise corresponds to fact 15. The abductive reasoning process accordingly hypothesises addition of fact 15 to the knowledge base.

Thereafter, the final deductive reasoning process will fail, as in the previous Examples, when it is found that the first premise of rule 4 corresponds to the conclusion of rule 10, whose premise requires the absence of rule 15.

SUMMARY OF ABDUCTIVE REASONING

As will be understood from consideration of Examples 2 to 7 above, abduction as described involves proof of a goal by:

(1) searching the knowledge base for a rule whose conclusion matches the goal;

(2) attempting to prove each of the premises of the rule deductively by attempting to match the premises against facts or conclusions of other rules in the knowledge base, such proof involving unification as described above;

(3) where a premise cannot be proved, hypothetically modifying the knowledge base by the addition or removal of a fact so that the premise can be proved; and (4) attempting to prove deductively the premises in the rule utilising the modified knowledge base.

The last step will provide a solution if there has been no contradiction in the reasoning. If there has been a contradiction in the reasoning, this will be revealed by the last step and this will mean that a solution cannot be found utilising the combination of rules which has given rise to the contradiction. Prior proposals for computer implemented abducers work in this way.

PREFERRED EMBODIMENT OF THE INVENTION

The preferred embodiment of the invention provides a number of improvements over the prior art abduction process just described. Of particular importance are:

(1) The preferred embodiment of the invention is substantially faster than the prior art. Paradoxically, as will be understood from later description, this is achieved by introducing additional processing steps in the abductive reasoning process. Further, and as a consequence of these additional process steps, the preferred embodiment of the invention will operate efficiently with non-strict knowledge bases.

(2) Secondly, the preferred embodiment of the invention can achieve solutions where none could be achieved by the prior art process described above.

(3) Thirdly, the preferred embodiment of the invention includes an improved means for identifying which of several possible solutions is likely to be the best. Such means can be arranged to operate in a manner which contributes to the speeding up of the reasoning process.

First Improvement

As has been explained above, the prior art abduction process described discovers in the final deductive proof step (step 4 above) whether or not the abduction process has produced a solution which may be useful. Solutions in which there has been a contradiction are not useful. Those in which there has been no contradiction may be useful. Examples 4 to 7 above are examples of abductive reasoning processes which have failed to find a useful solution due to the contradictions in the reasoning process and it will be recalled that this failure is only detected in the final deductive reasoning step. Thus, considerable processing time is wasted in processing to a conclusion solutions which will ultimately fail.

The preferred embodiment of the invention includes a means for detecting contradictions in a solution at an earlier stage and aborting the process at that point. This involves additional process steps. Experiments have shown, however, that despite the addition of these process steps a startling and unpredictable increase in speed is achieved. The additional process steps involve:

(a) each time the abductive reasoning process proposes a hypothetical modification to the knowledge base by the addition or removal of a fact or the removal of a rule, checking that hypothetical modification does not contradict the reasoning which has taken place up to that point; and (b) if such a contradiction is found, aborting the processing of that possible solution at that point.

This can be more fully understood by reconsideration of some of the above Examples 4 to 7. It will be recalled that in Example 4 the first premise of rule 3 was proved by matching it to the conclusion of rule 8 whose premise was fact 15, namely detecting (driver-engaged (area 4)).

This fact was in the knowledge base and thus relied upon in proving the first premise of rule 3. At a subsequent step in the reasoning process, when proving the second premise of rule 3, it was found that the conclusion of rule 10 matched the second premise of rule 3. However, the premise of rule 10, namely not detecting (driver-engaged (area 4))

was in contradiction to the premise of rule 8. The prior art abductive reasoning process would at this point simply remove fact 15 in order that rule 10 could be used to prove the second premise of rule 3, thereby contradicting the previous reasoning and this contradiction would only be disclosed in the final deductive reasoning step.

In the preferred embodiment of the invention, however, means (to be described subsequently) is provided to detect that removal from the knowledge base of fact 15 would contradict the previous reasoning (where fact 15 has been relied upon) and that solution would be aborted at that point thus avoiding the subsequent wasted processing time of the prior art. As a result, the process according to the preferred embodiment of the invention can begin sooner the seeking of a non-contradictory solution, as is available in Example 4, for example, utilising rules 3, 9 and 10 instead of rules 3, 8 and 10, as already explained above in the description of Example 4.

Reconsideration of Examples 5 to 7 in a similar way will also show how application of this aspect of the invention thereto can result in contradictory solutions being aborted at an earlier stage than in the prior art.

Second Improvement

The contradictions which have been exemplified in each of Examples 4 to 7 involve a complete contradiction. That is to say, a precise fact (e.g fact 15 in rule 4) has been relied upon and the very same fact in a later step in the process is to be hypothetically removed from the knowledge base. Thus, there is a total contradiction as a consequence of which that solution cannot succeed.

In other possible situations, however, a partial contradiction rather than a total contradiction, may arise when attempting to prove a goal having variables therein. By way of example, a reasoning process may have relied upon the fact:

detecting (selected-tray(A4, 1))

whereas a later stage of the reasoning process may seek to prove the goal:

not detecting (selected-tray(x,m))

where x is a variable which can have the values, say, A1, A2, A3, A4 and A5 and m is a variable which may have the values, say, 1, 2, 3 or 4. Thus the goal to be proved, namely:

not detecting (selected-tray(x,m))

only contradicts the previously relied upon fact detecting (selected-tray(A4, 1))

if the variables x and m are given the values A4 and 1 respectively. This is, therefore, a partial contradiction.

In accordance with the preferred embodiment of the invention this partial contradiction is detected (in a manner to be described later) during the attempted proof of the goal not detecting (selected-tray(x,m)) and is avoided by constraining the values of the variables x and m in this particular goal to be not A4 and not 1 respectively. The proof of the goal can then continue but with the values of x and m constrained as described so as to avoid contradiction. In this way, contradiction is avoided but the entire possible solution is not aborted and may, with the constraints, give rise to a useful solution which could not be achieved in the prior art process.

Third Improvement

The likely usefulness of a solution obtained by abductive reasoning processes may be dependent upon the number and type of the hypotheses which have been made during the reasoning process. The preferred embodiment of the invention, during the processing of each possible solution, determines (in a manner to be described later) whether or not the solution currently being processed is likely to be worse than previously processed solutions and, if a point is reached in the processing of the current solution indicating that it is likely to be worse, the processing of that solution may be interrupted to permit alternative solutions to be pursued. Utilising this technique, the preferred embodiment of the invention may produce just one solution which is likely to be the best of all of the available solutions without the need to process all solutions through to a conclusion, as would take place in the prior art. In this way the process can be speeded up.

Before describing how these improvements are achieved in the preferred embodiment of the invention, it is necessary to consider the general forms which goals may take.

GENERAL FORM OF GOALS

As has already been mentioned, the reasoner program 69 is preferably a general purpose program and it relies upon a knowledge base containing a number of rules derived by an engineer or other person familiar with the system to which the reasoner is to be applied and each rule consists of a conclusion and one or more premises. A premise can consist of a single statement, known as a "literal" or can comprise a combination of two or more statements conjoined by a logical AND and such a statement is known as a "conjunction". Further, a literal may be a positive statement or a negative statement. Similarly, a conjunction can be positive or negative. Taking this description into account, and referring back to rule 1 in Table 1 above, it can be seen that the right-hand side of that rule consists of three positive premises followed by a negative premise followed by a final positive premise. Alternatively, the whole of the right-hand side of the rule could be considered as a single premise which is a conjunction of four literals. As a further example, it can be seen that the right-hand side of rule 5 of Table 1 is a premise made up of the conjunction of a negative literal and a positive literal. As yet a further example, the right-hand side of rule 6 is a premise consisting of the conjunction of two negative literals and one positive literal.

It can also be seen from consideration of rule 1, for example, that each literal may include one or more variables, those in rule 1 being represented by the letters x, m and n. Each literal normally consists of two parts, the first of which is called the predicate and defines a characteristic or attribute of an object and the second of which defines the object itself. However, it will be clear from above rules 7 to 10, that the object of a literal need not involve a variable but could be simply a constant. Thus, for example, the premise of rule 7 in Table 1 above is the constant "area 4" and the predicate is "paper present".

Further, a literal could consist of a predicate without any explicit object. Thus, if for example there were a rule for providing recovery from a general failure of the photocopier the conclusion of the rule might be the simple literal "failure-recovery" for which there is no explicit object although of course the implied object is the photocopier itself as a whole.

Taking the above into account, a literal might be expressed in general form as:

p (x,y)

where "p" is the predicate and "x" and "y" are variables.

An example of a generalised expression of a rule utilising this notation might be as follows:

p1 (xl,yl) if
   p2(x2,y2) and
   p3 (x3,y3) and
   not (p4 (x4,y4) and p5 (x5,y5)) and
   not p6 (x6,y6) and
   not p7 (x7,y7) and
   not p8 (x8,y8).

In the above generalised rule, p1 to p8 represent the predicates of the literals and x1,y1 to x8,y8 represent the objects and may be variables. Although the objects x1,y1, x2,y2 etc. of the literals have been represented in this way it should be understood that in any real example the objects of different literals may be the same as each other. Thus, for example, the object of the first two premises of the above generalised rule might be the same in which case x2 would be the same as x3 and y2 would be the same as y3.

It is conventional to describe any premise or any fact which is to be proved as a goal or sub-goal. In the preferred embodiment, the reasoner 69 is able to prove goals or sub-goals of the following four types:

(1) positive literals;
(2) positive conjunctions;
(3) negative literals; and
(4) negative conjunctions.

Positive conjunctions and negative conjunctions can each be made up of combinations of positive literals, negative literals, positive conjunctions and negative conjunctions. The difference between a positive conjunction and a negative conjunction is that the whole of a negative conjunction is operated upon by a negation. Thus, for example, the following are examples of positive conjunctions:

(i) p1 (x1,y1) and p2 (x2,y2)
(ii) not p1 (x1,y1) and p2 (x2,y2)
(iii) p1 (x1,y1) and not (p2 (x2,y2) and p3 (x3,y3))

As seen, positive conjunctions may include negative literals but, particularly in relation to the second example, it will be observed that the negation "not" does not operate on the whole conjunction but only on the first literal thereof. The third example consists of a positive literal followed by a negative conjunction which is itself made up of two positive literals.

The following are examples of negative conjunctions:

(i) not (p1 (x1,y1) and p2 (x2,y2))
(ii) not (p1 (x1,y1) and not p2 (x2,y2))
(iii) not (p1 (x1,y1) and not (p2 (x2,y2) and p3 (x3,y3)))

As seen with these examples of negative conjunctions, the first negation operates on the whole conjunction and the terms within the conjunction may themselves be negative or positive literals and negative or positive conjunctions.

DETAILED DESCRIPTION OF REASONER 69

The reasoner 69 according to the preferred embodiment of the invention will be described in detail with reference to FIGS. 4 and 5.

Figure 4:
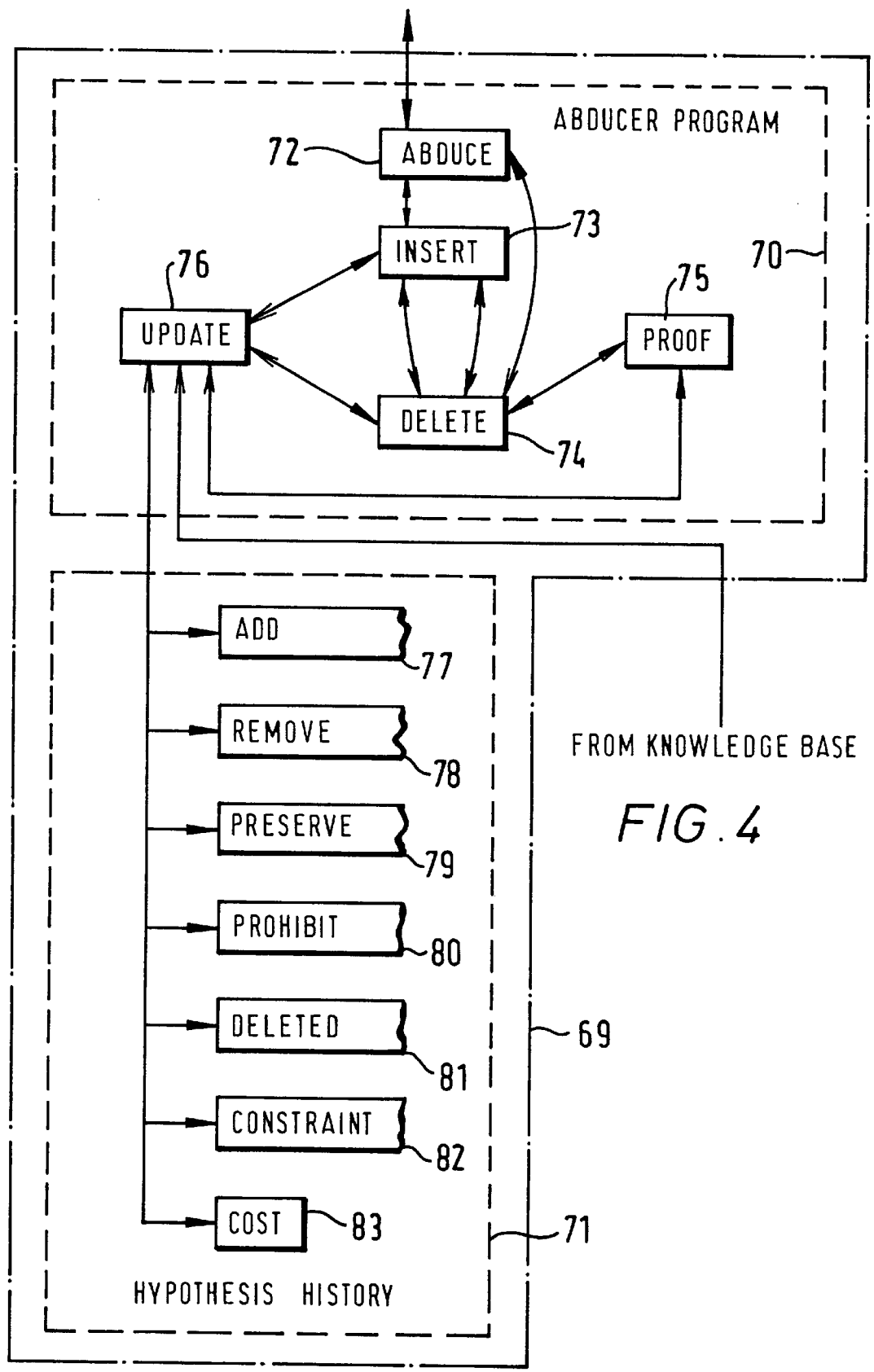
FIG. 4 is a block diagram representing the principal elements of the reasoner program shown in FIG. 3.

With reference to FIG. 4 the reasoner program 69 comprises an abducer program 70 and a hypothesis history 71. FIG. 4 illustrates the principal modules of the abducer program 70. These are:

(1) An Abduce module 72 which is called in by the diagnostic and control program 68 and receives therefrom a goal to be abduced.

(2) An Insert module 73 whose principal function is to hypothesised the addition of facts to the knowledge base during the abduction process.

(3) A Delete module 74 whose principal function is to hypothesised the removal of facts and/or rules from the knowledge base as abduction proceeds.

(4) A Proof module 75 which can be called upon by the delete module 74 and is for performing deductive reasoning operations during the abductive process.

(5) An Update module 76 which is called upon by the insert and delete modules 73 and 74 to update the hypothesis history 71 to put into effect the hypothesising of the addition of facts and the removal of facts and/or rules from the knowledge base. Module 76 also operates, in accordance with the preferred embodiment of the invention:

(i) to identify complete contradictions during the abduction process and thereupon to terminate such process to avoid wasted processing time;

(ii) to identify partial contradictions and consequently constrain the variables in the goal giving rise to the partial contradiction; and (iii) to determine whether the possible solution currently being processed is likely to be worse than any previously processed solution and, if so, to interrupt the current possible solution to permit alternatives to be pursued.

The hypothesis history 71 includes a data structure 77 for containing a list of facts hypothetically added to the knowledge base during an abductive reasoning operation and a data structure 78 for containing a list of facts hypothetically removed from the knowledge base during an abductive reasoning operation.

The hypothesis history 71 also contains four further data structures, namely:

(1) A data structure 79 for containing a "Preserve" list which defines facts and rules which are contained in the knowledge base and which have been relied upon in the reasoning process;

(2) A data structure 80 for containing a "Prohibit" list which defines facts and rules which have been removed from the knowledge base during the reasoning process and facts whose absence from the knowledge base has been relied upon during the reasoning process;

(3) A data structure 81 for containing a "Deleted" list which defines negative conjunctions which have been processed during the reasoning process;

(4) A data structure 82 for containing a "Constraint" list which defines constraints on the values of variables applied following the detection of partial contradictions as discussed above; and (5) A data structure 83 for containing "Cost" data for use in determining whether the possible solution currently being processed is likely to be better or worse than previously processed possible solutions.

During reasoning, the Update module 76 refers to the data in the hypothesis history 71 to detect contradictions which would arise by the hypothetical addition of a fact or the hypothetical removal of a fact and/or a rule. The process is terminated if the abduction attempts to add something which is prohibited, to prohibit something which has been added, to remove something which has been preserved or to preserve something which has been removed, and provided that the contradiction is a total contradiction and thus cannot be avoided by a constraint on the value of any variables in the goal. The Update module 76 will also fail the process if, by reference to the cost data 83, it is determined that the current solution is likely to be worse than a previously processed solution.

The performance of abduction by means of the reasoner program 69 will now be described in detail with reference to FIGS. 5 to 12.

The program 69 is preferably written in the programming language ProLog by B.I.M. whose features are particularly suitable for implementation of the present invention. FIGS. 5 to 11 are drawn to allow for those features of Prolog which are most important to the present invention. In particular, the circles in FIGS. 5 to 12 represent choice-points ie. points in the processing of a goal from which there are a number of different ways to proceed for carrying out subsequent processing. Thus, each of these circles may have one or more exit paths representing the alternative paths which may be taken in the specified order. The charts thus allow for backtracking, which is carried out in response to a particular processing path failing, ie. being unable to proceed. When backtracking occurs, the processing may be "undone" back to the last choice point and processing then continues by taking the next alternative processing path in order, which is as yet untried. Processing can fail at steps represented by a diamond or steps represented by a rectangular box in FIGS. 5 to 12 to cause backtracking. Since Prolog is well known to those skilled in the art, further detail of the backtracking behaviour and other features of that programming language need not be given.

When a goal is passed by the diagnostic and control program 68 to the reasoner 69, the abduce module 72 of the abducer program 70 is called. The abduce model 72 is represented in FIG. 5, which illustrates the entry point A and step 100 at which the insert module 73 is called and the goal passed to that module so that reasoning may proceed. After completion of abductive reasoning steps 102, 106 and 107 are performed for reasons which will be explained later and at step 104 the abduce module 72 returns to the diagnostic and control program 68 the solution which it has found, if any.

It will be recalled that goals may be in the form of positive literals, positive conjunctions, negative literals and negative conjunctions. The way in which each of these different types of goal is processed upon being passed to the insert module 73 at step 100 in FIG. 5 will be described in turn and in this order.

Processing of Positive Literals

Figure 6:
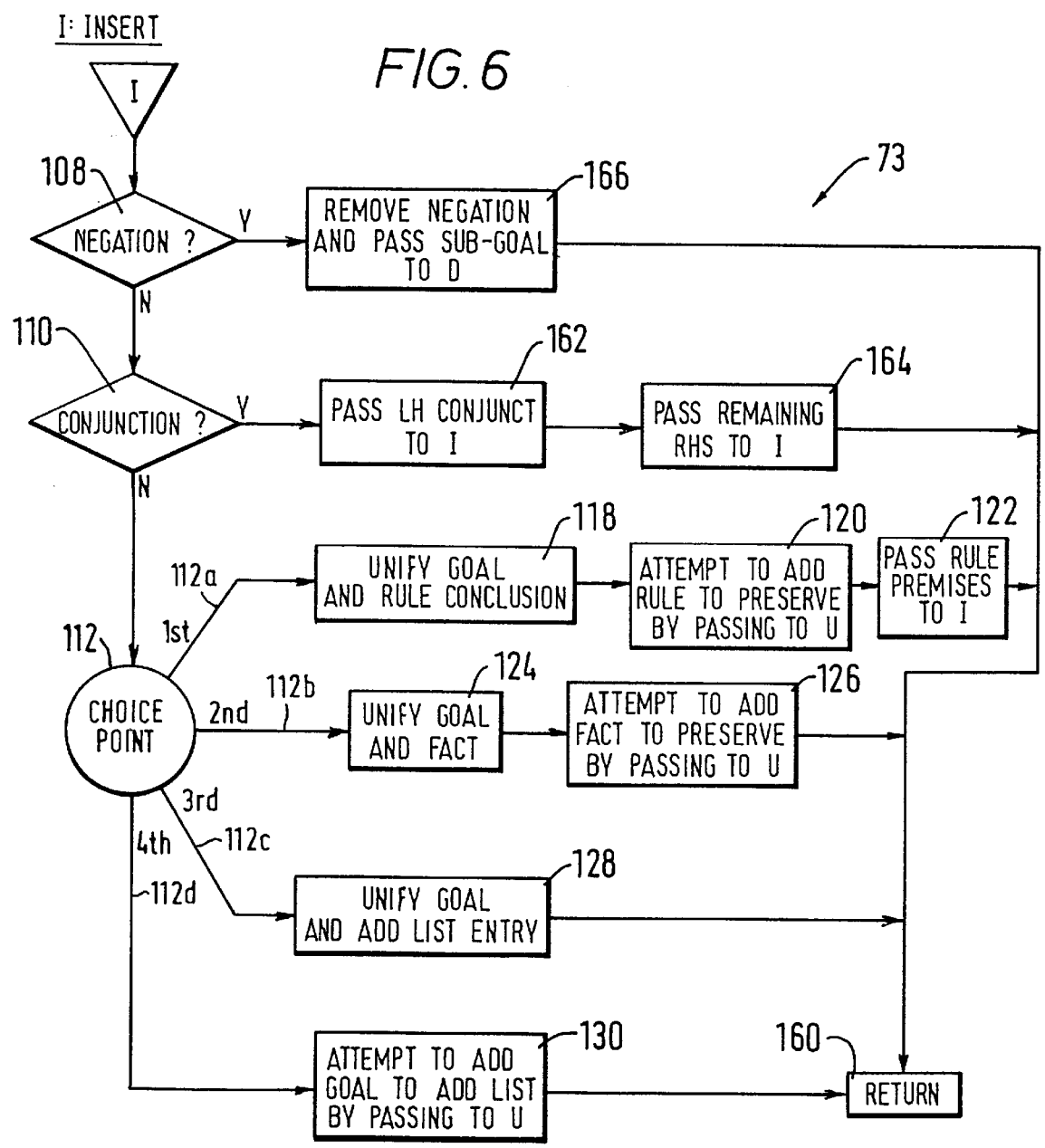

The insert module 73 which is shown in FIG. 6 includes, after the entry point I, successive decisions 108 and 110 for determining whether the goal is negated or a conjunction respectively and choice point 112 having four output paths 112(a) to 112(d). The program is such that when seeking solutions, the alternate paths 112(a) to 112(d) will be followed in turn and in the order marked on FIG. 6, by backtracking. Goals in the form of positive literals will therefore be passed first to choice point 112 where the first path is taken to step 118 at which knowledge base will be searched for a rule conclusion which matches the goal. If such a match is found, the goal and the rule conclusion will be unified, an attempt will be made at step 120 to add the rule to the preserve list by calling in the update module 75, which is shown in more detail in FIG. 12, and if this attempt is successful, the program will attempt to prove the premises of the rule by making a further call or calls of the insert module 73 as represented by step 122 in FIG. 6. Such premises will be processed in exactly the same way as other goals.

If the solution pursued through steps 118, 120 and 122 should fail, the processing backtracks to choice point 112 and takes the second path 112(b) to step 124 where the knowledge base is searched for a fact which matches the goal and if a match is found, the goal and fact are unified. An attempt is then made at step 126 to add the fact the preserve list 79 by calling the update module 76.

If the attempted solution pursued through steps 124 and 126 should fail, then processing backtracks to choice point 112 and takes the third path 112(c) to step 128 where it is determined whether the goal matches an entry in the add list 77. If such a match is found, the goal and the add list entry are unified. If the solution pursued through step 128 should fail, or if no match is found in the add list 77, processing backtracks to choice point 112. At choice point 112, the fourth path 112(d) is taken to step 130 at which update module 75 is called to attempt to add the goal to the add list 77 thus hypothesising the addition of that goal to the knowledge base. If processing through step 130 should fail, processing will backtrack to the last choice point past choice point 112 (in the direction of backtracking) since all the choices from point 112 have been exhausted.

Figure 12A:
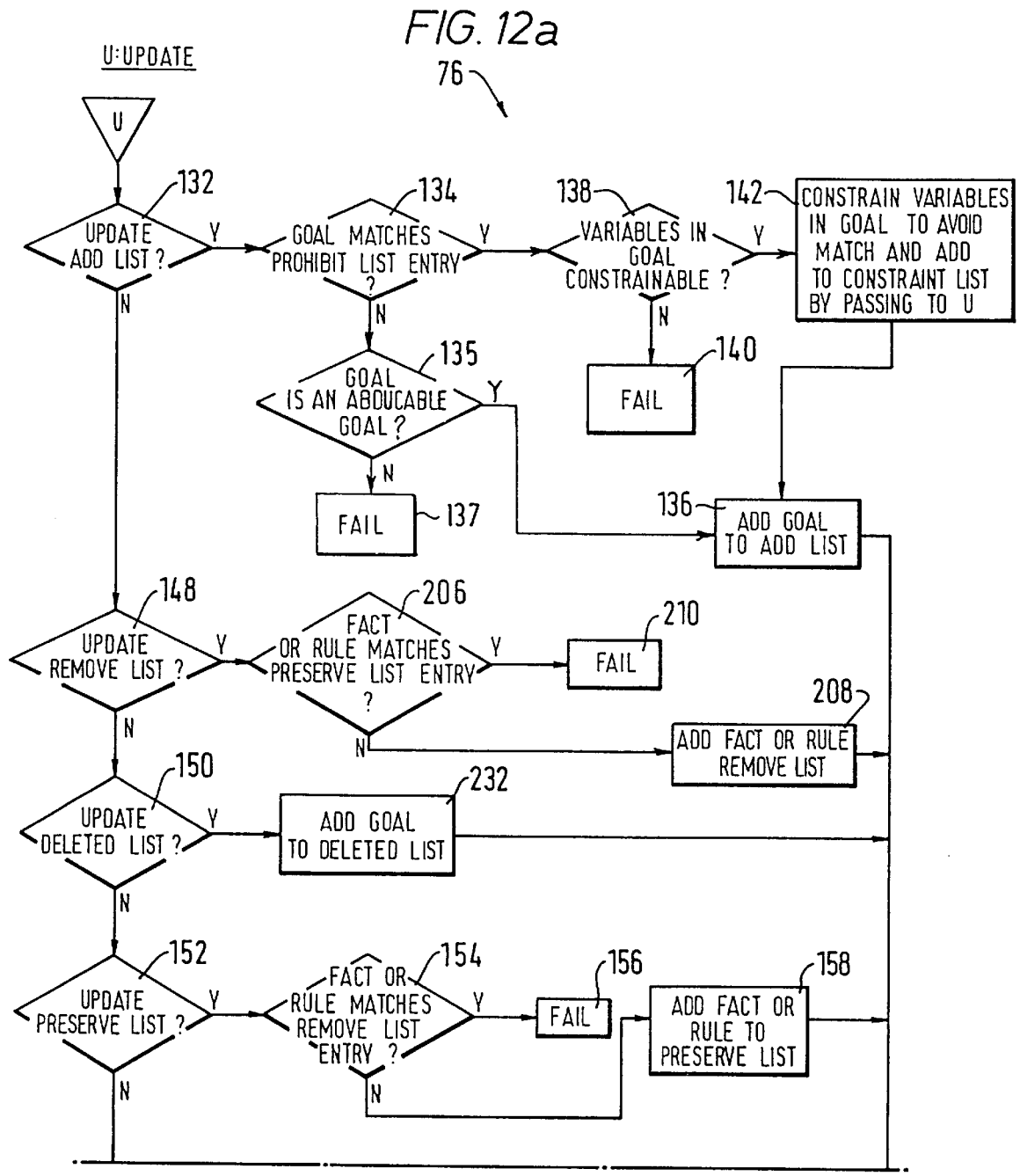

When the update module is called at step 130 ie. when the goal is to be hypothetically added to the knowledge base, eg. when it does not match any rule conclusion or fact in the knowledge base or an entry already on the add list 77, processing moves through the entry point U of the update module 76 to step 132 as shown in FIG. 12(a) at which it is determined that the add list is to be updated. Processing then moves to decision 134 where it is determined whether the goal proposed to be added matches (is unifiable with) any entry on the prohibit list 80. If not, then at step 135, it is determined whether or not the goal is abduceable, ie. a goal which is allowed to be hypothetically added to the knowledge base 67 as a fact, by checking the abduceables list in the knowledge base 67. If the goal is not an abduceable goal then at step 137, processing fails and backtracking occurs as previously described. If the goal is an abduceable goal then it is added to the add list 77 at step 136. As described, step 134 has determined that the goal currently proposed to be added hypothetically to the knowledge base does not contradict any previous step in the reasoning process in which the goal in question has either been removed from the knowledge base or its absence from the knowledge base has been relied upon and such removal or absence, as the case may be, recorded in the prohibit list 80 in a manner which will be subsequently described when explaining the processing of negative literals and negative conjunctions.

If decision 134 determines that the goal does match a prohibit list entry, processing moves to decision 138 at which it is determined whether any variables in the goal and/or prohibit list entry are such that conflict between the goal and prohibit list entry can be avoided by constraining the values of the variables in the goal to be not equal to those in the prohibit list entry ie. constraining the variables so that unification cannot take place. If decision 138 determines that such constraint cannot be made, the processing fails at point 140. Thus, at this point, processing of the solution involving the hypothetical addition of the goal to the knowledge base is aborted because such hypothetical addition contradicts some previous reasoning step.

If decision 138 determines that it is possible to constrain the variables in the goal so as not to contradict the prohibit list entry identified at decision 134, processing moves to step 142 at which constraint on the variables in the goal is effected by adding the constraints to the constraint list by means of a further call of the update module 76 and the goal is then added at step 136 to the add list 77. The further call of the update module 76 just mentioned for updating the constraint list causes the processing to move to step 144 shown in FIG. 12(b) from which the processing in turn moves to step 146 at which the constraints are added to the constraint list 82. Thereafter processing moves to step 137 at which the new cost of the currently processed solution is calculated in a manner which will be described later and this new cost stored in cost data structure 83. At decision 139, it is determined whether the new cost is cheaper than that of other solutions so far as processed to date, ie. whether the current solution is likely to be better than the previous solution. If so, the processing moves to step 141 at which it is returned to the point from which this call of update module 76 was made. If decision 139 determines that the currently processed solution is likely to be worse ie. costlier than a previous solution, the current solution is at step 143, thus avoiding wasting further processing time upon it at this point.

As already indicated update module 76 is also called at step 126 to attempt to add to the preserve list 79 a fact in the knowledge base which has been relied on in the reasoning process, in particular a fact which has been found to match and has been unified with the goal being processed (see steps 114 and 124). When the update module is called at step 126, processing thus moves, referring to FIG. 12(a), through the entry point U, decision 132 which has already been described and decisions 148 and 150 to decision 152 at which it is determined that update module 76 is to be used to try to add the fact in question to the preserve list. From decision 152, processing moves to decision 154 where it is determined whether the fact which has been unified with the goal matches any entry in the remove list 78. The finding of such a match indicates that the reliance upon the fact in the knowledge base located at step 114 contradicts a previous step in the reasoning process which has involved hypothetical removal of that fact. Thus, the processing of the current solution fails at step 156. If no match is found at decision 154 between the fact in the knowledge base located at step 114 and facts in the remove list 78, the fact located at step 114 is added to the preserve list 79 at step 158. Thus, in future processing the fact that the reasoning has relied upon this fact can be detected by examination of the preserve list 79. After step 158, processing moves to steps 137, 139 and 141 or 143 as previously described.

Where update module 76 is called at step 120 in FIG. 6 (the goal having been found to match a rule conclusion in the knowledge base), processing again moves through steps 152 and 154 to determine whether the rule conclusion identified at step 112 matches an entry in the remove list 78 and, dependent upon the result of decision 154, processing will move to step 156 or step 158 and in the latter case the rule located at step 112 is added to the preserve list 79 and again processing moves to steps 137, 139 and 141 or 143 as previously described.

As seen in FIG. 6, each of steps 126 and 130 is followed by a return step 160 to which the processing moves if neither of steps 126 and 130 result in the fail step 140 or 156 respectively or the fail step 143. If step 120 does not result in failure at step 156 or suspension at step 143, step 122 seeks to prove in turn each of the premises of the rule matched at step 112. This involves taking the premises as a whole, making a further call of the insert module 73 and processing those premises as appropriate depending upon whether the premises consist of literals or conjunctions. Thus, for example, if the conclusion of the rule identified as step 112 were a single positive literal this would be processed in the manner just described for positive literals.

Positive Conjunctions

It will be recalled that positive conjunctions can be any combination of positive and negative literals and positive and negative conjunctions. Initially, the possibility of the inclusion in the conjunction of negative goals or negative conjunctions will be ignored. On this basis, where step 110 detects that the goal is a positive conjunction, the effect of step 162, to which the processing moves, is to make a further call of the insert module 73 so that the first conjunct of the positive conjunction, which in this case will be a positive literal, is processed in the manner described above. Thus, this positive literal may be processed through any of the steps 112 to 130 shown in FIG. 6, such steps possibly involving one or more calls of the update module 76 as previously described. After the processing of the first conjunct in this way, the remaining conjuncts are processed one at a time in the same way by further calls of the insert module 73 at step 164 with, of course, possible further calls of the update module 76.

It will be appreciated from the description so far given of the calls of the insert module 73 and the update module 76, and from reconsideration of the description of abductive reasoning with reference to the rules and facts set out in the above table, that at any given time a given call of the insert module 73 may have resulted in a further call of that module before the processing of the first call has been completed and so on and, after completion of the processing of the last call, return step 160 returns the processing to the appropriate point in the previous call. As will become apparent, this applies to any of the modules in abducer program 70.

So far, only the processing of positive literals and conjunctions has been described. If a positive conjunction being processed at a includes a negative includes a negative literal or negative conjunction, or if a goal to be processed by the insert module 73 otherwise is a negative literal or negative conjunction, the negation is detected at step 108 in the insert module and processing moves to step 166 at which the delete module 74 is called.

Negative Literals

Figure 7:
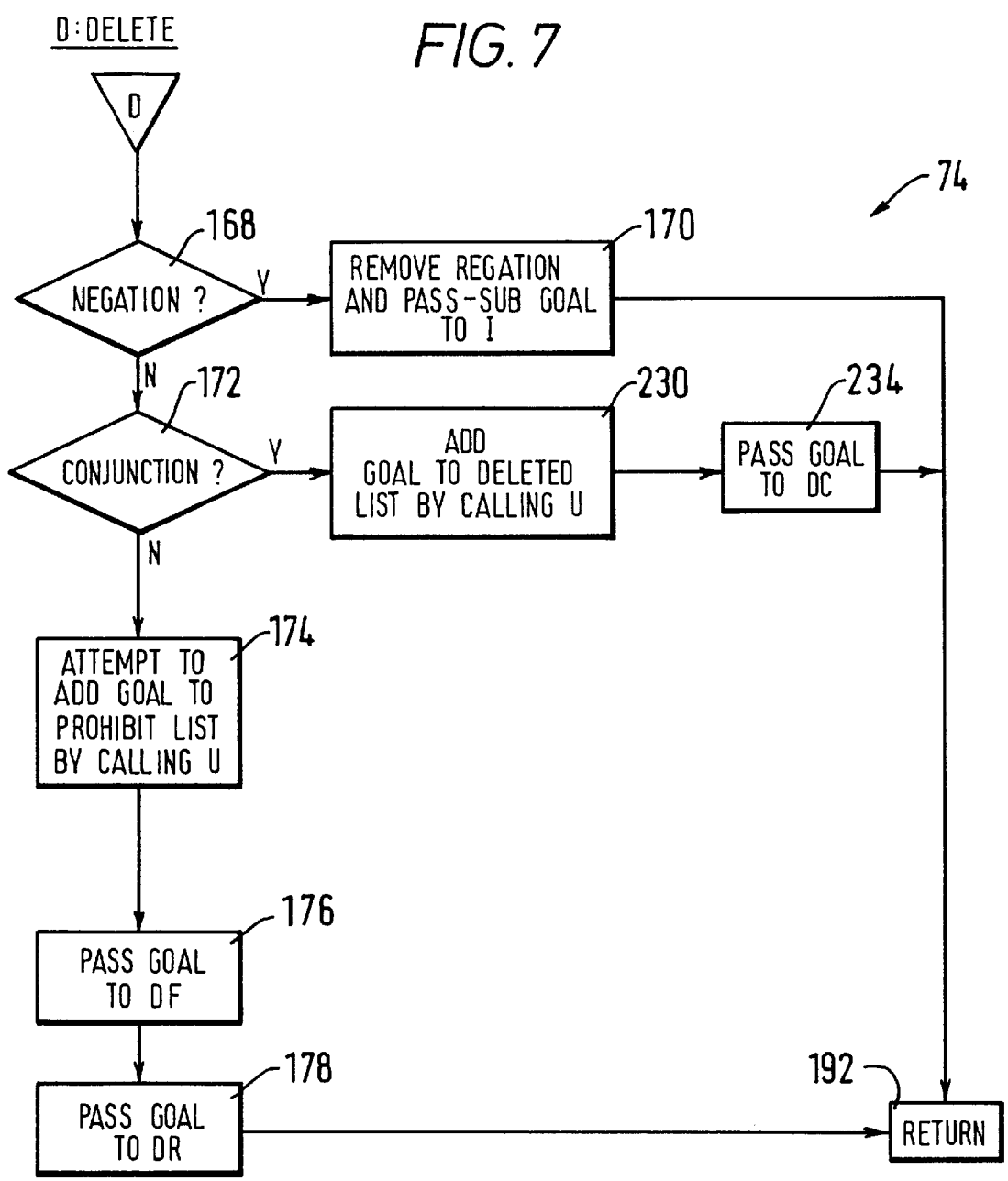

When the goal is a negative literal, the negation is removed at step 166 in FIG. 6 and the goal is passed to the delete module 74 shown in more detail in FIG. 7. Processing moves from the entry point D to decision 168 at which it is determined whether the goal is operated upon by a further negation. If so, processing moves to step 170 where the further negation is removed and the goal is passed to a further call of the insert module 73 for further processing by that module in the manner already described.

If decision 168 determines that there is no further negation on the goal, decision 172 detects whether the goal is a conjunction. Assuming it is not, processing moves to step 174 in which an attempt is made to add the goal to the prohibit list 80 and, if this is successful, the goal is then passed to steps 176 and 178 for hypothetically updating the knowledge base 167.

Figure 12B:
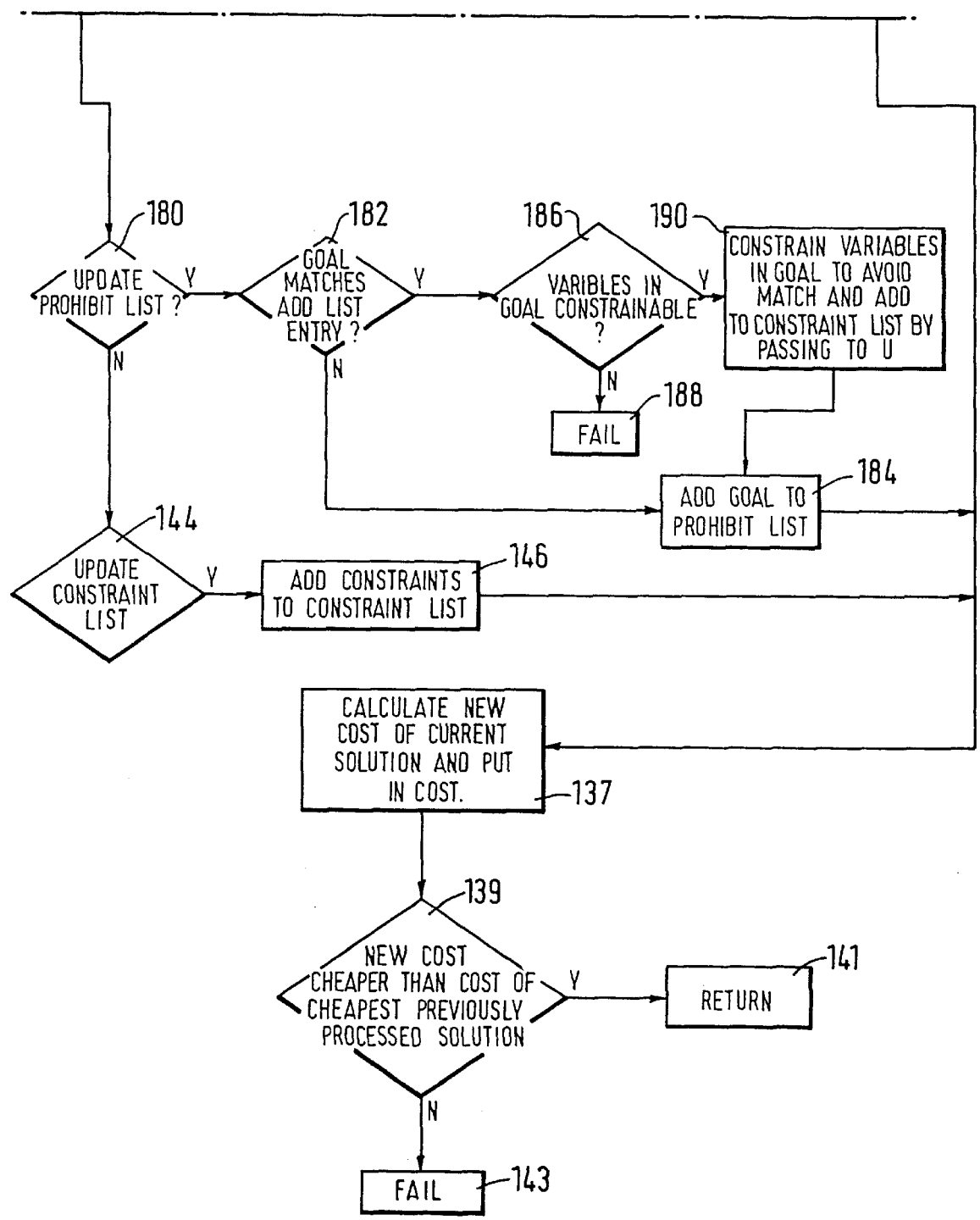

When the update module 76 is called from step 174 in FIG. 7, processing moves to decision 180 in FIG. 12(b) at which it is determined that the prohibit list 80 is to be updated. For the purpose of avoiding contradiction with previous reasoning, decision 182 determines whether the goal matches an add list entry and, if not, the goal is added to the prohibit list 80 at step 184. If the goal does match an add list entry, processing instead moves to step 186 where it is determined whether variables in the goal may be constrained to avoid contradiction with the add list entry. If no such constraint is possible, the solution fails at step 188. If contradiction can be avoided by constraining the variables in the goal, processing moves instead to step 190 at which constraining of the variables is put into effect by a further call of update module 76, processing then moving to step 144 from which point processing continues through steps 146, 137, 139 and 141 or 143 as already described. Assuming decision 139 does not result in the fail step 143, processing then returns from step 141 so as proceed from step 190 to step 184.

Step 184, whether arrived at directly from step 182 or via step 190, again is followed by steps 137, 139 and 141 or 143 as previously described.

Assuming that the above procedures do not result in the solution being, processing returns to step 174 so that the goal may be passed to step 176 and eventually (assuming that step 176 is successful) processing will move to step 178 and then to return step 192.

Thus, where the goal being processed is a negative literal, the first step is to add it to the prohibit list 80 in step 174. It is then necessary to ensure that any facts which match the goal and which are contained in the knowledge base should be disabled, this being attempted at step 176 by calling the sub-routine shown in FIG. 8.

Disabling Facts

Figure 8:
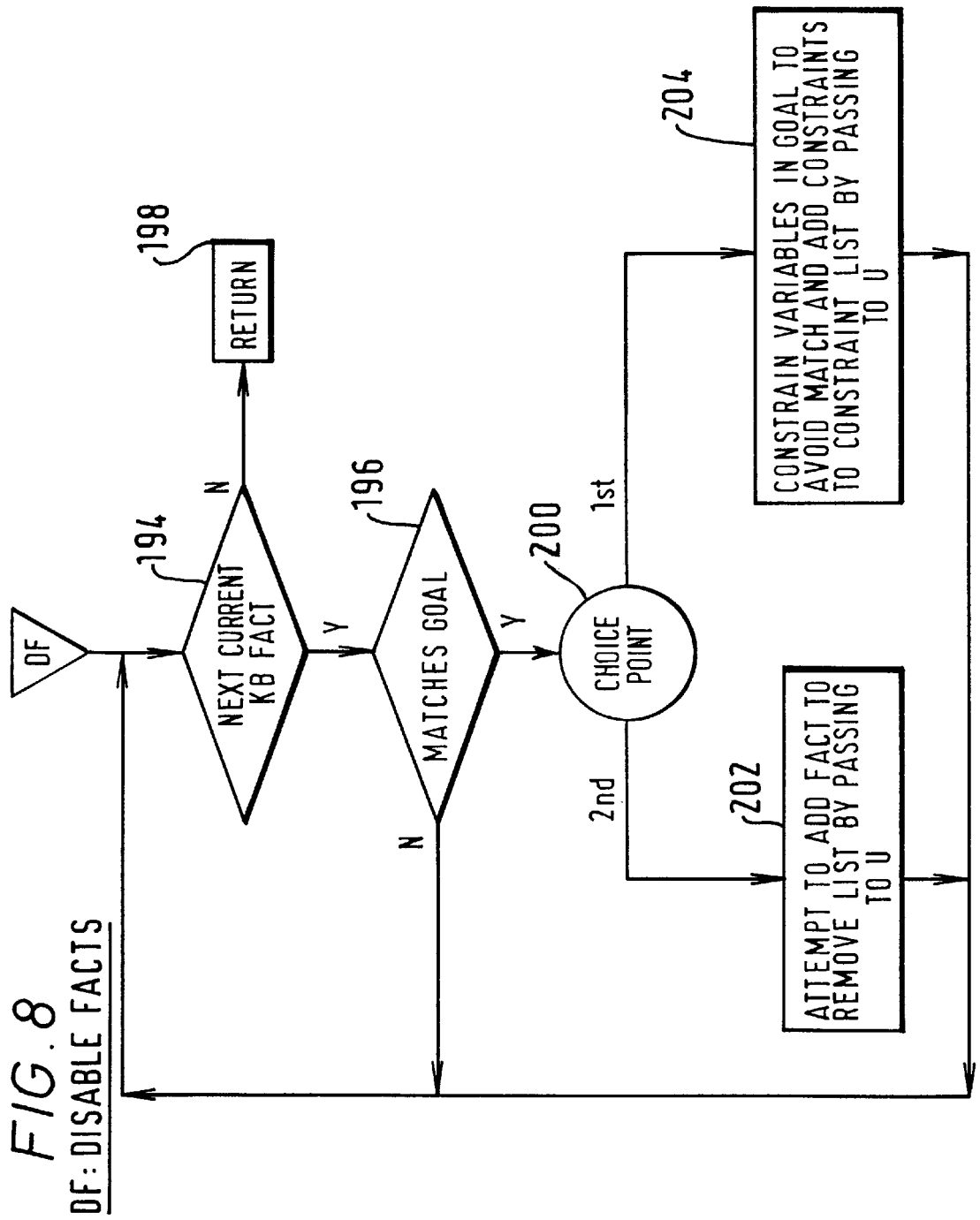

Following the entry point DF for the sub-routine shown in FIG. 8, steps 194 and 196 determine for each fact in the knowledge base in turn whether there is a match with the goal until all of the facts in the knowledge base have been exhausted at which time the processing moves to return step 198. When a match is found at step 196, processing moves to choice point 200. The processing may thereafter move either to step 202 or to step 204. In the preferred embodiment when processing to obtain a first solution, step 204 is used and, using this step, the solution is pursued to a conclusion or failure. In the event of failure, step 202 would then be used in a subsequent attempt at finding a solution.

Thus, at step 204, a determination is made as to whether any variables in the goal can be constrained to avoid matching the fact found at step 196. If such constraint can be made, update module 76 is called to add the constraints to the constraint list 82 utilising steps 144 and 146 and the steps subsequent to step 146 are followed as previously described. Assuming that these steps do not result in the process being at step 143, processing returns from step 141 to step 204.

If step 204 failed, processing would backtrack to choice point 200 and an alternative solution would be pursued through step 202.

At step 202, an attempt is made to hypothetically remove the fact detected at step 196 from the knowledge base 167 by adding it to the remove list 78 by calling the update module 76. Thus processing moves through steps 132 and 148 in FIG. 12(*a*) to decision 206 at which it is determined whether the fact proposed to be removed from the knowledge base matches an entry on the preserve list 79. If no such match is found, this means that the fact detected at step 196 can be removed hypothetically from the knowledge base without contradicting any previous step in the reasoning and thus the processing moves to step 208 at which the fact is added to the remove list 78. Following step 208, processing moves to step 137 and subsequent steps as previously described and, if not at step 143, will return from return step 141 to step 202.

If decision 206 determines that the fact proposed to hypothetically removed from the knowledge base matches an entry in the preserve list 79, this means that removal of the fact contradicts a previous step in the reasoning process and accordingly the processing of this solution fails at step 210 and processing backtracks to the last choice point which, in this case, is choice point 200.

After each matching fact found at step 196 has been processed utilising step 204 and/or step 202, processing returns through steps 194 and 198 to step 176.

Figure 9:
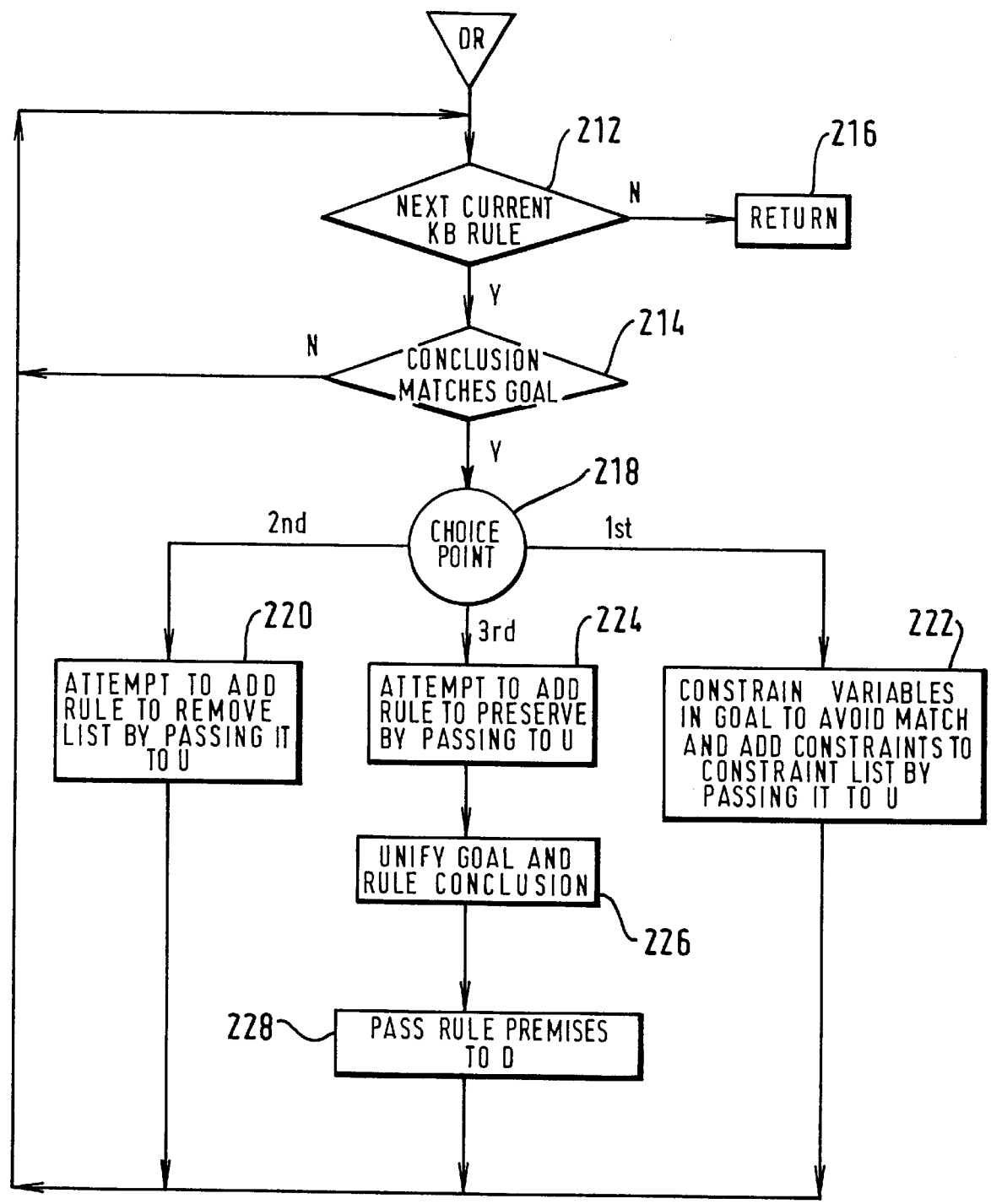

Thereafter, the disable rule sub-routine shown in FIG. 9 is called at step 178.

Disabling Rules

In the sub-routine of FIG. 9, processing moves from the entry point DR through steps 212 and 214 to locate all rules in the knowledge base whose conclusions match the goal. After all rules have been examined, processing moves to return step 216.

For each rule conclusion which is found to match the goal at step 214, the processing moves to choice point 218 from which there are three possible alternative paths for disabling that rule. For ease of understanding, the path containing step 220 will be described in detail first. Thereafter the path containing step 222 will be described. Lastly, the path containing steps 224, 226 and 228 will be described, this path being the most complex. However, the preferred embodiment of the invention is arranged so that processing from choice point 218 moves firstly to the path containing step 222. If this fails, processing backtracks to choice point 218 and then proceeds to attempt to find a solution utilising the path containing step 220. If this also fails, processing backtracks again to choice point 218 and then proceeds to the path containing steps 224, 226 and 228 to try to find a solution using those steps.

Step 220 involves attempting to hypothetically remove the rule from the knowledge base by adding the rule to the remove list 78 utilising the update module 76. Thus, the update module 76 is called at step 220 and processing moves to steps 148 and 206 and then either to step 208 or 210 as previously described. In this case, however, step 206 determines whether the rule located at step 214 matches a rule which has been preserved by adding it to the preserve list 79 in a previous reasoning step. If no match is found, the rule is added to the remove list 78 at step 208 and processing continues therefrom to steps 137, 139 and 141 or 143 as previously described. If a match is found at step 206, processing fails at step 210 and backtracks to the choice point 218 to attempt an alternative solution utilising, for example, step 222.

Step 222 involves determining whether any variables in the goal can have their values constrained to avoid the match with the rule conclusion determined at step 214. If such constraint is possible, update module 76 is called to add the constraints to the constraint list 82, processing then passing as previously described to steps 144 and 146 and steps subsequent thereto.

If step 222 fails either because the variables in the goal cannot be constrained to avoid a match or if steps 137 and 139 result in fail step 143, processing backtracks to the choice point 218 so that a further alternative solution can be attempted utilising steps 224, 226 and 228.

Whereas step 220 attempted a solution by hypothetically removing the rule as a whole from the knowledge base and step 222 attempted a solution by constraining any variables in the goal to avoid a match with the rule conclusion, steps 224, 226 and 228 attempt to avoid a match between the rule conclusion and goal by ensuring that any variables in the rule are prevented from having values which would result in a match with the unconstrained goal. In other words, and expressed shortly, step 220 attempts to avoid matching by removing the rule, step 222 attempts to avoid matching by modifying the goal and steps 224, 226 and 228 are for the purpose of attempting to avoid matching by modifying the rule. Ignoring step 224 for the moment, modification of the rule to avoid contradiction is effected by unifying the rule conclusion with the goal, which has the effect of setting any variables in the rule which correspond to constants in the goal to values equal to those constants. The premises of the rule so modified are then passed at step 228 to a further call of the delete module 74 for the deletion of those premises. An example will assist in understanding this. Assume that the goal is P1 (c1, b1) and the rule is:

P1 (x,y) if P2 (x,z) and P3 (z,y)

where x can have the values c1 to c5 and y can have the values 1 to b5.

Unification of the rule with the goal involves setting the values of x and y in the rule to be the constants c1 and 1 respectively so that the rule becomes:

P1 (c1, b1) if P2 (c1, z) and P3 (z, b1).

Such unification is performed in step 226 and the rule in this form is disabled by passing the premises in this form to the delete module 74 so that those premises in this form are deleted.

Nevertheless the rule with values for x and y other than c1 an b1 effectively remains in the hypothesised knowledge base. The rule as it thus remains can therefore be expressed as follows:

P1 (x,y) if P2 (x,z) and P3 (z,y)

where x=c2 to c5 and y=b2 to b5.

It will be appreciated that if in subsequent processing the goal P1 (x,y) where x has any of the values c2 to c5 and y has any of the values b2 to b5 are presented to the disable rule sub-routine of FIG. 9, steps 226 and 228 could, if measures are not taken, result in further disablement of the rule and possibly total disablement if goals P1 (x,y) where x and y have each of the remaining possible values are all subsequently presented. The result of this would be that steps 226 and 228 simply provide a duplicate solution to that provided by step 220 and time would have been wasted in pursuing this duplicate solution. Step 224 involves attempting to add the rule to the preserve list 79 with a view to avoiding such duplicate solution. However, it should be understood that circumstances may arise where, despite this measure, steps 226 and 228 do result in complete hypothetical removal of a rule where there is a variable in the premises to the rule which cannot be unified with values in the goal that is to say when a premise contains variables none of which are in the rule conclusion.

Following step 220, 228 or 222, and following processing of all matches detected at steps 214, processing will return through step 216 to step 178 in FIG. 7.

Thus processing for deleting negative literals is completed and processing returns via step 192 to the point at which the delete module was called.

So far as described up to this point, the only steps at which the delete module are called are step 116 in FIG. 6 and step 228 in FIG. 9 although, as will appear from subsequent description, there are other steps at which the delete module 74 may be called.

Negative Conjunctions

Where a negation is detected at step 108 of the insert module 73, as shown in FIG. 6, processing moves to step 166 where the negation is removed and the goal is passed to the delete module 74. If the goal is a negative conjunction, no negation will be detected at step 168. This will be true even if the first conjunct is a negative literal or negative conjunction since the negation operable on the first conjunct will not be relevant to the processing at this point. Step 172 will detect that the goal is a conjunction. Processing then moves to step 230 where the goal is added to the deleted list 81 by calling update module 76. Upon this call of the update module 76, processing moves through steps 132, 148 and 150 to step 232 at which the goal is added to the deleted list 81 and processing then moves on to steps 137 and 139 and then step 141 or 143 as previously described. Assuming that the fail step 143 does not arise, processing returns via step 141 to step 230 and the goal is passed to step 234 at which the delete conjunctions sub-routine shown in FIG. 11 is called.

Delete Conjunctions

Figure 10:
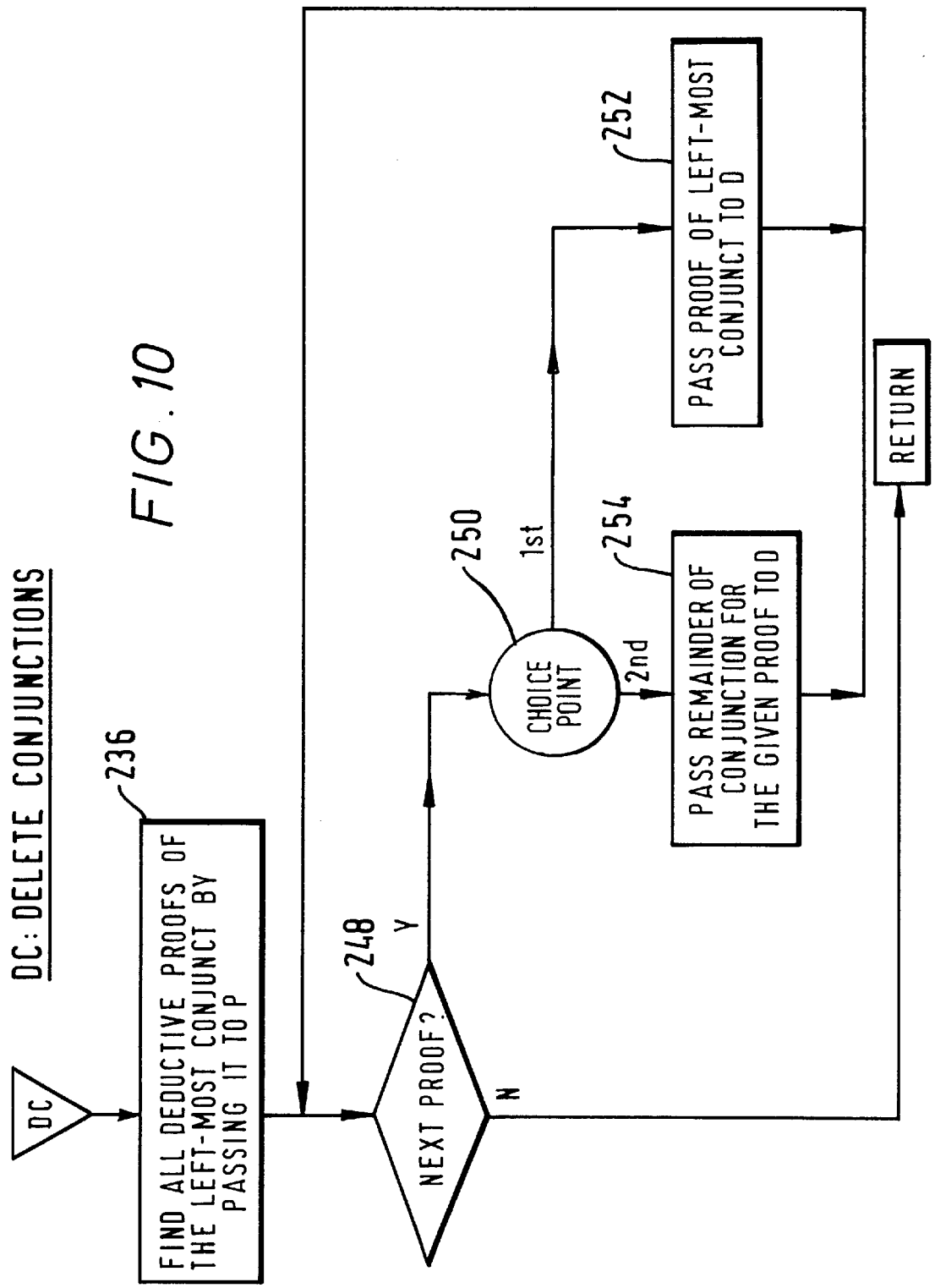

Following the entry point DC, the sub-routine shown in FIG. 10 involves finding, at step 236, all deductive proofs of the leftmost conjunct of the conjunction. That leftmost conjunct may be a literal or may itself be a conjunction.

Figure 11:
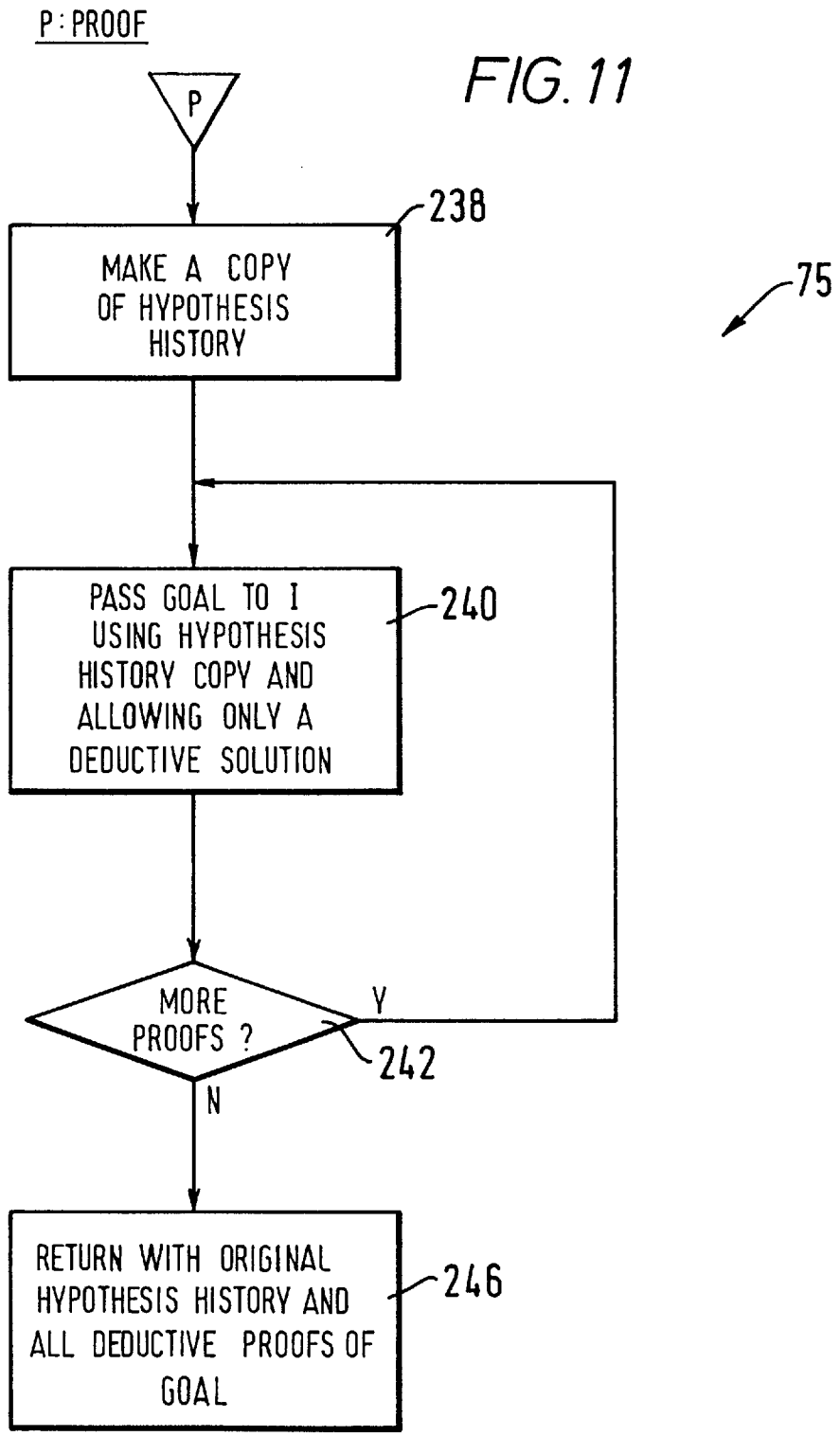

To perform the operation required by step 236, the leftmost conjunct is passed to the proof module 75 which is shown in more detail in FIG. 11. As seen in FIG. 11, the entry point P is followed by step 238 at which a copy of the current hypothesis history 71 is made for use by the proof module 75. The reason for making this copy is that, as will become apparent, the performance of the proof sub-routine may involve the making of changes in the copy of the hypothesis history 71 which would affect subsequent reasoning operations. As a consequence of step 238, any such changes are only made on the copy of the hypothesis history and this copy can be discarded after the proof sub-routine of FIG. 11 has been completed. At step 240, the goal to be proved, ie. the leftmost conjunct of the conjunction being processed at step 236 of FIG. 10, is passed to a further call of the insert module 73 which processes the goal utilising the copy of the hypothesis history made at step 238 and in a manner which permits only deductive solutions to be returned. This is achieved by ensuring that in the processing which follows this call of the insert module 73, processing is terminated if such processing leads to any of the following steps:

(1) Step 130 in FIG. 6 where there is an attempt to add the goal to the add list 77;

(2) Step 200 in FIG. 8 since this step would be followed by disabling of a fact by removal or constraint on variables;

(3) Step 218 in FIG. 9 since this step would be followed by disabling a rule by removing the rule, constraining the variables in the goal or disabling the rule insofar as its variables have values matching those of the goal; and (4) Step 250 in FIG. 10, which is to be subsequently described.

As will be appreciated from reconsideration of the foregoing description of FIGS. 6 to 9 and 12, the processing performed at step 240 in FIG. 11 may involve numerous calls of the insert module 73, the delete module 74, the disable facts routine of FIG. 8, the disable rules routine of FIG. 9 and the delete conjunction routine of FIG. 10 which, of course, in turn calls upon the proof module 75 of FIG. 11 which is currently being described.

The processing loops through step 240 and step 242 in FIG. 11 until all deductive proofs of the goal have been found and then, at step 246, processing returns to step 236 in FIG. 10. The result of the performance of the proof sub-routine of FIG. 11, if any proofs of the goal have been found, is a set of one or more such proofs.

After step 236 has been completed, processing moves to step 248 in FIG. 10 at which each proof in turn is passed to choice point 250 for further processing which may either proceed with step 252 or with step 254. In the preferred embodiment, it is assumed that step 252 will be followed first.

Assuming step 252 follows, the first proof of the leftmost conjunct of the conjunction is passed to the delete module 74 shown in detail in FIG. 7. If that proof is a positive literal, steps 174, 176 and 178 will be followed as previously described. If it is a positive conjunction, steps 230 and 234 will be followed as previously described. If it is a negative literal or negative conjunction, it will be passed to step 170 for further processing by a further call of the insert module 73 as previously described.

Of course, as should now be clear, the processing followed during the performance of step 252 of FIG. 10 might well result in a failure in which case the processing will backtrack to choice point 250 and then step 254 will be followed for the first proof of the goal's leftmost conjunct.

In step 254, the conjunction minus its leftmost conjunct (and with any variables set to constants as a consequence of unification during the deductive reasoning processes of step 240 of FIG. 11) is passed to a further call of the delete module 74 and thus processing of this remainder of the conjunction as a further goal or sub-goal supplied to delete module 74 takes place in a manner previously described.

Following completion of step 252 or step 254 for the first proof of the left-most conjunct, assuming that one or other of these steps has not failed, each successive proof obtained at step 236 is then processed in the same way.

The purpose of steps 252 and 254 is to try to disable at least one literal of the conjunction which has been supplied to the delete conjunctions sub-routine of FIG. 10 thereby to render the whole conjunction unprovable ie. effectively deleted.

After all proofs have been processed, the processing moves from step 248 to step 256 from which it returns to the point at which the delete conjunctions sub-routine was called, namely step 234 of FIG. 7. Thereafter, processing returns via step 192 to the point from which this particular call of the delete module 74 was made.

Costing

As has already been described steps 137, 139, 141 and 143 of FIG. 12b are included so that whenever a solution being pursued reaches a stage at which it is likely to be worse than a previously completed solution, the current solution is abandoned and an alternative which might be better is proceeded with. As a result of this, there might, at any given time, be numerous solutions which have been partially completed, but abandoned, whilst a solution which is currently most likely to be the best is pursued. If the one being pursued reaches a stage where it is considered to be worse than the best completed solution at any given time, the solution being pursued may be abandoned and a further solution pursued until it is either completed or becomes worse than the best completed solution. Whilst a variety of different methods might be used for determining which solution of a number of solutions is likely to be the best, one preferred method of making this determination in steps 137 and 139 comprises assigning a "cost" to different types of hypothesised changes to the knowledge base which may take place during abductive reasoning and calculating the cumulative cost of these hypothesised changes for each given solution or partial solution. An example of a cost function ie. the cost assigned to different types of change, is shown in Table 4 below.

TABLE 4

| Operation | Cost |
|---|---|
| Adding a fact | 1 |
| Removing a fact | 10 |
| Removing a rule | 100 |

Thus, in this Example, a cost of 0 is assumed for other operations such as making an entry on the prohibit list 80, constraining a variable etc. It is for this reason that steps 204 and 202 of FIG. 8 and steps 222, 224 and 220 in FIG. 9 are followed in the order described above.

In the above example, a cost is attached to three types of change. However, different cost functions can be used which attach different costs to different groups of operations. For example, a cost of one to the matching of any fact or rule in the knowledge base.

Thus, step 137 in FIG. 12(b) involves calculating the cumulative cost and step 139 involves comparing that cumulative cost with the cumulative costs of any other solutions which have so far been completed. If this reveals that the cumulative cost of the solution currently being processed becomes higher than the cost of the cheapest previously completed solution, processing fails at step 143.

As described so far, steps 137 and 139 are carried out each time a call is made to the update module 76. Alternatively, the costing of a solution may be carried out at intervals, those intervals, for example, being measured by the numbers of one or more types of update made to the hypothesis history 71 or the time lapsed since one or more previous updates or sequence of updates.

Return to Abduce Module 73

Figure 5:
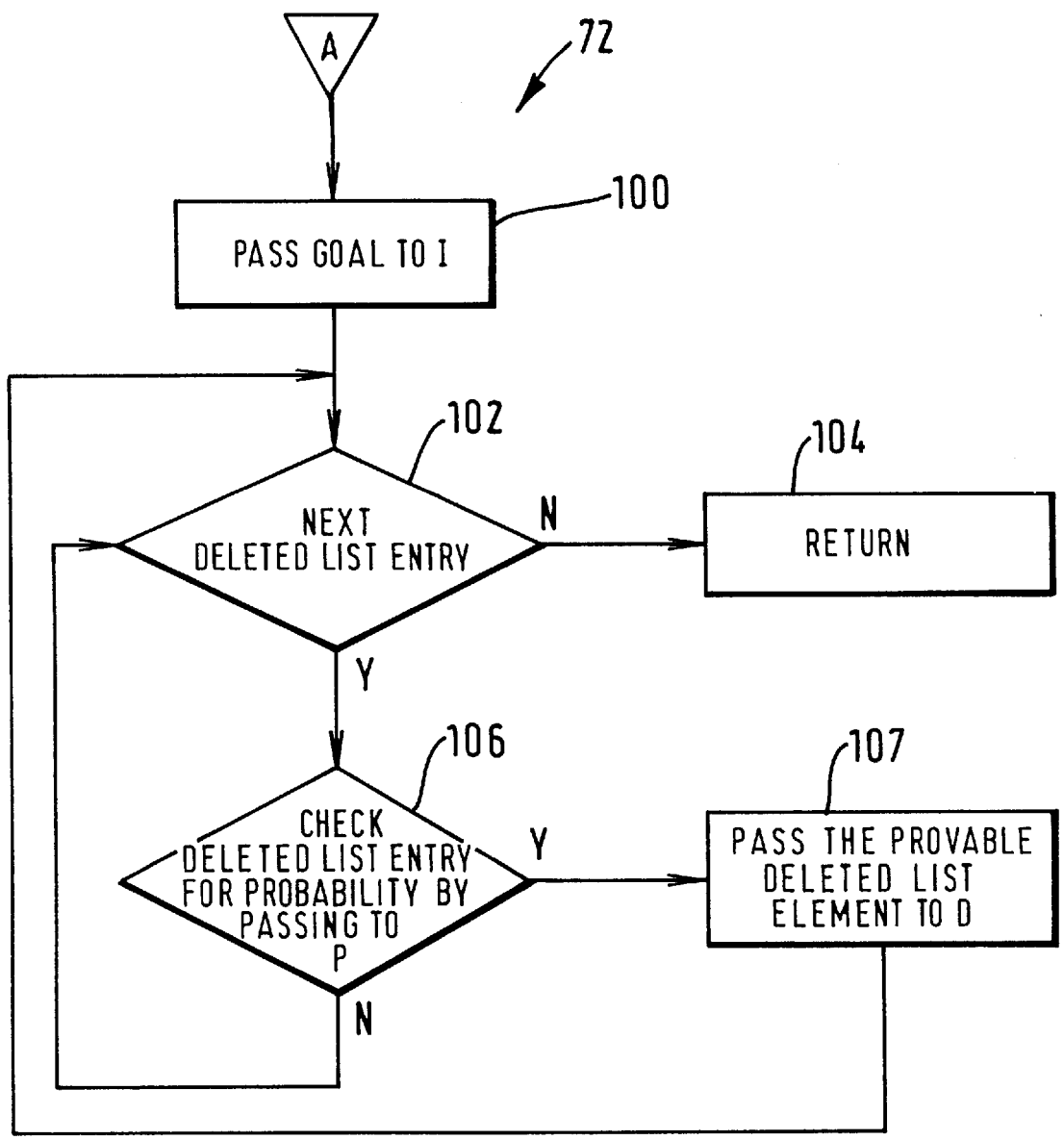
FIGS. 5 to 12 are a set of diagrams representing functions performed by the reasoner program represented in FIG. 4, FIG. 12 being in two parts labelled FIGS. 12(*a*) and 12(*b*) respectively.

As will be understood from the above description, the passing at step 100 of FIG. 5 of the goal received from the diagnostic and control program 68 to the insert module 73 will result, in a complex system, in a massive processing operation in which numerous possible solutions will have been partially or completely processed. That which is most likely to be the best, based upon its cost, is returned to step 100 so that processing may move to step 102, the purpose of which will now be explained.

It will be recalled from FIG. 12, that conjunctions to be deleted are added to the deleted list 81 at step 232 but that no reference is made to the deleted list 81 when adding goals to the add list 77 at step 182. There is, therefore, the possibility of contradiction between goals added to the add list 77 and goals added to the deleted list 81. Whilst it would be possible to check the deleted list 81 when adding goals to the add list 77, this may take up more processing time than carrying out a check when abduction is substantially complete. Thus, in this embodiment, in steps 102 and 106 on FIG. 5, each conjunction in the deleted list 81 is checked for provability against the hypothesised knowledge base ie. the knowledge base 67 with goals added in the add list 77 and without facts or rules which have been removed as defined by the remove list 78. Each conjunction found to be provable is passed to step 107 where a further call of the delete module 74 is made in order to attempt to make the conjunction again unprovable. Since it is possible that deletion of a conjunction in step 107 can result in a previously deleted conjunction becoming re-provable, each successive entry on the deleted list 81 is checked against the hypothesised knowledge base as a whole after being updated as a consequence of step 107 in which a previous deleted list conjunction has been made unprovable. If a contradiction arises during this process as will be revealed during performance of the update module 76 illustrated in detail in FIGS. 12a and 12b, the particular solution will fail unless the contradiction can be avoided, as previously described, by applying constraints to variables. After that solution has been completed, the processing returns via step 104 to the point from which the abduce module 72 was called. At this point, if the abductive reasoning has been successful, there exists a non-contradictory hypothesised knowledge base.

MODIFIED ABDUCER PROGRAM

As explained above, the function of steps 137, 139 and 143 in the update module 76 is to calculate the "cost" of the solution currently being processed and to abort processing of that solution in favour of other possible solutions whenever the cost to date exceeds that of the previously completely processed solution with the lowest cost, with different costs being assigned to different types of abductive operation. Thus, adding facts to the hypothesis history is less costly than removing facts or rules in the embodiment described above.

The consequence of the method of calculating the cost described above is that a possible solution involving only the addition of facts is discarded in favour of a solution which involves the removal of facts or rules. This could arise where, in one possible solution, a relatively large number of facts is added whereas, in another possible solution, only a small number of facts have to be removed as a result of which the cost of the first of these possible solutions exceeds that of the second. In some applications of the abducer, however, it may be desirable to return solutions only involving the addition of facts, even though a large number of such additions may be made, before attempting any solutions involving removal of facts or rules. Further, it may in general be preferable to process solutions involving no changes in the knowledge base ie. deductive solutions before processing solutions involving hypothetical changes in the knowledge base. The modification illustrated in FIGS. 13 and 14 achieves this and processes solutions involving different types of reasoning operations in four groups as follows:

Group 1: deductive solutions only ie. solutions involving no hypothetical changes to the knowledge base.

Group 2: abductive solutions in which facts are hypothetically added to the knowledge base but no other changes are permitted.

Group 3: abductive solutions in which hypothetical removal of facts from the knowledge base takes place, and the addition of facts is also permitted but no other hypothetical changes in the knowledge base are permitted.

Group 4: abductive solutions in which hypothetical removal of rules from the knowledge base takes place and in which hypothetical addition and hypothetical removal of facts is also permitted.

Figure 13:
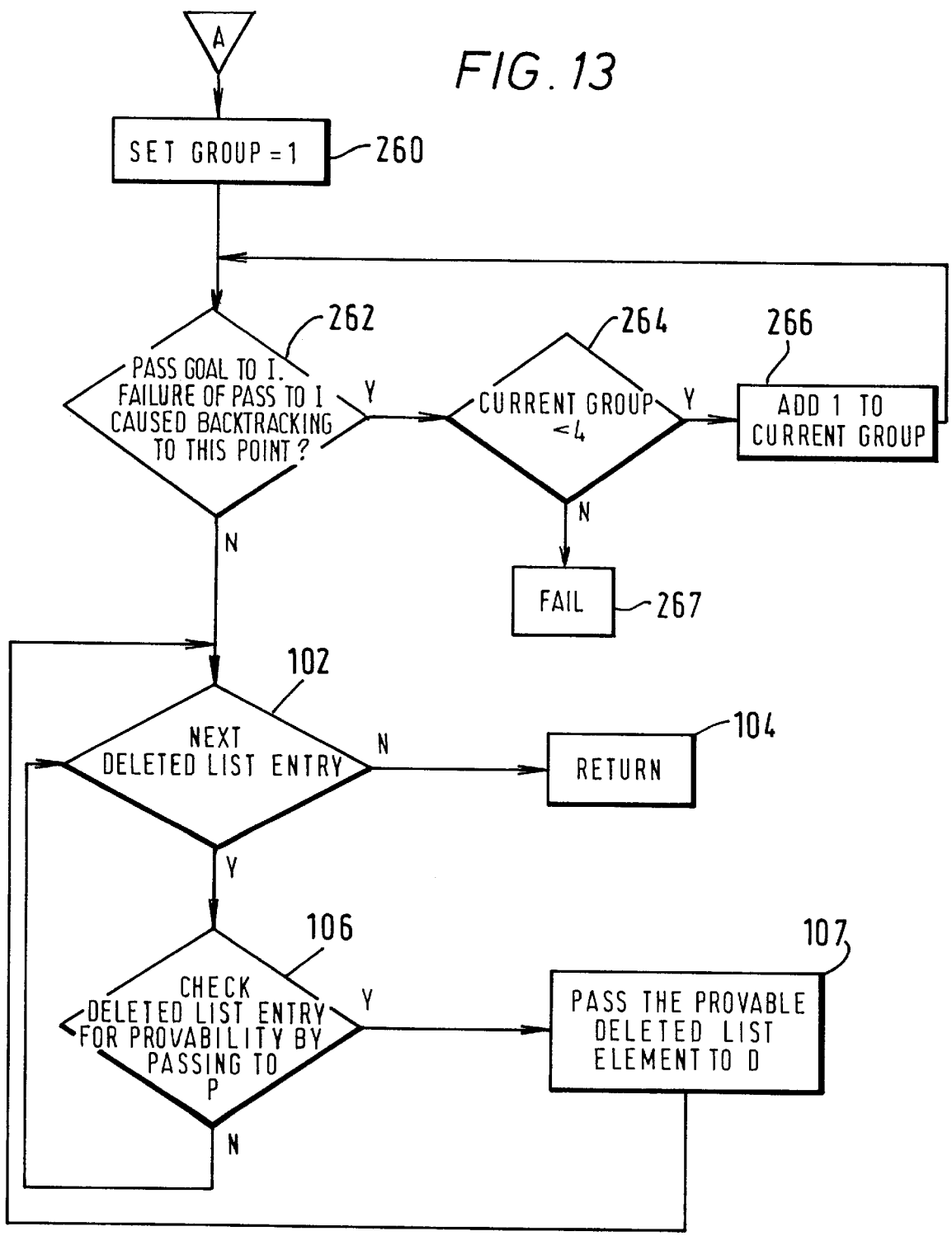
FIGS. 13 and 14 are diagrams illustrating the functions of a modification to the reasoner program represented in FIGS. 5 to 12.

FIG. 13 is similar to FIG. 5 and illustrates a modification to the abduce module 72 for grouping solutions in this way. Those steps in FIG. 13 which are the same as corresponding steps in FIG. 5 are identified by the same reference numerals and the same descriptive matter and need not be described further.

Step 100 of FIG. 5 is omitted from the modification shown in FIG. 13 and, instead, the first step performed by the abduce module shown in FIG. 13 upon receipt of a goal is to set a group identifying variable to the value "1" at step 260 which, as will be explained, has the effect of causing the abducer to fail any solution requiring a hypothetical change in the knowledge base. Thus, at step 262, the insert module 73 is called and, following processing of the goal in the manner described above with reference to FIGS. 6 to 12, but with some modifications to the steps of FIG. 12 to be described with reference to FIG. 14, either that processing will be successful or, if it fails, backtracking to step 262 will take place. Assuming, firstly, that the process has been successful and step 262 results in the finding of a purely deductive proof, processing moves to step 102 and (since there are no entries on the deleted list in this example) to step 104 at which processing returns to step 262 to search for further deductive proofs.

If no deductive proofs are found or after all deductive proofs have been found, the processing following the passing of the goal to the insert module at step 262 will result in a failure (as will be described with reference to FIG. 14) and backtracking to step 262 will take place. Processing then moves to step 264 at which the group identification variable is checked to see whether there are any further groups to be processed and, if so, processing moves to step 266 where the group identification number is incremented by 1. Processing then returns to step 262 for the processing of the remaining groups of solutions.

Figure 14:
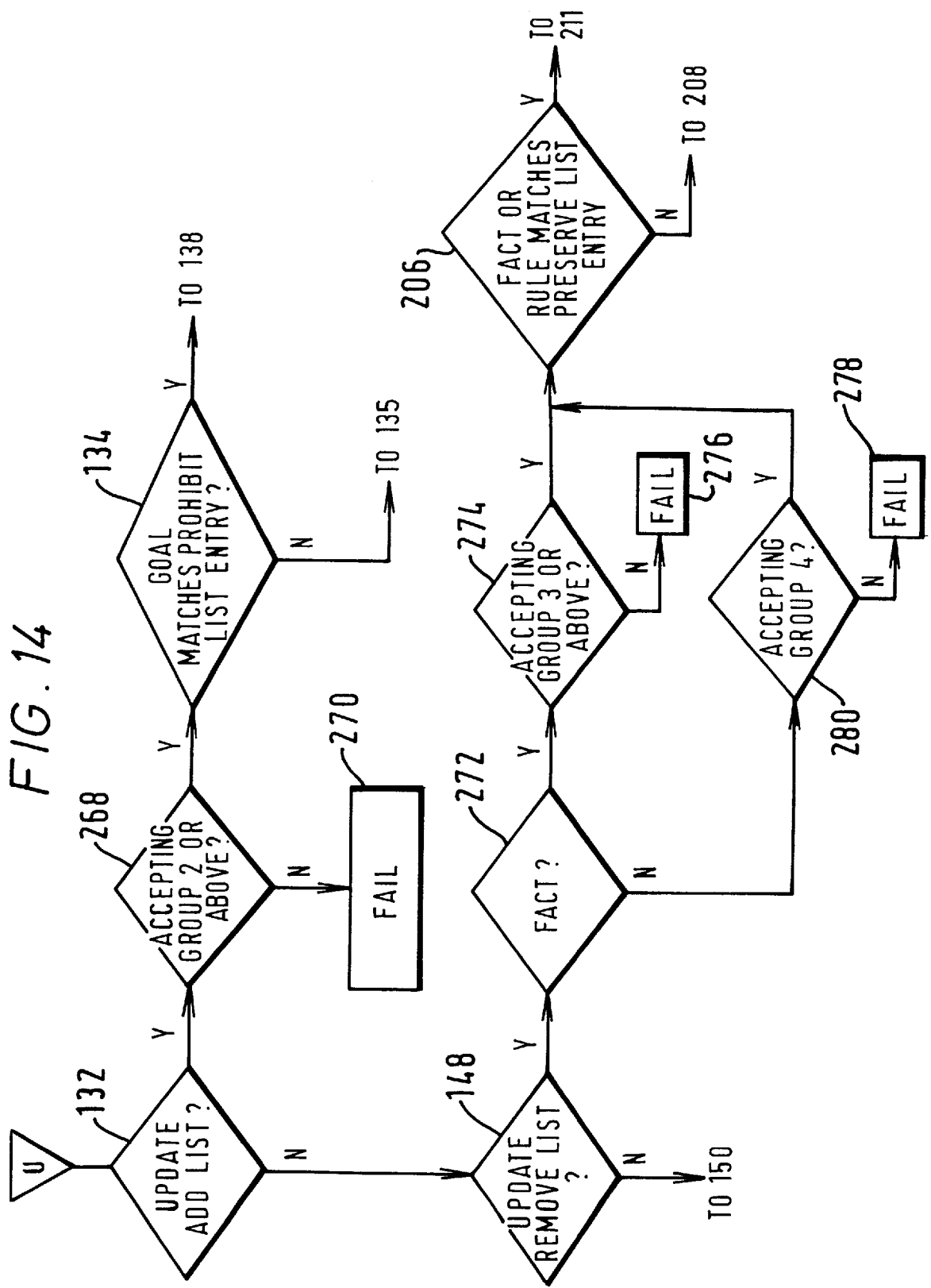

The modification to the update module 76 which achieves the above, in this modified embodiment, is illustrated in FIG. 14 which shows only the modified branches of the chart of FIGS. 12(a) and 12(b). As seen in FIG. 14, decision 268 is inserted between decisions 132 and 134 so that, when an attempt is made to add a fact to the add list 77, decision 268 determines whether or not the group identifying variable has been set to a value of 2 or more. If not ie. processing of group 1 (deductive solutions) is taking place, the solution being processed fails at step 270 and backtracking to the last choice point takes place.

Decisions 272 and 274 are also inserted in FIG. 12(a), between decisions 148 and 206. As previously described, processing arrives at decision 148 whenever a fact or a rule is to be added to the remove list. In this modification, therefore, decision 272 determines whether it is a fact which is to be added to the remove list and, if so, processing moves to decision 274 where it is determined whether processing of group 3 solutions is permitted. If not, processing fails at step 276. If so, processing continues to step 206 and subsequent steps as previously described.

If decision 272 indicates that it is not a fact which is to be added to the remove list, this means that it is a rule which is to be added to the remove list ie. a rule to be deleted hypothetically from the knowledge base, and processing moves to decision 278 where it is determined whether group 4 solutions are being processed. If not, processing fails at 280 and if so, processing moves again to decision 206 and subsequent steps. Failure at step 276 or step 280 results in backtracking to the last choice point.

It will thus be seen from FIG. 14 that if only group 1 solutions are being processed, failure will arise at step 270 when there is an attempt to add a fact hypothetically to the knowledge base.

If group 2 solutions are being processed, facts may be added, with processing moving from step 268 to step 134 and subsequent steps as previously described but any attempt to remove a fact or rule from the knowledge base will fail as a result of steps 272, 274, 276, 278 and 280.

If group 3 solutions are being processed, failure will not arise at step 270 or step 276 but an attempt to remove a rule hypothetically from the knowledge base will result in failure at step 280.

If group 4 solutions are being processed, there will be no failure at step 270, 276 or 280.

It will be understood from consideration of main rules 1 to 6 of Table 1 above that in that example, none of the goals failure-recovery (1) to failure-recovery (4) can be processed successfully by deductive reasoning only since in this example it is necessary for the final premise of each of those rules to be added to the add list in order to obtain a solution. This is because none of those final premises can exist in the knowledge base (see Table 3). However, in a practical system, where there will be many more rules, it is to be expected that there will be included various rules which can be deductively proved from facts which are permitted to be stored in the knowledge base and thus in practice the processing of group 1 solutions by this modification may be advantageous.

The reason why the final premises of rules 1 to 6 are not permitted to be inserted in the knowledge base will be understood from the description of the diagnostic and control program 68.

Further Modified Abducer Program

The modified abducer program as described above with reference to FIGS. 13 and 14, groups finding all solutions in group 1 before attempting any solution in group 2 and so on. However, it may be desirable to find some types of solution within any group before attempting other solutions within the same group.

Figure 15:
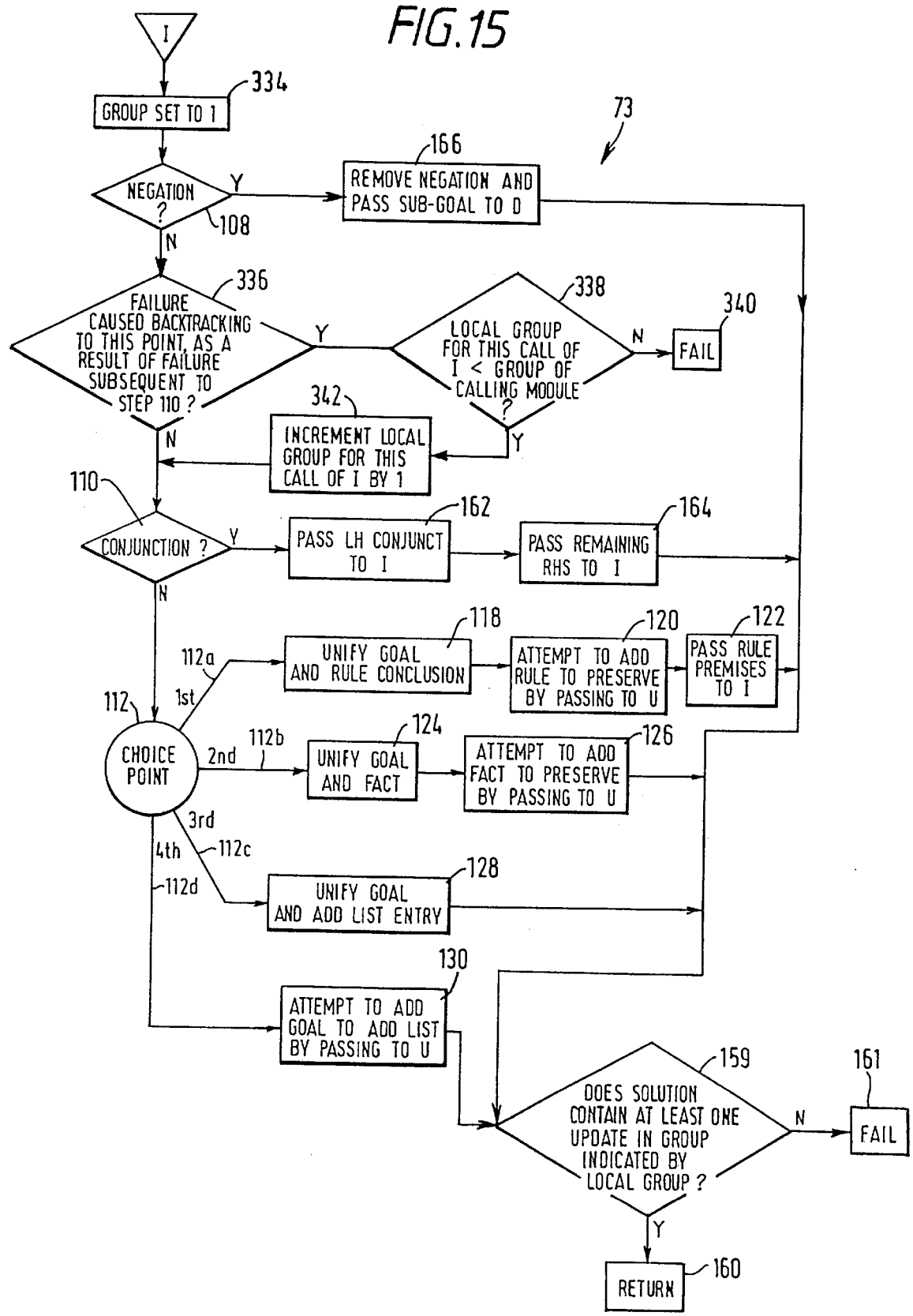
FIGS. 15 to 17 are diagrams illustrating the functions of a further modification to the reasoner program represented in FIGS. 5 to 12.
Figure 16:
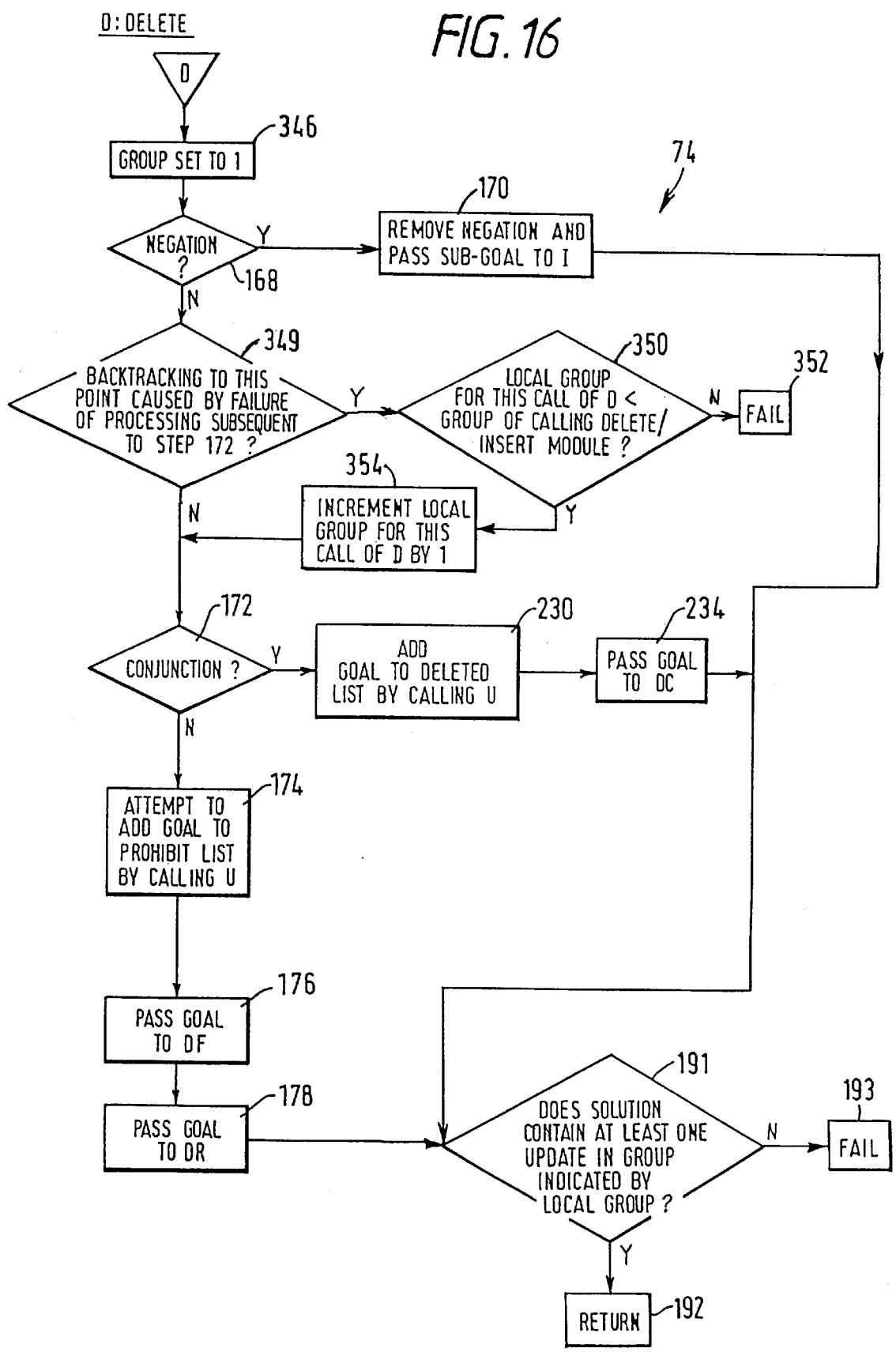
Figure 17:
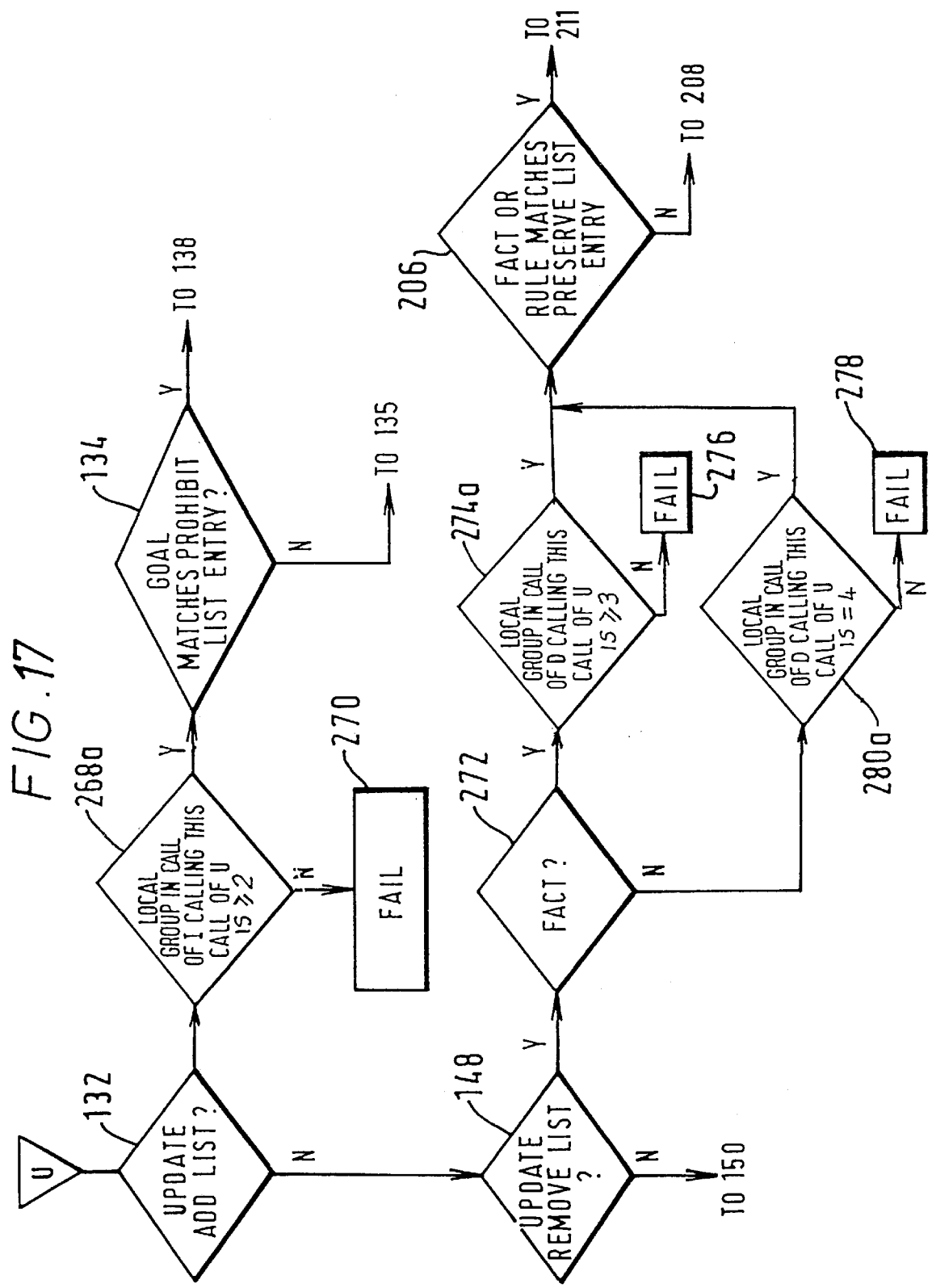

For example, a group 4 solution may hypothesised the removal of a single rule and ten facts from the knowledge base, whereas another group 4 solution may hypothesised the removal of two or more rules. Both solutions could have the same cost (using the cost function from the main embodiment described above) but the solution involving a single rule removal may be preferred. Similarly, a group 4 solution may hypothesised the removal of one rule and the addition of a hundred facts, whereas another group 4 solution may hypothesised the removal of one rule and ten facts. Even though both solutions have the same number of group 4 updates (ie. each involves removal of only one rule), the first solution may be more desirable since it has fewer hypothesised updates in the higher groups than the second solution. FIGS. 15 to 17 illustrate respectively modifications to the insert, delete and update modules which are such that at each call of the insert and delete modules when processing group 2, 3 or 4 solutions, those solutions having the fewest updates in the higher groups are attempted before solutions with more updates in those higher groups thereby reducing the number of hypothetical changes at particular levels. Thus, (1) at each call of the insert or delete module when processing group 4 solutions, that call will firstly try to find solutions in which the subsequent processing involves no hypothetical changes, then try to find solutions in which one or more facts are hypothetically added to the knowledge base but no other types of hypothetical change are permitted, then try to find solutions in which one or more facts are hypothetically removed from the knowledge base and in which hypothetical addition of facts to the knowledge base is permitted but hypothetical removal of rules is not permitted and, lastly, try to find solutions in which one or more rules are hypothetically removed from the knowledge base and in which hypothetical addition and removal of facts is also permitted;

(2) at each call of the insert or delete module when processing group 3 solutions, that call will firstly try to find solutions in which the subsequent processing involves no hypothetical changes, then try to find solutions in which one or more facts are hypothetically added to the knowledge base but no other types of hypothetical changes are permitted, and lastly try to find solutions in which one or more facts are hypothetically removed from the knowledge base and in which hypothetical additions to the knowledge base are permitted but hypothetical removal of rules is not permitted; and (3) at each call of the insert or delete module when processing group 2 solutions, that call will firstly try to find solutions in which the subsequent processing involves no hypothetical changes and then try to find solutions in which one or more facts are hypothetically added to the knowledge base but no other hypothetical changes are permitted.

To achieve the above, the insert module is modified by the addition of steps 334 to 342 and steps 159 and 161 as shown in FIG. 15, the delete module is modified by the addition of steps 346 to 354 and steps 191 and 193 as shown in FIG. 16 and the modified update module of FIG. 14 is further modified by the replacement of steps 268, 274 and 280 by steps 268(*a*), 274(*a*) and 280(*a*) respectively. The remainder of the insert, delete and update modules are as previously described.

At step 334 in the modified insert module shown in FIG. 15 a local group variable is set to the value "1" whenever the modified insert module is called. When this variable has been set, processing continues at step 108 which has been previously described. Step 336 in FIG. 15, which follows the "NO" output of step 108, determines whether this particular point has been reached as a result of backtracking due to failure in processing subsequent to step 110 in FIG. 15 (step 110 being as previously described). If the update module is called as a consequence of any of steps 130, 126 or 120 of the modified insert module of FIG. 15, step 268(*a*) determines whether the value of the local group variable of the call of the insert module which has called the update module is greater than or equal to 2 and, if not, processing will fail at step 270.

If a failure causes backtracking to step 336, processing moves to step 338 at which it is determined whether the value of the local group variable for this call of insert is less than the value of the group variable of the module which has made this call of insert. Thus, if this call of insert was made by the abduce module, the comparison at step 338 is with the current value of the group variable as set at step 260 or step 266 in FIG. 13. Similarly if this call of insert was made from an earlier call of insert (ie. from one of steps 162, 164 or 122 of that earlier call of insert), then the comparison at step 338 is with the local group variable of that earlier call of insert. Further, if the current call of insert has been made from an earlier call of delete, then step 338 determines whether the current value of the local group variable of this call of the insert module is less than the value of the local group variable (to be described later) of the call of delete which has called insert.

If step 338 determines that the current value of the local group variable of the call of insert being processed is less than the group variable or local group variable (as the case may be) of the module (abduce, insert or delete) from which the current call of insert was made, the value of the local group variable of the current call of insert is incremented by 1 at step 342 and processing again continues from step 110. If not, processing moves from step 338 to step 340 at which failure takes place. Thus, in this embodiment, the value of the local group variable of the insert module is permitted to be incremented up to but not beyond the value of the group variable or local group variable of the module (abduce, insert or delete) which made the call to insert.

Thus, if the value of the local group variable of the call of insert calling update is "1", facts may not be added to the add list. If the value is "2" or more, fact may be added to the add list.

Decision 159 in FIG. 15 is inserted before return step 160 to prevent the insert module shown in FIG. 15 returning solutions when the local group variable is set to a higher value than 1 which have already been returned when the local group variable is set to a lower value. Thus, before processing can move to the return step 160 subsequent to any of steps 122, 126, 128 and 130 in FIG. 15, a decision is taken at step 159 to determine whether the current solution being processed contains at least one update in the group indicated by the current value of the local group variable. If the result of decision 159 is NO, the solution fails at step 161 but otherwise proceeds to return step 160. Thus, when the local group variable is set at "2" processing will fail at step 161 unless the current solution involves the hypothetical addition of at least one fact, if the group variable is set at "3" processing will fail at step 161 unless the current solution involves the hypothetical removal of at least one fact and if the local group variable is set at "4" processing will fail at step 161 unless the current solution involves the hypothetical removal of at least one rule.

Whenever the modified delete module of FIG. 16 is called in this embodiment, the first step is to set its local group variable (referred to briefly above) to the value "1". This is shown by step 346 in FIG. 16. Processing then moves to step 168 which has been previously described and, assuming the goal is not negated, processing moves to step 348 where it is determined whether this point has been reached as a result of backtracking caused by failure of processing subsequent to step 172. If not, processing moves to step 172 and subsequent steps as previously described. However, if update is called by the modified delete module of FIG. 16 as a consequence of any of steps 174, 176, 178, 230 or 234 thereof, the modified steps of the update module as shown in FIG. 17 are utilised. In FIG. 17, step 274(a) will determine whether the value of the local group variable of the call of the delete module which has called the update module is greater than or equal to 3. If not, processing will fail at step 276 since the removal of facts is prohibited for the time being. If the result of step 274(a) is a positive decision, indicating that the removal of facts is not for the time-being prohibited, processing moves to step 206 previously described.

Similarly, step 280(a) in FIG. 17 determines whether the current value of the local group variable of the call of insert which has called update is equal to 4. If so, processing is permitted to move to step 206 since for the time-being rules may be removed. If not, processing fails at step 278 since for the time-being rules may not be removed.

If there is backtracking to step 348 due to a failure in processing subsequent to step 172, processing then moves to step 350 and thereafter either to step 352 or 354 which are similar to steps 340 and 342 of FIG. 16. Thus, at step 350, it is determined whether the current value of the local group variable of the current call of delete is less than the local group variable of the module (which can only be delete or insert) which has called delete. If the result of step 350 is positive, the value of the local group variable of the current call of delete is incremented by 1 at step 354 and processing again continues from step 172. If the result of step 350 is negative, processing fails at step 352.

Thus, if the value of the local group variable of the call of delete which calls update is less than "3", neither facts nor rules may be deleted. If this value is "3" facts but not rules may be deleted. If it is "4" facts and rules may be deleted.

The effect of steps 348, 350, 352 and 354 in FIG. 16 is that the value of the local group variable of the current call of delete can be incremented up to but not beyond the value of the local group variable of the module (delete or insert) which has made the current call of delete. The overall results of the modification of FIGS. 15 to 17 is that, assuming deletion of rules is considered more costly than removal of facts which in turn is considered more costly than addition of facts, solutions involving the lowest possible number of more costly changes are returned before other solutions.

Decision 191 which is inserted in the delete module of FIG. 16 prior to the return step 192 as shown in FIG. 16 and fail step 193 also shown in FIG. 16 operate in precisely the same way as steps 159 and 161 in FIG. 15 and accordingly need not be described further.

ADDITIONAL MODIFICATIONS TO THE ABDUCER PROGRAM

The abducer program of the main embodiment as described above with reference to FIGS. 4 to 12, is able to prove a goal or sub-goal of the following four types:

(1) Positive literals;
(2) Positive conjunctions;
(3) Negative literals; and
(4) Negative conjunctions (ie. negated conjunctions).

As well as processing conjunctions it may, in some applications, be desirable to prove goals or sub-goals which are in the form of disjunctions. This would permit both input goals or sub-goals containing disjunctions to be proved against knowledge base rules which also contain disjunctions. The following are examples of disjunctions:

(i) p1 (x1,y1) or p2 (x2,y2)
(ii) not p1 (x1,y1) or p2 (x2,y2)
(iii) p1 (x1,y1) or not (p2 (x2,y2) or p3 (x3,y3))

As with conjunctions, disjunctions may include positive or negative literals, positive or negative conjunctions and further disjunctions. Conversely, conjunctions may also include disjunctions as well as literals and further conjunctions.

In order to prove a positive disjunction (ie. a disjunction which is not negated), the disjunction must be divided into its constituent disjuncts and at least one of the disjuncts must be proved. In the case of a negative disjunction (ie. a disjunction which is negated), again the disjunction must be divided into its constituent disjuncts but each disjunct must be disproved in order to prove the negative disjunction as a whole.

Figure 18:
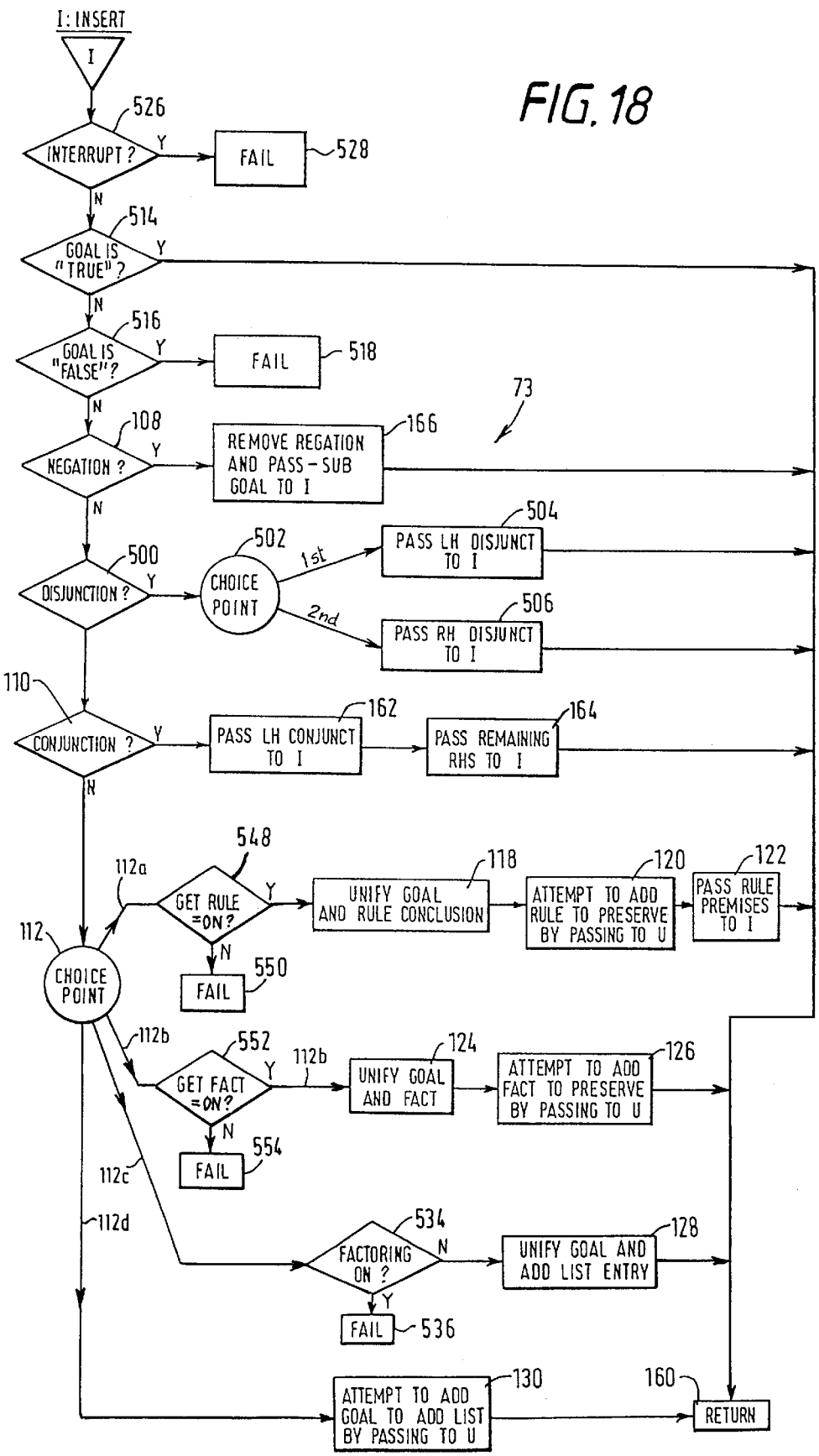
FIGS. 18 to 20 are diagrams illustrating the functions of additional modifications to the reasoner program represented in FIGS. 5 to 12.
Figure 19:
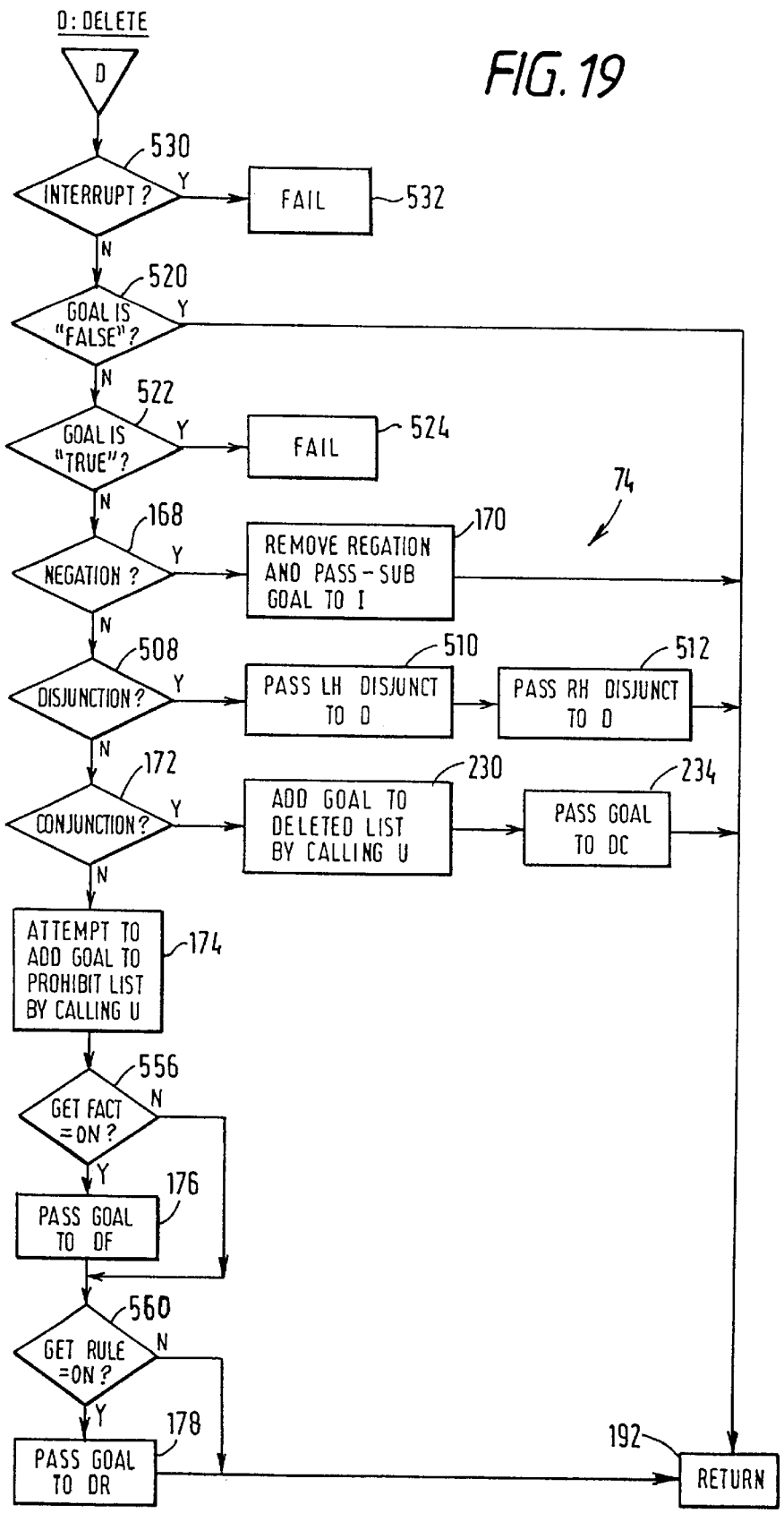

To achieve the above, the insert module is modified by the addition of step 500 to 506 as shown in FIG. 18 and the delete module is modified by the addition of steps 508 to 512 as shown in FIG. 19. Except for the additional steps 514 to 546, which will be described later, the remainder of the insert and delete modules are as previously described with reference to FIGS. 4 to 12.

Step 500 in the modified insert module shown in FIG. 18 detects goals which are positive disjunctions and when such a goal is detected by step 500, processing moves to choice point 502 where the path marked "1st" is taken to step 504. The effect of step 504 is to make a further call of the insert module 73 so that the first disjunct of the positive disjunction, is processed, depending on whether it is a literal, conjunction, or disjunction, in the manner described above. After the processing of the first disjunct, the processing returns to step 504. If the proving of the left-hand conjunct has been successful then processing moves to return step 160 and the processing returns to the appropriate point in a previous call.

If the attempt at step 504 to prove the left-hand disjunct has been unsuccessful then processing will backtrack from step 504 to choice point 502 and then proceed along the path marked "2nd" to step 506. At step 506 a further call of the insert module 73 is made so that the remainder of the disjunction, ie. the right-hand disjunct, is processed in the manner described above depending on whether it is a literal, conjunction, or disjunction. When the call of the insert module 73 returns the processing to step 506 then, if the right-hand disjunct has been proved, processing moves to return step 160 and processing is returned to the appropriate point in a previous call. If the right-hand disjunct has been unprovable then processing will fail in the call to the insert module 73 and processing will backtrack from step 506 back through steps 502 and 500 back to the last choice point in the manner described above with reference to FIGS. 4 to 12.

Step 508 in the modified delete module shown in FIG. 19 detects negative disjunctions and when such a goal is detected processing moves to step 510. The effect of step 510 is to make a further call of the delete module 74 so that the first disjunct of the negative disjunction is processed depending on whether it is a literal, conjunction, or disjunction in the manner described above. After the processing of the first disjunct in this way, the remaining disjuncts are processed one at a time in the same way by further calls of the delete module 74 at step 512. It will be appreciated from the description so far given of the calls of the delete module 74 and from consideration of the description of abductive reasoning with reference to the rules and facts set out in the above table, that at any given time a given call of the delete module 74 may have resulted in a further call of that module before the processing of the first call has been completed and so on and, after the completion of the processing of the last call, the return step 192 returns to processing to the appropriate point in the previous call.

It may also be desirable to be able to process particular predefined goals in a particular manner. For example, the goals "true" and "false" can be used to denote a goal which is always provable or always unprovable respectively. These goals are desirable when building or testing a new knowledge base or may occur in the fact or rules of a knowledge base. It would also be desirable that the goal "not true" is always unprovable and the goal "not false" is always provable.

To achieve the above, the insert module is modified by the addition of steps 514 to 518 as shown in FIG. 18 and the delete module is modified by the addition of steps 520 to 524 as shown in FIG. 19. Step 514 of FIG. 18 has the effect of detecting whether a goal is "true" and if so processing moves to the return step 160 and then returns to the appropriate point in the previous call. If the goal is not recognised by step 514 the processing moves to step 516 which, if the goal is "false" has the effect of causing processing to move to step 518 where the processing fails and backtracking occurs.

Steps 520, 522 and 524 as shown in FIG. 19 are the converse of steps 514, 516 and 518 as described above with reference to FIG. 18. Step 520 has the effect of making it impossible to disprove the goal "not false" by passing processing to return step 192 from which it returns to the appropriate point in the previous call. Step 522 detects whether the goal is "true" and if so, has the effect of moving processing to step 524 where processing fails and backtracking occurs, thereby making it always possible to disprove the goal "not true".

Another modification contained in the insert and delete modules of FIGS. 18 and 19 permits the abducer program to detect whether or not an interrupt has been signalled. Interrupts can be used to stop the processing of the abducer in the situations where further solutions are not required or are undesirable.

To achieve the above, the insert module is modified by the addition of steps 526 and 528 as shown in FIG. 18 and the delete module is modified by the addition of steps 530 and 532 as shown in FIG. 19. Steps 526 and 530 have the effect of checking, each time a call is made of the insert module 73 or the delete module 74, whether an interrupt has been signalled to the abducer program 70. If an interrupt has been signalled, processing moves to the corresponding step 528 or 532 where the processing is forced to fail. Consequently any further calls of the insert or delete module will also fail causing processing to backtrack and eventually return the solution to date.

Some applications of the abducer program may include knowledge bases and input goals made up of predicates with arguments, one of the arguments of which is used to uniquely identify that particular instance of the predicate. In such applications, it is important that before a fact is added to the hypothetical knowledge base, a check is made first to establish whether the variable of the fact by which it is uniquely identified does not already exist in the hypothetical knowledge base. In the event of it existing, each fact in which it existed would have to be deleted from the hypothetical knowledge base before the addition of the particular fact. This procedure will maintain the uniqueness of the argument by which a predicate is identified. One example of a system in which this modification may be used is a natural language analysis system where each predicate has a first argument which is used as the eventuality argument and represents eventuality of the state, event or process represented by the predicate. For example, the predicate photocopier (e,machine-x)

can be used to represent the fact that machine-x has the quality (state) of being a photocopier. The first argument, the eventuality argument, can now be used to indicate the time at which the machine-x gained the qualities of being a photocopier, i.e. the event which created the machine which is a photocopier, eg.

photocopier (e,machine-x)
and created (x,e,20/5/89)

This representation allows the abducer program 70 to carry out reasoning with the above information without the need to modify the abducer program to be able to process higher-order logical representations such as created (photocopier(e,machine-x),20/5/89)

Since every event is unique, it is important to maintain this uniqueness in the knowledge base during reasoning.

Figure 20:
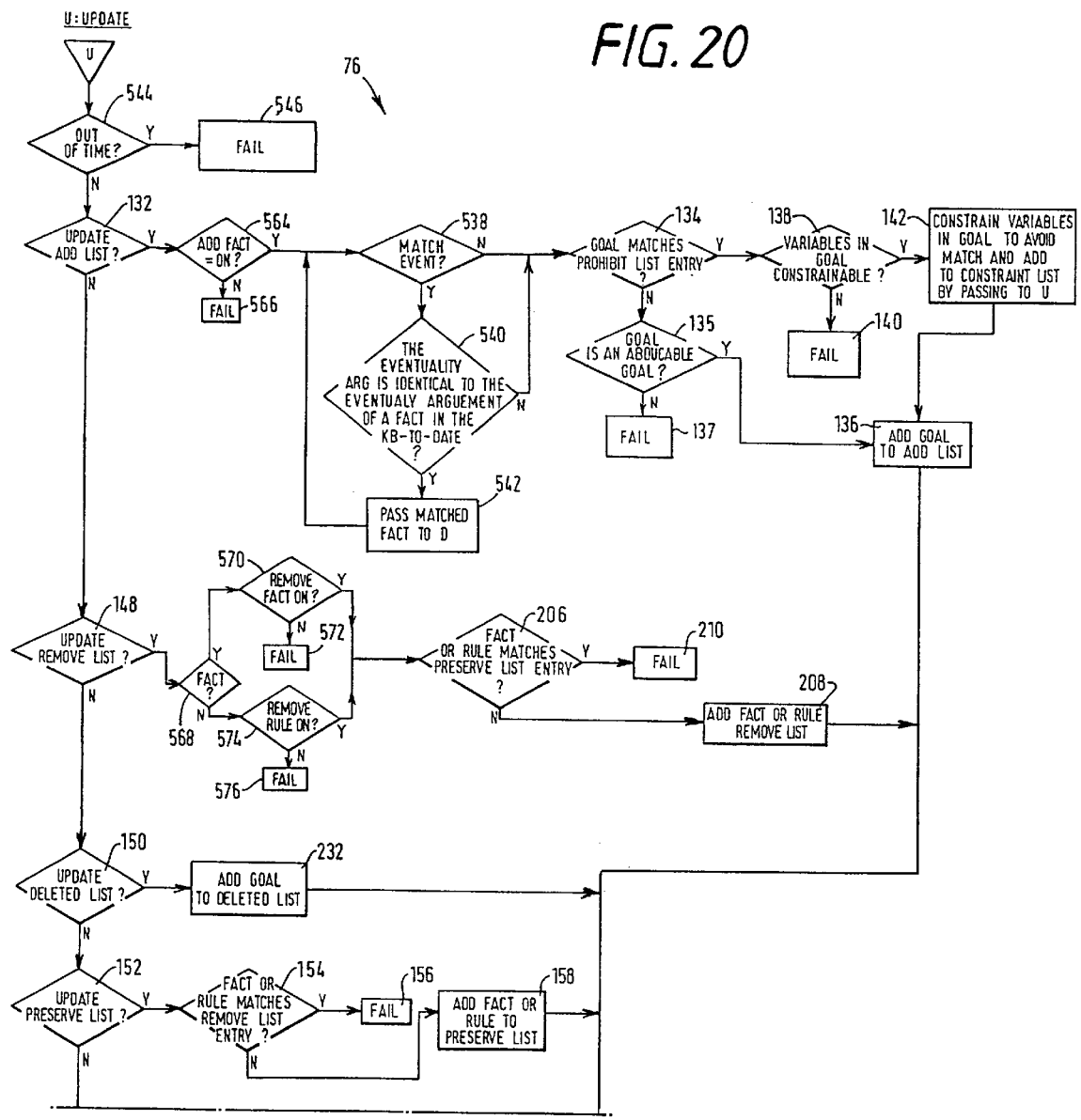

To achieve the above, the update module is modified by the addition of steps 538, 540 and 542 as shown in FIG. 20. The remainder of the update module, except for steps 544 and 546 which will be explained later, are as previously described with reference to FIGS. 4 to 12 for the main embodiment of the abducer program 70.

When the insert module 73 calls the modified update module to update the add list 77, this is recognised at step 132 and processing moves to step 538 of the modified update module shown in FIG. 20. At this step a check is made to determine whether the feature provided by the modification is to be used and, if so, processing moves to step 540. At this step a check is made in the hypothesised knowledge base for any occurrence of a fact with an eventuality argument which is the same as the eventuality argument of the fact to be added to the add list. If no match is made then processing moves to step 134 and continues as described above for the main embodiment with reference to FIGS. 4 to 12. If a match is found, processing moves to step 542 where the fact with the matched eventuality argument is passed to the delete module 74 so that it is removed from the knowledge base. When processing returns from the delete module to step 452, processing moves back to step 540 via step 538 to check for further occurrences of the eventuality argument in the hypothesised knowledge base. This process continues until no further matches are found when processing moves from step 540 to step 134 and processing continues as described above.

A further feature which is provided by the modified update module shown in FIG. 20 is provided by steps 544 and 546. The steps have the effect of checking, each time the update module is called, whether a predetermined time limit has expired. If the time limit has expired, this is detected when processing moves to step 544 and has the effect of causing processing to move to step 546 where processing is forced to fail. Consequently, any further calls of the update module will fail, having the effect of preventing any further updates to the hypothesis history and causing processing to backtrack and return the solution to date.

DIAGNOSTIC AND CONTROL PROGRAM

As seen in FIG. 22, the diagnostic and control program 68 comprises a control module 282 which is called up on receipt by the diagnostic and control system 11 of signals from the interface 14 and is operative, with the assistance of four look-up tables 284, 286, 288 and 290 labelled LUT 1 to LUT 4 respectively, to convert failure signals received from the interface 14 to goals, to pass those goals to the reasoner 69, to receive hypothesis histories from the reasoner 9 following abductive reasoning, to send back to interface 14 control signals dependent upon the received hypothesis histories and to modify the knowledge base 67 dependent upon both the results achieved (if any) by the sending of control signals to the copier 10 and dependent upon the received hypothesis histories. Communication between the diagnostic and control system 11 and the various detectors and actuators in the photocopier 10 will, in a practical machine, be in accordance with a suitable protocol for identifying both the actuators and detectors and for identifying their respective conditions. The derivation of such a protocol is within the competence of those skilled in the art and, since it forms no part of the present invention, need not be described further.

For simplicity, therefore, the origin of signals received by the diagnostic and control unit 11, and the destination of control signals sent thereby, will be indicated simply by using the reference number of the relevant detector or actuator in the photocopier 10 as described above and the status of the signal will be represented simply as a binary "1" or a binary "0".

As previously described, the detectors 63 to 66 detect four different types of failure in the photocopier called herein failures (1) to (4) respectively. Assuming (in accordance with the immediately preceding description) that such detectors output a binary 1 to indicate the occurrence of failure, look-up table 284 has two columns, one of which identifies the origin anfailurus of the failure signals and the other of which defines the corresponding goal to be passed to the abducer, as follows:

| LUT 1 | |
|---|---|
| Failure Signal | Abducer Goal |
| 63/1 | failure-recovery (1) |
| 64/1 | failure-recovery (2) |
| 65/1 | failure-recovery (3) |
| 66/1 | failure-recovery (4) |

Thus it can be seen that if failure (1) occurs, detector 63 provides a binary 1 and control module 282 accesses the first line of LUT 1 to obtain the goal "failure-recovery (1)" and thereupon passes this to the reasoner 69 for processing as previously described. Thus, for this purpose, the control module 282 performs steps 292, 294 and 296 of the routine illustrated in FIG. 16. In practice, this involves applying to the look-up table 284 a binary coded signal which has been received from interface 14 and represents the status of the relevant detectors 63 to 66, and obtaining from the look-up table 284 a further binary coded signal which is in a form to be received by the abducer and which represents the goal to be abduced.

After the reasoner 69 has processed the goal, the resulting hypothesis, which consists of the contents of the add and remove lists 77, 78 is received at step 298 by the control module 282 and processing thereafter moves to step 300 in FIG. 17.

As explained above, the only goals which, in the current example, can be passed to the reasoner 69 by the diagnostic and control program 68 are the goals failure-recovery (1) to failure-recovery (4) and there are six main rules in the knowledge base 67 having conclusions corresponding to these goals. The last premise of each of those rules is indicative of the signalling which may be required to be sent to the photocopier 10 to recover from the different kinds of failure but facts corresponding to those final premises are not, and, in this example, cannot exist, in the knowledge base. Consequently, the result of successful processing any of the goals failure-recovery (1) to failure-recovery (4) will be an entry in the add list 77 corresponding to one of the final premises of rules 1 to 6. These entries are "signalling" commands, added during reasoning and which determine the subsequent internal processing of the computer. Thus, at step 300 in FIG. 17, control module 282 examines the contents of the add and remove list 77, 78 to identify any "signalling" commands. Look-up table 286 is provided for converting any such commands or entries to binary coded control signals to be sent to the interface 14 to actuate one or more of the actuators 41 to 46. Thus, in this simplified example, the contents of look-up table 286 are as follows:

| LUT 2 | |
|---|---|
| "Signalling" Entry from Add or Remove List | Corresponding Output Signal to Actuator |
| (1) signalling (document-receiving-tray (up)) | 41/1 |
| (2) signalling (document-receiving-tray (down)) | 41/0 |
| (3) not (signalling (document-receiving-tray (up))) | 41/0 |
| (4) not (signalling (document-receiving-tray (down))) | 41/1 |
| (5) signalling (engage (drivers)) | 46/1 |
| (6) | 46/1 |

LUT 2

| "Signalling" Entry from Add or Remove List | Corresponding Output Signal to Actuator |
|---|---|
| (7) | 46/1 |
| (8) | 46/1 |
| (9) not (signalling (engage (drivers))) | 46/0 |
| (10) | 46/0 |
| (11) | 46/0 |
| (12) | 46/0 |
| (13) signalling (select-tray (A4, 1)) | 42/1 |
| (14) signalling (select-tray (A4, 2)) | 43/1 |
| (15) signalling (selected-tray (A3, 1)) | 44/1 |
| (16) not (signalling (selected-tray (A4, 1))) | 42/0 |
| (17) not (signalling (selected-tray (A4, 2))) | 43/0 |
| (18) not (signalling (selected-tray (A3, 1))) | 44/0 |
| (19) signalling (developing-apparatus (on)) | 45/1 |
| (20) signalling (developing-apparatus (off)) | 45/0 |
| (21) not (signalling (developing-apparatus (on))) | 45/0 |
| (22) not (signalling (developing-apparatus (on))) | 45/1 |

Thus, the control module 282 accesses the appropriate line of LUT 2 utilising any "signalling" elements in the add and remove lists 77, 78 to obtain both the identity of any actuators to which signals are to be sent and the nature of the signal to be sent ie. whether it is to be a binary 1 or a binary 0 (according to the simplified protocol assumed) to attempt to recover from the failure.

The status of detectors 47, 59, 61 and 62 in photocopier 10 is affected by the conditions of actuators 41 to 46 and thus, if a signal for changing the status of one of those actuators is sent to the photocopier 10 it is to be expected that the relevant one of these detectors will have a correspondingly appropriate status. Look-up table 288 is provided to enable the control module 282 to check this and also to enable the control module 282 correspondingly to modify the knowledge base 67. Look-up table 288 is organised so that each line thereof corresponds to the equivalent line in look-up table 286. Thus, the contents of look-up table 288 are, in this example, as follows:

LUT 3

| "Detecting" Fact to be Added or Removed in KB in Response to Corresponding Detector Input | Corresponding Input Signal from Detector |
|---|---|
| (1) detecting (document-receiving-tray (up)) | 47/1 |
| (2) detecting (document-receiving-tray (down)) | 47/0 |
| (3) not (detecting (document-receiving-tray (down))) | 47/0 |
| (4) not (detecting (document-receiving-tray (up))) | 47/1 |
| (5) detecting (driver-engaged (area 1)) | 59/1 |
| (6) detecting (driver-engaged (area 2)) | 60/1 |
| (7) detecting (driver-engaged (area 3)) | 61/1 |
| (8) detecting (driver-engaged (area 4)) | 62/1 |
| (9) not (detecting (driver-engaged (area 1))) | 59/0 |
| (10) not (detecting (driver-engaged (area 2))) | 60/0 |
| (11) not (detecting (driver-engaged (area 3))) | 61/0 |
| (12) not (detecting (driver-engaged (area 4))) | 62/0 |
| (13) detecting (selected-tray (A4, 1)) | — |
| (14) detecting (selected-tray (A4, 2)) | — |
| (15) detecting (selected-tray (A3, 1)) | — |
| (16) not (detecting (select-tray (A4, 1))) | — |
| (17) not (detecting (select-tray (A4, 2))) | — |
| (18) not (detecting (select-tray (A4, 2))) | — |
| (19) detecting (developing-apparatus (on)) | — |
| (20) detecting (developing-apparatus (off)) | — |
| (21) not (detecting (developing-apparatus (on))) | — |
| (22) not (detecting (developing-apparatus (off))) | — |

The relationship between LUT 2 and LUT 3 can be appreciated by comparing lines of the same numbering from the two tables. For example, line 1 of LUT 2 is signalling (document-receiving-tray (up)), requiring the transmission of a binary 1 to actuator 41 and the first line of LUT 3 indicates that if the document-receiving-tray is up or is moved to the up position as a consequence of the signalling, detector 47 should output a binary 1 indicating that the fact detecting (document-receiving-tray (up)) may be added to the knowledge base.

Thus, step 302 in FIG. 16 is performed by accessing the look-up table 286 and transmitting an appropriate signal to the copier 10 and step 304 is performed by accessing look-up table 288. At step 306, control module 282 determines whether the expected detector output signal obtained from look-up table 288 has been detected and, if so, updates the knowledge base at step 308. Where the first line of each of the tables LUT 2 and LUT 3 has been accessed, this updating will involve adding the fact detecting (document-receiving-tray (up))

to the knowledge base 67, the truth of this fact having been established by the routines just described. If the expected detector output is not detected at step 306, this indicates that there is an error in the operation of the photocopier. This error is logged at step 310. Following step 308 or 310, processing returns via step 312 to step 300 to locate any further "signalling" elements in the add and remove lists 77 and 78.

In LUT 2, those lines beginning with the operator "not" are accessed when signalling entries are found in the remove list 78 whereas those without this operator are accessed in response to signalling entries in the add list 77. The updating of the knowledge base which takes place at step 308 after accessing LUT 3 at step 304 and detecting the expected detector signal at 306, involves removing from the knowledge base facts specified in lines of LUT 3 beginning with the operator "not" (when those lines are accessed as described) and adding to the knowledge base facts not operated upon by such negation when such lines are accessed as described.

After all "signalling" entries in the add and remove lists 77 and 78 have been detected at step 300, processing by the control module 282 moves to step 314 in FIG. 21 at which the add and remove lists 77 and 78 are checked for "detecting" entries. These represent facts hypothetically added to or removed from the knowledge base and control module 282 utilises look-up table 290 to determine whether these facts should actually be added to or actually be removed from the knowledge base 67. Look-up table 290 therefore relates the "detecting" entries which may be contained in the add and remove list 77 and 78 to the output signals of the detectors 47 to 62 which are expected to be received from the photocopier 10 for the respective different "detecting" entries which may be present in the add and remove list 77, 78. Thus, the contents of look-up table 290 may be as follows:

LUT 4

| "Detection Entry from Add/Remove List to be Added or Removed in KB in Response to Corresponding Detector Input | Corresponding Input Signal from Detector |
|---|---|
| detecting (tray-engaged (A4, 1)) | 48/1 |
| detecting (tray-engaged (A4, 2)) | 49/1 |
| detecting (tray-engaged (A3, 1)) | 50/1 |
| not (detecting (tray-engaged (A4, 1))) | 48/0 |
| not (detecting (tray-engaged (A4, 2))) | 49/0 |
| not (detecting (tray-engaged (A3, 1))) | 50/0 |
| detecting (tray-empty (A4, 1)) | 51/1 |
| detecting (tray-empty (A4, 2)) | 52/1 |
| detecting (tray-empty (A3, 1)) | 53/1 |
| not (detecting (tray-empty (A4, 1))) | 51/0 |
| not (detecting (tray-empty (A4, 2))) | 52/0 |
| not (detecting (tray-einpty (A3, 1))) | 53/0 |
| detecting (document-receiving-tray (up)) | 47/1 |
| not (detecting (document-receiving-tray (down))) | 47/0 |
| detecting (paper-present (area 1)) | 54/1 |
| detecting (paper-present (area 2)) | 55/1 |
| detecting (paper-present (area 3)) | 56/1 |
| detecting (paper-present (area 4)) | 57/1 |
| detecting (paper-present (area 5)) | 58/1 |
| not (detecting (paper-present (area 1))) | 54/0 |
| not (detecting (paper-present (area 2))) | 55/0 |
| not (detecting (paper-present (area 3))) | 56/0 |
| not (detecting (paper-present (area 4))) | 57/0 |
| not (detecting (paper-present (area 5))) | 58/0 |
| detecting (driver-engaged (area 1)) | 59/1 |
| detecting (driver-engaged (area 2)) | 60/1 |
| detecting (driver-engaged (area 3)) | 61/1 |
| detecting (driver-engaged (area 4)) | 62/1 |
| not (detecting (driver-engaged (area 1))) | 59/0 |
| not (detecting (driver-engaged (area 2))) | 60/0 |
| not (detecting (driver-engaged (area 3))) | 61/0 |
| not (detecting (driver-engaged (area 4))) | 62/0 |

Lines in LUT 4 beginning with the operator "not" are accessed when the corresponding fact is found in the remove list 78 and the other lines are accessed when the corresponding fact is found in the add list. Thus, this accessing is performed at step 316 in FIG. 21, the corresponding detector signal is obtained and at step 318, the output signals from the corresponding detectors in the photocopier 10 are checked to determine whether the "detecting" facts in the add and remove list are in fact true. If correspondence is found, appropriate changes are made to the knowledge base at step 320 ie. facts which are in the add list but not in the knowledge base are added and facts which are in the remove list but are in the knowledge base are removed. If no correspondence is found at step 318, an error is logged at step 322. Following step 320 or 322 the processing returns through step 324 to step 314 until all "detecting" entries in the add and remove lists have been found. Thereafter, the control module 282 moves from step 326 in FIG. 21 to step 328 in FIG. 22 to look for any rules on the remove list 78. If the abductive reasoning process has resulted in addition of any rules to the remove list, processing moves from step 328 to step 330 at which the corresponding rule is actually removed from the knowledge base and an alarm indication is generated which may be output to display the advice 19, printer 20 and/or display 10A on the photocopier 10 to indicate that the rules contained in the diagnostic and control system 11 for recovering from failure need to be reviewed.

Figure 23:
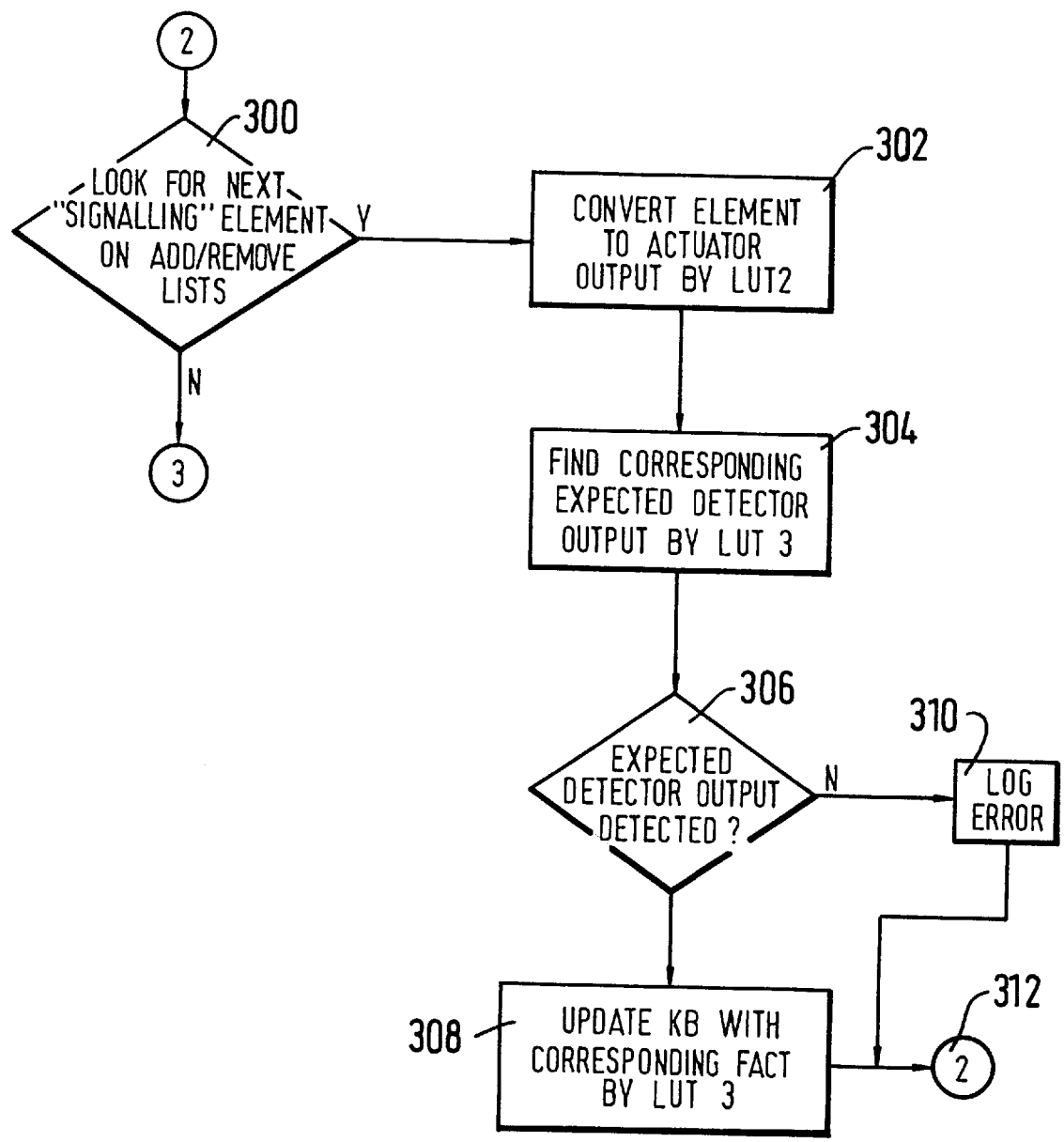

After all such rules have been found at step 3 to 8. processing moves to decision 332 at which control module 212 determines whether the failure signal which had been received from the photocopier 10 has disappeared. If it has disappeared, this indicates that the failure-recovery has been successful and processing returns through step 334 to step 292 in FIG. 16. If the failure signal has not disappeared, indicating that this attempt at recovery has not been successful, step 336 is performed at which all of the changes in the knowledge base made in the processes illustrated in FIGS. 17, 21 and 22 are undone and processing moves through step 338 back to step 294 in FIG. 23 at which the failure signal is again converted to a goal using look-up table 294 and the goal passed again to the reasoner program 69 for a further reasoning operation.

MODIFIED REASONER

FIGS. 26 to 29 illustrate a simplified form of reasoner which, for some applications, may be utilised instead of the reasoner described with reference to FIGS. 4 to 17. However, a number of the features of the reasoner represented in FIGS. 26 to 29 are the same as the reasoner of FIGS. 4 to 17 and such features are identified by the same reference numbers and will therefore not need further detailed description.

Figure 26:
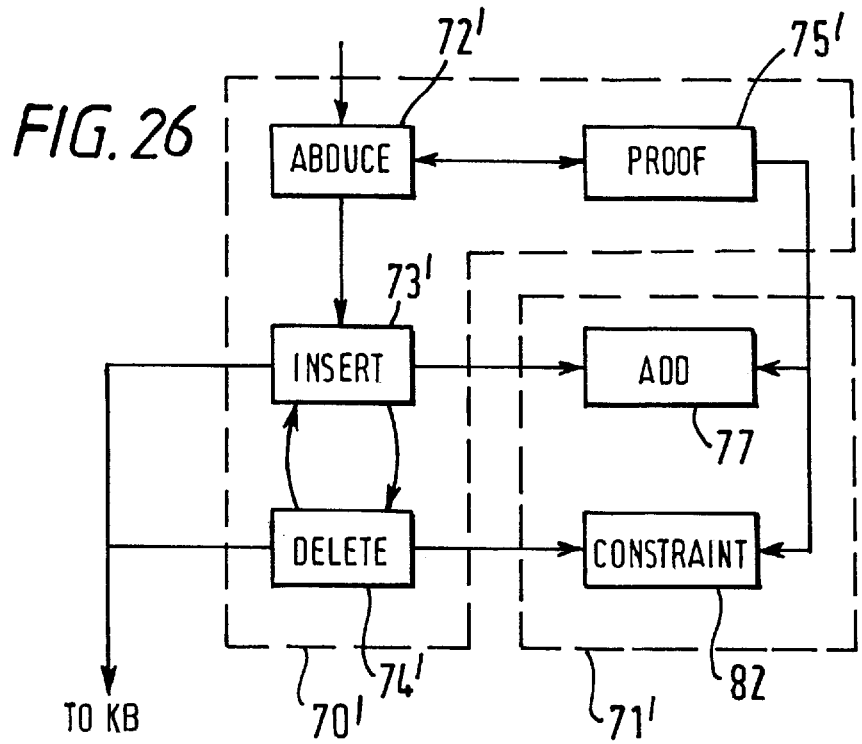
FIGS. 26 and 29 are diagrams illustrating a further modification to the reasoner program of FIG. 3.

FIG. 26 is a diagram similar to FIG. 4 and thus is a block diagram representing the principal elements of the reasoner program according to this embodiment. As shown in FIG. 26, the reasoner program comprises an abducer program 70' and a hypothesis history 71' which are similar to but more simplified than the abducer program 70 and hypothesis history 71 of FIG. 4. Thus, the abducer program 70' comprises an abduce module 72', an insert module 73', a delete module 74' and a proof module 75' which, in this embodiment, is called by the abduce module 72'. The update module 76 of FIG. 4 is omitted. The hypothesis history 71' includes the add list 77 and the constraint data structure 82. The remove, preserve, prohibit and deleted lists 78 to 81 are omitted and the cost variable 83 is also omitted.

Figure 27:
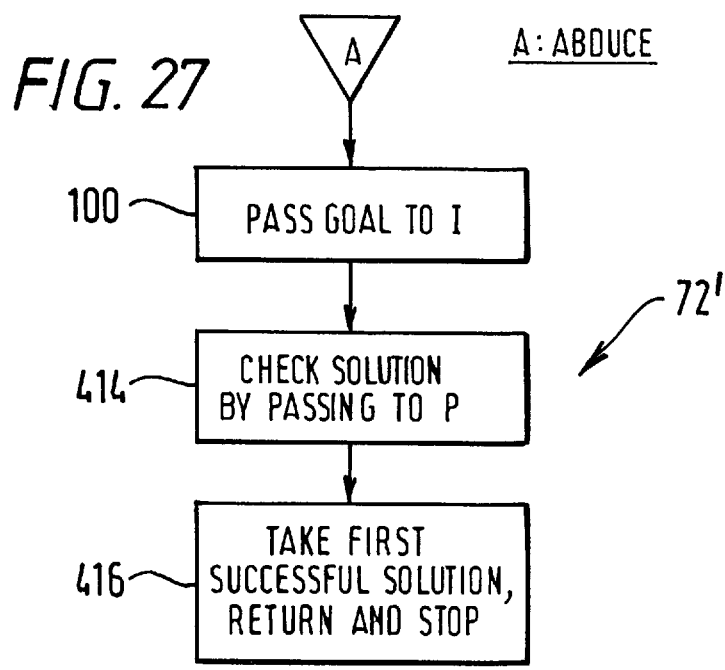
Figure 28:
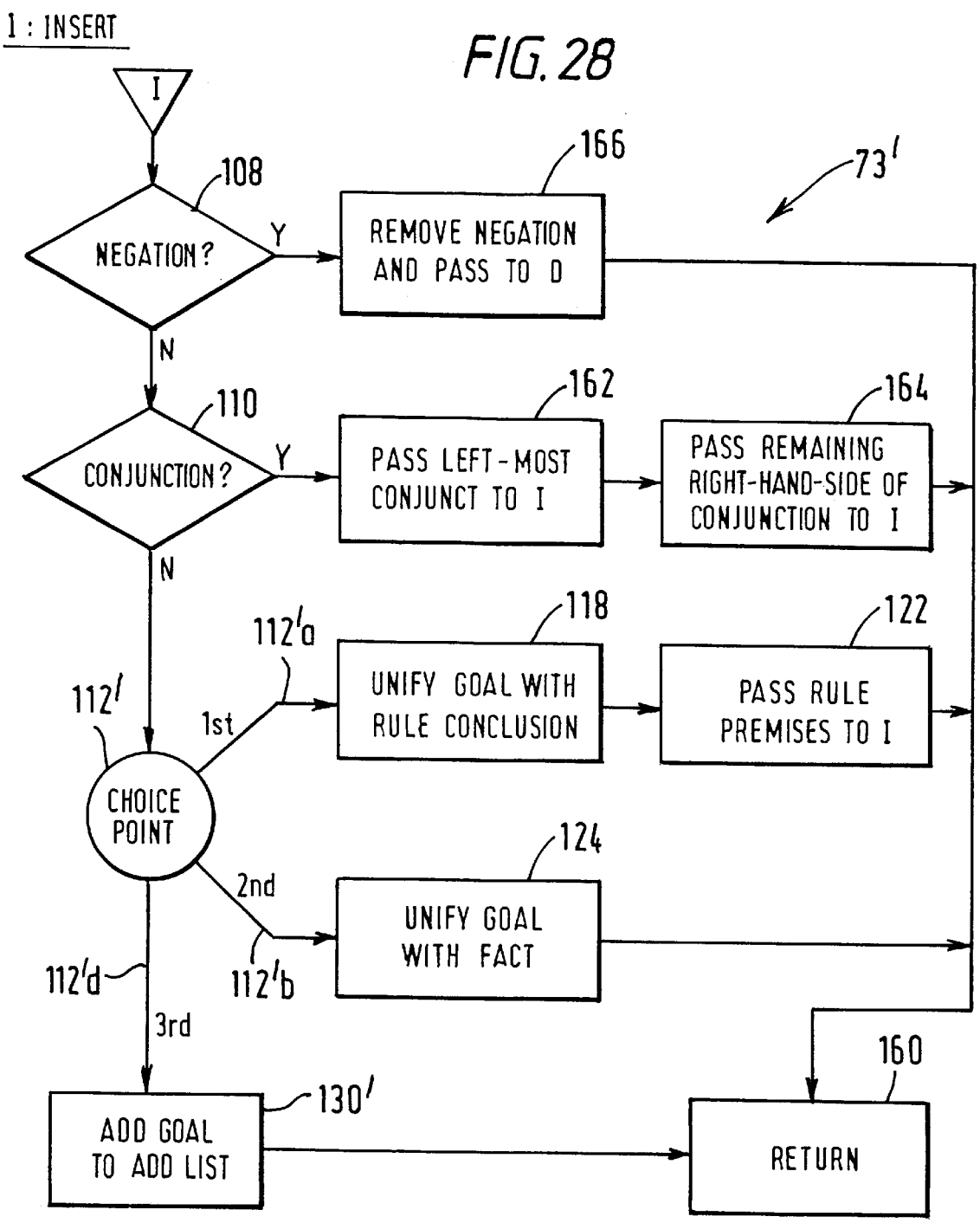

The abduce module 72' is shown in more detail in FIG. 27. Step 100 is as described with reference to FIG. 5 and thus, when a goal is passed to the reasoner from the diagnostic and control program, the abduce module at step 100 passes the goal to the insert module 73' for proof utilising the knowledge base 67. The insert module 73' is shown in more detail in FIG. 28. Those steps which are the same as corresponding steps in FIG. 6 are identified by the same reference numbers and need not be described further and steps 120, 126, 128 and 130 are omitted. In FIG. 28, choice point 112' is the same as choice point 112 except that output path 112(c) is omitted. Step 130' in FIG. 28 is similar to step 130 in FIG. 6 except that, since the update module is omitted from the current embodiment, the adding of the goal to the add list at step 130' is not preceded by any checking for contradictions as in the previously described embodiments. Since, subject to these differences, the insert module 73' operates in a manner similar to the insert module 73 of FIG. 6, further description of FIG. 28 is unnecessary apart from pointing out that the reference to passing the goal to "d" in step 166 is a reference to calling the modified delete module 74' of FIG. 29 and the references to "i" in steps 162, 164 and 122 of FIG. 28 are references to further calls of the modified insert module 73'.

Figure 29:
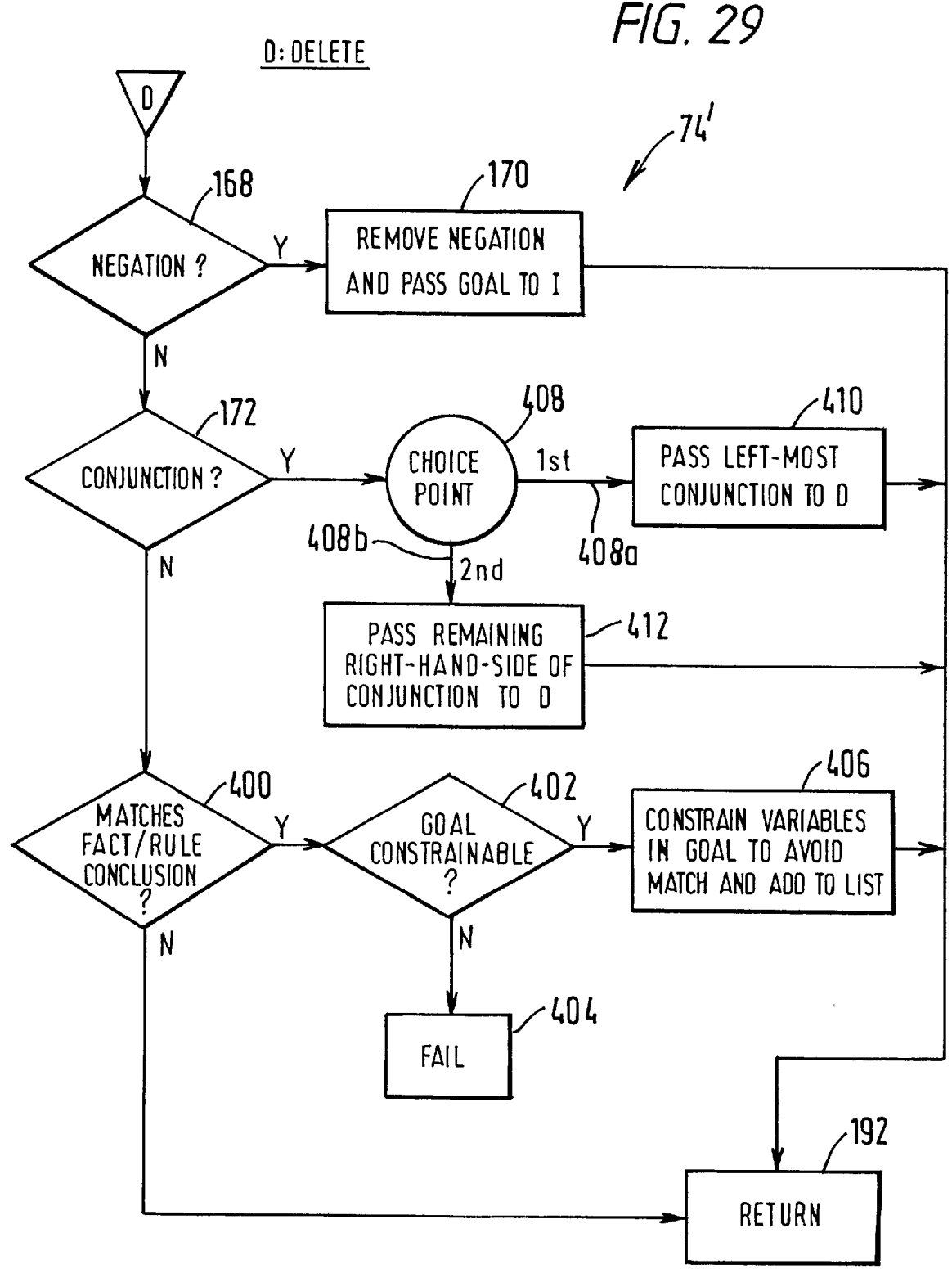

Thus, the modified delete module 74' shown in FIG. 29 is called from step 166 in FIG. 28. In FIG. 29, steps 168, 170, 172 and 192 are as described with reference to FIG. 7. Thus, if the goal or sub-goal passed to the delete module 74' at step 166 is, after removal of the negation, a positive literal, processing moves through steps 168 and 172 to step 400 at which it is determined whether the literal matches a fact or a rule conclusion in the knowledge base. If it does not, processing returns through return step 192 to the point from which the modified delete module 74' was called. If the result of decision 400 is YES step 402 determines whether any variables in the goal or sub-goal can be constrained to avoid unification with the matching fact or rule conclusion in the knowledge base identified at step 400. Thus, step 402 is similar to step 138 or step 186 of FIG. 12(*a*) and FIG. 12(*b*) respectively. If step 402 determines that the goal is not constrainable for the purpose described, processing fails at step 404. If the goal is constrainable, appropriate constraints on the values of the variable are imposed at step 406. Thus, step 406 is similar in this respect to steps 142 and 190 of FIGS. 12(*a*) and 12(*b*) respectively but it should be emphasised that although steps 142 and 190 involve a further call of the update module, there is no such call at step 406 since the update module is omitted from this embodiment. Following step 406, processing continues to the return step 192.

If decision 172 in FIG. 29 determines that the goal is a conjunction, processing moves to choice point 408 which has two output paths 408(*a*) and 408(*b*) respectively. Processing first proceeds along path 408(*a*) to step 410 at which the left-most conjunct is passed to a further call of the modified delete module 74'. If as a result of that further call processing fails at step 404 of that further call, backtracking to choice point 408 takes place and thereafter processing follows path 408(*b*) from choice point 408 to step 412. At step 412, the remainder of the conjunction, that is to say the conjunction without its left-most conjunct, is passed to a further call of the modified delete module 74'. If that call should also result in a failure, backtracking to some previous choice point will take place. If either of steps 410 or 412 does not result in failure, processing moves to the return step 192.

It should be understood that the reference to a further call of the insert module at step 170 in FIG. 29 is a reference to a further call of the modified insert module of FIG. 28.

In the present embodiment, therefore, the insert module 73' may add facts to the add list 77 but there is no checking for contradiction with previous reasoning steps. The delete module 74' cannot, however, hypothetically remove facts from the knowledge base but can only constrain variables to avoid (where this is possible) unification between goals in the form of negative literals and facts or rule conclusions in the knowledge base. Thus, although the modified delete module 74' of FIG. 29 has a number of steps which are similar to those of the delete module shown in FIG. 7, its overall function is somewhat different. As a result, the reasoner of FIG. 26 to 29 can only return abductive proofs involving the hypothetical addition of facts to the knowledge base ie. adding facts to the add list 77 and the constraining of variables. Despite this, such simplified processing may be advantageous in certain applications.

Such processing may involve proofs involving logical contradictions. Accordingly, after a proof has been returned to the abduce module 72', step 14 in FIG. 27 calls the proof module 75' shown in FIG. 26 which deductively tests the goal against the hypothetically updated knowledge base, that is to say the knowledge base with the facts added to the add list 77 and the constraints in the constraint list 82. Since programming for performing deductive proofs is well-known, detail of the module 75' need not be given. If the performance of the proof module 75' is successful, processing moves to step 416 at which the successful solution is returned to the diagnostic and control program 68. The diagnostic and control program for use with the embodiment of FIGS. 26 to 29 may be modified as necessary to be compatible therewith.

OTHER VARIATIONS AND MODIFICATIONS

Numerous variations are possible within the scope of the invention.

For example, the description above has specified the preferred order in which the exit paths from the various choice points are followed in the embodiment disclosed. However, the order in which the paths from the choice points are followed can be different from that shown and, particularly in other embodiments or applications of the invention, the preferred order in which the exit paths are followed may be different from that shown in the drawings. For example, the order of the exit paths specified for the choice points 112 in FIG. 6 will first find solutions using the facts and rules in the knowledge base 67. If, however it is preferable to first find solutions using the hypothetical addition of facts to the knowledge base 67, this can be achieved by taking the exit paths from the choice point 112 of FIG. 6 in a different order from that shown. A preferred order to achieve this would be to follow path 112(*c*) first and then, by backtracking, to follow alternative paths 112(*d*), 112(*b*) and 112(*a*) in this order.

The program as described with reference to FIGS. 4 to 12 above may be modified as shown in FIG. 18 so that the order of the exit paths specified by the choice point 112 can be freely determined by the user, depending on the particular application of the abducer program 70.

A further modification can be made which allows the user to determine whether the abducer is permitted to use entries in the add list 77 to prove a subsequent goal or sub-goal. If the abducer determines that the use of the add list 77 in this way is not permitted, this has the effect of forcing the abducer to produce the more general solutions of those solutions which would be produced otherwise, ie. solutions in which the variables are less likely to have been instantiated to some degree. This modification is called "factoring" and whether or not the abducer program 70 carries out this function can be freely determined by the user when setting up or using the program.

To achieve the above, the insert module is modified by the addition of steps 534 and 536 as shown in FIG. 18. At step 534 the insert module checks wether the user has turned the factoring feature on or off and if the feature is on, processing moves to step 536 where it fails and backtracking occurs. This has the effect of stopping any unification which might otherwise occur at step 128 between the goal and any matching add list entry, thereby avoiding any further instantiation of the variables of the goal. Therefore the resulting solution is more general ie. has more broadly instantiated variables. If, at step 534 the factoring feature is off then processing moves to step 128 and continues as described above for the main embodiment.

In a modification of the factoring feature described above with reference to FIG. 18, the factoring feature is permanently on and the user does not have a choice whether the factoring feature is on or off.

For some applications of the abducer program 70, it may be preferable to carry out reasoning by a different method than the full abductive reasoning as described above with reference to FIGS. 4 to 12. The reasoning method as described above with reference to FIGS. 4 to 12 will, for the purpose of the following description, be called "standard" reasoning. Some further types of reasoning are as follows:

(1) Reasoning in which the facts which are in the knowledge base are not used for the proof of any goal. This method of reasoning will tend to produce solutions which are more general ie. any facts which are needed for the solution must be hypothesised. For the purpose of the following description this method will be called "generic" reasoning.

(2) Reasoning in which none of the facts or rules in the knowledge base are referred to thereby reasoning as if the knowledge base is empty. This method of reasoning will tend to produce even more general solutions than generic reasoning since no instantiation of any variables can occur by reference during reasoning to facts or rules in the knowledge base following description of the following description this method of reasoning will be called "analytic" reasoning.

(3) Reasoning in which no abduction can take place ie. no hypothesising of the removal of facts and/or rules or the addition of facts. This method of reasoning produces solutions based only on the facts and rules in the knowledge base and for the purposes of the following description will be called "deductive" or "contingent" reasoning.

(4) Reasoning in which no additions or removal to or from the knowledge base may be hypothesised and none of the rules in the knowledge base may be used to prove any goal. This reasoning produces solutions which are proved solely by means of the facts in the knowledge base and for the purposes of the following description will be called "factual" reasoning.

(5) Reasoning in which the reasoner can only hypothesised the addition of facts in the knowledge base or prove a goal with respect to the facts or rules contained in the knowledge base. This method of reasoning produces solutions which do not involve the removal of any facts or rules from the knowledge base and for the purposes of the following description will be called "consistent" reasoning.

(6) Reasoning in which the reasoner can hypothesised the addition of new facts to the knowledge base or prove goals with respect to the rules in the knowledge base. This method produces solutions which do not hypothesised the removal of any facts or rules and does not use any of the facts in the knowledge base to prove a goal. For the purposes of the following description, this method will be called "possible" reasoning.

(7) Reasoning which detects tautologies ie. reasoning which only succeeds if the input goal is the tautology, can be carried out by not allowing the abducer to use any of the facts or rules in the knowledge base to prove a goal nor to hypothesised the removal or addition of any facts and/or rules. For the purpose of the following description this method will be called "tautology" reasoning.

The above-mentioned different modes of reasoning depend on which combination of the following five operations the abducer is permitted to carry out, ie.

the hypothetical addition of facts to the knowledge base, the hypothetical removal of facts from the knowledge base, the hypothetical removal of rules from the knowledge base, depending on facts existing in the knowledge base, or depending on rules in the knowledge base.

When the user indicates which mode of reasoning he wishes to permit the abducer to use, the system must enable or disable a predetermined combination of the five above-mentioned operations. To achieve this, the insert module is modified by the addition of steps 548 to 554, the delete module is modified by the addition of steps 556 to 560 and the update module is modified by the steps 564 to 576. Steps 548, 552, 556, 560, 564, 570 and 574 have the effect of switches in the processing which, if switched on have the effect of permitting the abducer program 70 to carry out the corresponding one of the above-mentioned five operations and, if switched off have the effect of not permitting the corresponding operation. These above-mentioned switches are turned on or off in accordance with the following table in accordance with the reasoning mode selected by the user:

| Reasoning Mode | Add Fact | Remove Fact | Remove Rule | Get Fact | Get Rule |
|---|---|---|---|---|---|
| standard | on | on | on | on | on |
| generic | on | on | on | off | on |
| analytic | on | on | on | off | off |
| contingent | off | off | off | on | on |
| factual | off | off | off | on | off |
| consistent | on | off | off | on | on |
| possible | on | off | off | off | on |
| tautology | off | off | off | off | off |

With reference to FIGS. 18 to 20, the way in which processing behaves when it moves to fail steps 550, 554, 566, 572 and 576 will be obvious with reference to the description of previous figures and the processing subsequent to steps 556 and 560 when either switch is off will move past, and thereby not permit processing to move to, step 176 where facts are removed or step 178 where rules are removed respectively as described with reference to FIGS. 4 to 12 above.

The above-mentioned reasoning modes can be used in some applications to find preferred solutions more quickly. If, for example, the abducer is given a goal to prove and the knowledge base contains many facts which can be used to prove that goal and which can be used to prove the premises of the rules, which rules can be used to prove the goal, then this will lead to reasoning in which there is a substantial degree of repetition in the processing as the reasoner tries proving the goal with each possible combination of rules and facts.

The repetition of processing can be reduced and the production of solutions speeded up by the following method:

(a) Selecting the generic mode of reasoning, thereby producing general solutions which do not depend on the facts in the knowledge base.

(b) For each solution produced by the generic mode of reasoning, taking the add list produced and converting the facts into a list of goals, passing the hypothesis history for that solution (with an empty add list) and the new list of goals back to the reasoner and carrying out either abductive or deductive reasoning with the get facts switch turned on and the get rules switch turned off. This will produce solutions previously found by reasoning in the generic mode ie. carrying out reasoning which only depends on the facts in the knowledge base. This has the effect of avoiding the repetition in the processing mentioned above for this particular type of knowledge base and is not restricted to abductive reasoning, for example the first stage (a) could be abductive whilst the second stage is deductive.

This method may be particularly advantageous when all solutions to a particular input goal are to be generated by the reasoner and may be combined with the cost function described above with reference to FIGS. 4 to 12, thereby permitting early selection of less costly solutions.

In some applications of the abducer program 70 it may be preferable to define further predetermined combinations of the switches described above with reference to the table, thereby permitting the abducer to carry out further modes of reasoning.

Further modifications of the reasoning mode feature described above with reference to FIGS. 18 to 20 are possible in which predetermined switches are turned on or off permanently, thereby presetting the reasoning mode and not permitting the user to choose a mode.

As another example, although the embodiment of the invention described with reference to FIGS. 4 to 12 is complex, and that of FIGS. 26 to 29 is relatively simple, other simpler forms of abductive reasoner are possible within the scope of the invention. For example, the constraint list 82 might be omitted from the embodiment of FIGS. 4 to 12 as a result of which processing could be or aborted when partial contradictions arise as well as when complete contradictions arise. As another possible modification, the preserve and/or prohibit lists 79, 80 might be omitted and checking for contradictions made only against the contents of the add and remove lists. This would mean that contradictions could arise in the reasoning process where a step requires removal of a fact but this fact has already been previously relied on but that reliance cannot be detected because of the absence of the preserve list. A final deductive reasoning step would be necessary to check for such contradictions, but, nevertheless, in certain circumstances such an abducer may be an improvement over the prior art.

As a further alternative possibility, checking for contradictions during the abductive reasoning process might be made only against the preserve and prohibit lists and not against the add and remove lists. Again, a final deductive reasoning process might be necessary to detect other contradictions but in some circumstances such as simplified embodiment of the invention may be advantageous.

Further possible combinations of the lists for abducers which embody the invention are shown in Table 5 below. The combinations marked in Table 5 with an asterisk will not produce contradictory solutions, but they are likely not to find all the possible solutions found by the main embodiment. The unmarked combinations are likely to reduce contradictory solutions, thus requiring a final deductive check to remove those solutions found to be contradictory.

TABLE 5

| | | |
|---|---|---|
| add | remove | |
| add | prohibit | |
| add | deleted | |
| add | constraint | |
| remove | preserve | |
| remove | deleted | |
| add | remove | preserve |
| add | remove | prohibit |
| add | remove | deleted |
| *add | prohibit | deleted |
| add | prohibit | constraint |
| add | deleted | constraint |
| *remove | preserve | deleted |
| add | remove | preserve prohibit |
| add | remove | preserve deleted |
| add | remove | preserve constraint |
| add | remove | prohibit deleted |
| add | remove | prohibit constraint |
| add | remove | deleted constraint |
| *add | prohibit | deleted constraint |
| *add | remove | preserve prohibit deleted |
| add | remove | preserve prohibit constraint |
| add | remove | preserve deleted constraint |
| add | remove | prohibit deleted constraint. |

Although in the embodiment as described with reference to FIGS. 4 to 16, each possible solution has been costed during processing by the update module, it would be possible as an alternative simply to process each possible solution through to a conclusion and those which have not failed could thereafter be costed. Similarly, the identification of the different groups into which the solutions fall could be made after all solutions have been found rather than during the abductive reasoning process.

Although in the embodiment described, only facts can be added and not rules, it would be possible to combine the abducer with a known inducer or other means which would allow the addition of rules to the knowledge base as well as facts.

As described with reference to the drawings, the reasoner 69 creates a fresh empty hypothesis history for the proving of each incoming goal. Alternatively, incremental abduction may be performed in which the hypothesis history from a previous abduction is used for processing a further goal or goals.

As a further alternative, incremental abduction may be performed in which one or more entries from the add list of a hypothesis history from a previous abduction is or are removed and used as a goal or goals for further abduction, with the remainder hypothesis history.

This further alternative may be combined with the previous alternative, above, by processing both add list entries from the hypothesis history of a previous abduction and further goals, with the remainder hypothesis history.

Various modifications are also possible to the diagnostic and control program. As one example of such a modification, step 310 in FIG. 23 could be omitted and instead if step 306 reveals that the expected detector output is not received by the diagnostic and control program, the original goal could be re-supplied to the reasoner for proof against the knowledge base as last updated before the failure to detect the expected detector output at step 306.

Although the invention has been described as embodied in a diagnostic and control system for a photocopier, it has many applications. For example, it may be used in control systems for a variety of different machines or processors and may, for example, be used also for data base access operations and for such things as natural language analysis, natural language generation, language translators, speech analysis, speech synthesis and signal processing including image processing and message processing. Thus, an abducer according to the invention may be part of a system for any of these purposes and control signals generated in response to proofs of goals may therefore be used for causing and/or controlling and/or prohibiting operations, processes or steps which may be performed within the apparatus or system in which the abducer is embodied. For example, in an image processing system, control signals produced in response to abduction according to the invention may be employed for selecting images or characteristics or images determined by the proof of the goal submitted to the abducer. The abducer according to the invention therefore has wide application as a component for receiving input signals, performing logic operations in response thereto and providing output signals resulting from the logic operations, such logic operations being performed rapidly and effectively on the basis of abductive reasoning. Wide application of the preferred embodiment of the invention is facilitated by the universal nature of the abducer, which depend only on the form and structure of the data in the knowledge base and not the application to which those facts and/or rules apply.

A further application of the abducer program is in a user interface to a computer where the user can input commands, in an input language. The abducer program can be arranged with an appropriate knowledge base to analyse the input command by treating it as a goal and carrying out abductive reasoning to provide a solution. The abducer can then derive a command from the solution which is in the form of an internal command for controlling the computer.

Although the abducer according to the invention is at present most readily implemented by software, the invention does not exclude other implementations such as hard wired implementations or implementations involving a mixture of hard wired logic and software.

APPENDIX

The following is an example of code in Prolog -by- B.I.M for the following modules of the abducer program 69.

(1) Abduce Module 72 as described with reference to FIG. 13.
(2) Insert Module 73 as described with reference to FIG. 15.
(3) Delete Module 74 as described with reference to FIGS. 16, 8, 9 and 10.
(4) Proof Module 75 as described with reference to FIG. 11.
(5) Update Module 76 as described with reference to FIG. 17.
(6) Insert Module 73 as described with reference to FIG. 18.
(7) Delete Module 74 as described with reference to FIG. 19.
(8) Update Module 76 as described with reference to FIG. 20.

- 149 -

```
:- module(abduce).
:- global(abduce/2).
:- global(abduce/3).
:- global(abduce/4).
```

```
{-----------------------------------------------------------------------}
{                                                                       }
{       Module abduce.                                                  }
{                                                                       }
{       All known abducers run relative to a given proof procedure.     }
{       This one works relative to SLDNF, the proof procedure of Prolog.}
{       This embodiment does not address the extralogical               }
{       features of Prolog such as cut, I/O, etc.  It has been tested   }
{       for correctness against Prolog as defined in the implementation }
{       Prolog by BIM version 3.1.3, and it also runs on this version   }
{       of Prolog.  Prolog goals 'true', 'fail' and the disjunctive     }
{       operator ';' are not handled in this version of the code.  The  }
{       code modifications necessary to do so are described in modules  }
{       'insert' and 'delete'.                                          }
{                                                                       }
{       For a given goal and the current Prolog knowledge base, the     }
{       abducer calculates possible transactions on the Prolog KB       }
{       in terms of the operations assert/1 and retract/1. That is, on  }
{       each invocation with a given goal, it returns zero or more      }
{       sets of assertions and retractions, each of which will result   }
{       in the input goal being a logical consequence of the KB (ie.    }
{       the input goal would then be proveable in Prolog).              }
{                                                                       }
{       The assertions are returned in the list referred to as the "add"}
{       list, and the retractions in the list referred to as the        }
{       "remove" list.                                                  }
{                                                                       }
{       For conciseness, the transaction description leaves some object }
{       values uninstantiated.  These are given in the list called      }
{       "hypvars".  Each variable in this list can be replaced with     }
{       any other variable, constant or partially instantiated term     }
{       and still return a valid solution, subject to a set of          }
{       restrictions listed in the list called "Constraint".  This      }
{       lists constraints on the unifiability of terms. eg. that        }
{       [_x,_y] must not be unifiable with [a,_x].                      }
{                                                                       }
{-----------------------------------------------------------------------}

{-----------------------------------------------------------------------}
{ abduce/2                                                              }
{       arg1:   input goal (as arg2 of abduce/5)                        }
{       arg2:   a solution (as arg5 of abduce/5)                        }
{               Backtracks through solutions.                           }
{-----------------------------------------------------------------------} abduce(_goal,_result):-
        initialize,
        initial_state(_r,_l1),
        abduce(_goal,_r,_l1,_result),
        log_best(_result).

{-----------------------------------------------------------------------}
{ abduce/3                                                              }
{       arg1:   input goal (as arg1 of abduce/4)                        }
{       arg2:   the hypothesis history structure of an earlier          }
{               abduction (for incremental abduction).  As arg3 of      }
{               abduce/4                                                }
{       arg3:   a solution (as arg4 of abduce/4)                        }
{               Backtracks through solutions.                           }
{-----------------------------------------------------------------------}
```

– 150 –

```
abduce(_goal,_l1,_result):-
        initialize,
        initial_state(_r,_),
        abduce(_goal,_r,_l1,_result),
        log_best(_result).
```

```
{---------------------------------------------------------------------}
{ abduce/4                                                            }
{       arg1: the goal to abduce with, in Prolog query form.          }
{             "\+" is used as the operator for negation by failure.   }
{             Each results in a particular instantiation of this goal.}
{       arg2: Data required for depth recursive checks & optimisation }
{       arg3: the cumulative history of the hypothesis building to date }
{             on entering abduce/4.                                   }
{       arg4: the cumulative history of the hypothesis building to date }
{             on exitting abduce/4.                                   }
{                                                                     }
{       Argument 1 is the goal to be abduced with.  After the call    }
{       to insert/4, the goal should be a logical consequence of the  }
{       hypothesised KB, except in the case that one or more of the   }
{       statements in the "deleted" list is also a logical consequence}
{       of the hypothesised KB.  The call to check/4 is to delete any }
{       such statements.  This is necessary to handle default reasoning,}
{       where the proveability of some statement is used as a default }
{       way of proving or disproving some other statement (eg. negation}
{       by failure). Such a check could be implemented after each 'add'}
{       or 'remove' list modification.  This would prevent the        }
{       unnecessary processing of hypotheses that could not be        }
{       completed (ie. where there is no solution to check/4) but might}
{       require a lot of processing in terms of repeating the checking}
{       stage many times.  The choice of when to make the check (during}
{       or as a post-phase) may depend on the nature of the KB and    }
{       input goal in question.                                       }
{                                                                     }
{       Processing may be reduced by checking and storing information }
{       only where a dependency exists between the given predicates.  }
{       However, this also requires extra data storage or processing  }
{       in terms of the noting or detection of dependencies and so the}
{       choice of whether or not to do this may also depend on the    }
{       KB and goal in question.                                      }
{                                                                     }
{       All the data concerning changes to the KB is stored in the    }
{       data structure passed as input (arg3) and its counterpart     }
{       passed as output (arg4). Each KB change in this data structure}
{       is numbered sequentially, so you can retrieve the state of    }
{       the hypothesis at any point in processing.                    }
{                                                                     }
{---------------------------------------------------------------------} abduce(_goal,_r,_l1,_1):-
        insert(_goal,_r,_l1,_l2),
        check(0:1,_r,_l2,_1).
```

```
{---------------------------------------------------------------------}
{ check/4                                                             }
{       arg1: determines whether a KB change was hypothesised in      }
{             check/4 at the previous stage of recursion (see below). }
{       arg2: Data required for depth recursive checks & optimisation }
{       arg3: the cumulative history of the hypothesis building to date}
{             on entering check/4.                                    }
{       arg4: the cumulative history of the hypothesis building to date}
{             on exitting check/4.                                    }
{                                                                     }
```

```
{                                - 151 -
{       Terminates when the previous pass does not change the KB            }
{       (Definition 1 argument 1 is of the form m:n where m identifies      }
{       the most recently hypothesised change before the                    }
{       call and n the most recent change after.  If m = n                  }
{       then no changes took place).                                        }
{                                                                           }
{       During the call deleted/4 is called to check that any deleted       }
{       conjunctions have not reappeared as a side effect of                }
{       processing subsequent to their deletion.                            }
{                                                                           }
{       All the data concerning changes to the KB is stored in the          }
{       data structure passed as input (arg3) and its counterpart           }
{       passed as output (arg4). Each KB change in this data structure      }
{       is numbered sequentially, so you can retrieve the state of          }
{       the hypothesis at any point in processing.                          }
{                                                                           }
{---------------------------------------------------------------------------} check(_n:_n,_,_l,_l):-
        !.

{   :ck(_i,_r,_l1,_l):-
        data(deleted,_l1,_d),
        deleted(_d,_r,_l1,_l2),
        data(state,_l1,_j),
        data(state,_l2,_k),
        check(_j:_k,_r,_l2,_l).

{---------------------------------------------------------------------------}
{   deleted/4                                                               }
{                                                                           }
{       arg1:   a list of conjunctions that must be deleted                 }
{               each one of which is of the form n:exp, where n is the      }
{               point in hypothesis building at which deletion of exp       }
{               started.                                                    }
{       arg2:   Data required for depth recursive checks & optimisation     }
{       arg3:   the cumulative history of the hypothesis building on        }
{               entry to deleted/4                                          }
{       arg4:   the cumulative history of the hypothesis building on        }
{               exitting deleted/4                                          }
{                                                                           }
{   For the given list of conjunctions, look to see if any are proveable    }
{   using part of the hypothesis history that has been created since        }
{   the given expression was deleted.                                       }
{   If there is, then delete it.  Stop after the first deletion (don't      }
{   attempt them all).  Fail if you find a proof you can't delete.          }
{---------------------------------------------------------------------------}

{---------------------------------------------------------------------------}
{   terminal condition                                                      }
{       all deleted                                                         }
{---------------------------------------------------------------------------} deleted([],_,_l,_l):-
        !.

{---------------------------------------------------------------------------}
{   list element is an expression whose LHS was deleted and has since       }
{   become proveable in the hypothesised KB.                                }
{   Delete it.                                                              }
{   If it's undeletable then there is no solution reachable from the        }
{   processing stage recorded in delete arg 3.                              }
{---------------------------------------------------------------------------} deleted([_n:_x|_],_r,_l1,_l):-
```

- 152 -

```
        proof(_x,_r,_l1),
        !,
        delete(_x,_r,_l1,_l).

{----------------------------------------------------------------}
{   look at the tail for something to delete.                    }
{----------------------------------------------------------------} deleted([_|_t],_r,_l1,_l):-
        deleted(_t,_r,_l1,_l).

{----------------------------------------------------------------}
{   log_best/1                                                    }
{       Determine if this hypothesis is better than the best found so }
{       far, and if so, log this one as the best so far.         }
{                                                                }
{       The "goodness" of a hypothesis is measured on formal grounds }
{       by assigning costs to types of operations carried out by the }
{       abducer during processing and/or assigning costs to various }
{       types elements recorded in the hypothesis history, and then }
{       applying a cost function to determine the overall cost.  }
{                                                                }
{       If this is the first solution then it is always logged as the }
{       best so far.                                             }
{                                                                }
{----------------------------------------------------------------} log_best(_l):-
        data(cost,_l,(_,_cum,_)),
        retractall(lowest_cost(_)),
        assert(lowest_cost(_cum)).
```

```
                                  - 153 -
:- module(insert).
:- global(insert/4).

{------------------------------------------------------------------}
{  insert/4                                                        }
{       Hypothesise that arg1 is true in the KB-to-date.           }
{                                                                  }
{       arg1:   the goal to insert.                                }
{       arg2:   Data required for depth recursive checks & optimisation }
{       arg3:   the cumulative history of the hypothesis building on }
{               entry to insert/4                                  }
{       arg4:   the cumulative history of the hypothesis building on }
{               exitting insert/4                                  }
{                                                                  }
{       Handling of the prolog atoms 'true' and 'fail' and of      }
{       expressions disjoined by prolog operator ';'/2 are not     }
{       implemented in this version, but could be done by adding the }
{       following code as the initial definitions of their respective }
{       predicates:                                                }
{                                                                  }
{       1) Inserting truth:                                        }
{          Inserting 'true' always succeeds.                       }
{                                                                  }
{               insert(true,_,_l,_l):-                             }
{                       !.                                         }
{                                                                  }
{       2) Inserting falsehood:                                    }
{          Inserting 'false' always fails.                         }
{                                                                  }
{               insert(fail,_,_l,_l):-                             }
{                       !,                                         }
{                       fail.                                      }
{                                                                  }
{       3) Inserting disjunction:                                  }
{          insert the left conjunct or the right one.              }
{                                                                  }
{               opt_insert((_x;_y),_r,_l1,_l):-                    }
{                       !,                                         }
{                       (_z = _x;_z=_y),                           }
{                       insert(_z,_r,_l1,_l).                      }
{------------------------------------------------------------------}

{------------------------------------------------------------------}
{  negation                                                        }
{       delete the negated expression.                             }
{       Any variables in the negation have limited scope, so take a }
{       copy, making sure to preserve the 'hypvar' variables (variables }
{       representing values introduced in hypothesised facts in the }
{       add list.                                                  }
{------------------------------------------------------------------}
insert(\+(_y),_r,_l1,_l):-
        !,
        data(hypvars,_l1,_vars),
        copy(_y:_vars,_ycopy:_vars),
        delete(_ycopy,_r,_l1,_l).

{------------------------------------------------------------------}
{ optimisation                                                     }
{       Optimise the returns for the remaining definitions of 'insert' }
{------------------------------------------------------------------}
```

- 154 -

```
insert(_x,_r1,_l1,_l):-
        optimise(_r1,_r2),
        opt_insert(_x,_r2,_l1,_l),
        data(state,_l1,_s),
        rdata(scope,_r2,_c),
        consistent(_s,_c,_l).
```

```
{----------------------------------------------------------------}
{  opt_insert/4                                                  }
{       Definition as for insert, but optimises the call to insert by }
{       returning solutions in the following order by backtracking: }
{                0 - proofs                                      }
{                1 - solutions with new KB adds and no new removes }
{                2 - solutions with KB fact removes and no rule removes }
{                3 - solutions with new rule removes             }
{                                                                }
{       The types of solutions (0-3) attempted is constrainted by the }
{       value of 'scope' returned by rdata. Eg. if the calling routine }
{       is currently considering solutions of type 2, then insert }
{       will only backtrack to call be invoked with scopes, 0, 1 and 2 }
{       in turn.                                                 }
{----------------------------------------------------------------}

{----------------------------------------------------------------}
{ conjunction                                                    }
{       insert the left conjunct then the right one              }
{----------------------------------------------------------------} opt_insert((_x,_y),_r,_l1,_l):-
        !,
        insert(_x,_r,_l1,_l2),
        insert(_y,_r,_l2,_l).

{----------------------------------------------------------------}
{ positive literal  #1                                           }
{       Succeeds if the goal arg1 matches an already-hypothesised fact }
{       in the hypothesised KB. The resulting unification        }
{       This may cause a hypvar to unify with a term, so restore the }
{       hypvar list to a state where it has only variables in it }
{       (including any that occur in the hypvar that has become a term.) }
{----------------------------------------------------------------} opt_insert(_x,_r,_l1,_l):-
        posited_kb(hypothesis,(_x,_l1)),
        restore_hypvars(_l1,_l).

{----------------------------------------------------------------}
{ positive literal  #2                                           }
{       ADD a new fact to the hypothesised KB.                   }
{----------------------------------------------------------------} opt_insert(_x,_r,_l1,_l):-
        update(add,_x,_r,_l1,_l).

{----------------------------------------------------------------}
{ positive literal  #3                                           }
{       Succeeds if the goal arg1 matches a fact in the hypothesised KB }
{       that is also in the original KB. The resulting unification }
{       may unify a hypvar with a term, so restore the hypvar    }
{       list to a state where it has only variables in it (including }
{       any that occur in the hypvar that has become a term.    }
{----------------------------------------------------------------}
```

- 155 -

```
opt_insert(_x,_r,_l1,_1):-
        posited_kb(fact,(_x,_l1,_n)),
        restore_hypvars(_l1,_l2),
        update(preserve,_n,_r,_l2,_1).
```

```
{------------------------------------------------------------------}
{ positive literal  #4                                             }
{       Succeeds if the goal arg1 matches a rule conclusion        }
{       in the hypothesised KB.  The resulting unification         }
{       may unify a hypvar with a term, so restore the hypvar      }
{       list to a state where it has only variables in it (including}
{       any that occur in the hypvar that has become a term.       }
{       Putting this definition last ensures that solutions are    }
{       generated even when a state of infinite recursion is       }
{       encountered.                                               }
{------------------------------------------------------------------}
```

```
opt_insert(_x,_r1,_l1,_1):-
        posited_kb(rule,(_x,_l1,_body,_n)),
        restore_hypvars(_l1,_l2),
        update(preserve,_n,_r1,_l2,_l3),
        push(insert,_l3,_r1,_r2),
        insert(_body,_r2,_l3,_1).
```

- 156 -

```prolog
:- module(delete).
:- global(delete/4).
```

```
{-----------------------------------------------------------------}
{ delete/4                                                        }
{                                                                 }
{       Hypothesise that arg1 is not true in the KB-to-date.      }
{                                                                 }
{       arg1:   the goal to delete.                               }
{       arg2:   Data required for depth recursive checks & optimisation }
{       arg3:   the cumulative history of the hypothesis building on }
{               entry to delete/4                                 }
{       arg4:   the cumulative history of the hypothesis building on }
{               exitting delete/4                                 }
{                                                                 }
{       Handling of the prolog atoms 'true' and 'fail' and of    }
{       expressions disjoined by prolog operator ';'/2 are not   }
{       implemented in this version, but could be done by adding the }
{       following code as the initial definitions of their respective }
{       predicates:                                               }
{                                                                 }
{       1) Deleting falsehood:                                    }
{          Deleting 'fail' always succeeds.                       }
{                                                                 }
{               delete(fail,_,_l,_l):-                            }
{                       !.                                        }
{                                                                 }
{       2) Deleting truth:                                        }
{          Deleting 'true' always fails.                          }
{                                                                 }
{               delete(true,_,_,_):-                              }
{                       !,                                        }
{                       fail.                                     }
{                                                                 }
{       3) Deleting disjunction:                                  }
{          Delete the left conjunct and the right one.            }
{                                                                 }
{               opt_delete((_x;_y),_r,_l1,_l):-                   }
{                       !,                                        }
{                       opt_delete(_x,_r,_l1,_l2),                }
{                       opt_delete(_y,_r,_l2,_l).                 }
{-----------------------------------------------------------------}

{-----------------------------------------------------------------}
{ negation                                                        }
{       Delete not x by inserting x.                              }
{       Any variables in the negation have limited scope, so take a }
{       copy, making sure to preserve the 'hypvar' variables (variables }
{       representing values that have been introduced to the hypothesis }
{       history by virtue of being in the Add list).             }
{-----------------------------------------------------------------}
delete(\+(_y),_r,_l1,_l):-
        !,
        data(hypvars,_l1,_vars),
        copy(_y:_vars,_ycopy:_vars),
        insert(_ycopy,_r,_l1,_l).

{-----------------------------------------------------------------}
{ optimisation                                                    }
{       Optimise the returns for the remaining definitions of 'delete' }
{-----------------------------------------------------------------} delete(_x,_r1,_l1,_l):-
```

- 157 -

```
        optimise(_r1,_r2),
        opt_delete(_x,_r2,_l1,_l),
        data(state,_l1,_s),
        rdata(scope,_r2,_c),
        consistent(_s,_c,_l).
```

```
{------------------------------------------------------------------}
{  opt_delete/4                                                    }
{       Definition as for delete, but optimises the call to delete by }
{       returning solutions in the following order by backtracking: }
{                 0 - proofs                                       }
{                 1 - solutions with new KB adds and no new removes }
{                 2 - solutions with KB fact removes and no rule removes }
{                 3 - solutions with new rule removes              }
{                                                                  }
{       The types of solutions (0-3) attempted is constrained by the }
{       value of 'scope' returned by rdata. Eg. if the calling routine }
{       is currently considering solutions of type 2, then delete  }
{       will only backtrack to reinvoke delete with scopes, 0, 1 and 2 }
{       in turn.                                                   }
{------------------------------------------------------------------}
```

```
{------------------------------------------------------------------}
{ conjunction                                                      }
{       Find all proofs of x and for each either delete x or y     }
{       Store the fact that the conjunction is deleted (in case it }
{       pops up again.                                             }
{       This routine assumes that x is not itself a conjunct. Ie.  }
{       rule premises and the input goal are represented such that in }
{       any expression, (_a,_b), _a is not a conjunction.          }
{       This does not affect the power of the logical language but }
{       requires that the KB rules and input goal are preprocessed if }
{       necessary (e.g. input goal ( (a,b), c) would be represented }
{       internally as (a, (b,c)), which is logically equivalent as }
{       far as the prolog proof procedure is concerned.            }
{------------------------------------------------------------------} opt_delete((_x,_y),_r,_l1,_l):-
        !,
        update(deleted,(_x,_y),_r,_l1,_l2),
        _p = proof(_x,_r,_l1),
        get_bag((_x,_y),_p^_p,_set),
        delete_conjunctions(_set,_r,_l2,_l).
```

```
{------------------------------------------------------------------}
{ Positive literals                                                }
{       Prohibit x from being ADDed                                }
{       Get all the facts of the form x and delete each one        }
{       Get all the rules with head = x and either                 }
{               delete the rule                                    }
{               or delete the rule body                            }
{------------------------------------------------------------------} opt_delete(_x,_r,_l1,_l):-
        update(prohibit,_x,_r,_l1,_l2),
        get_bag(_n,posited_kb(fact,(_x,_l2,_n)),_s1),
        disable_facts(_x,_s1,_r,_l2,_l3),
        get_bag((_x:_body,_n),posited_kb(rule,(_x,_l3,_body,_n)),_s2),
        disable_rules(_x,_s2,_r,_l3,_l).
```

```
{------------------------------------------------------------------}
{ Ensure that there are currently no solutions to any of the       }
{ conjunctions in the given list.                                  }
```

- 158 -

```
{ You do this by deleting either the LHS or RHS conjunct              }
{----------------------------------------------------------------------} delete_conjunctions([],_,_l,_l).

delete_conjunctions([(_x,_y)|_t],_r,_l1,_l):-
        (_z = _x;_z = _y),
        delete(_z,_r,_l1,_l2),
        delete_conjunctions(_t,_r,_l2,_l).

{----------------------------------------------------------------------}
{ For a given list of KB facts, add them to the list of REMOVEs        }
{ Unless you can constraint the value of the literal's hypvars so that }
{ the given literal is no longer proveable by the given fact.          }
{----------------------------------------------------------------------} disable_facts(_x,[_n|_t],_r,_l1,_l):-
        id(_f,_a,_m,_,_n),
        functor(_p,_f,_a),
        clause(_p,true,_m),
        constrain_hypvars(_x,_p,_l1,_l2),
        disable_facts(_x,_t,_r,_l2,_l).

disable_facts(_x,[_n|_t],_r,_l1,_l):-
        update(remove,_n,_r,_l1,_l2),
        disable_facts(_x,_t,_r,_l2,_l).
disable_facts(_,[],_,_l,_l).

{----------------------------------------------------------------------}
{ For a given list of KB rules, make each non-provable for a given     }
{ instantiation of the head.                                           }
{----------------------------------------------------------------------} disable_rules(_x,[(_:_body,_n)|_t],_r,_l1,_l):-
        id(_f,_a,_m,_,_n),
        functor(_p,_f,_a),
        clause(_p,_body,_m),
        constrain_hypvars(_x,_p,_l1,_l2),
        disable_rules(_x,_t,_r,_l2,_l).

disable_rules(_x,[(_x:_body,_n)|_t],_r,_l1,_l):-
        restore_hypvars(_l1,_l2),
        disable_rule((_x:_body,_n),_r,_l2,_l3),
        disable_rules(_x,_t,_r,_l3,_l).
disable_rules(_x,[],_,_l,_l).

{----------------------------------------------------------------------}
{ Make a rule non-provable for a given instantiation of the head,      }
{ either by deleting it, or deleting the corresponding body.           }
{ You can optimise this further for some KBs by preferring to          }
{ delete a body than to delete the rule (on the grounds that this      }
{ is, by some measure, better. However the danger in reordering the    }
{ following two rules is that the processing does not terminate. eg.   }
{ deleting p where p:-\+(p) will produce solutions in finite time      }
{ currently but would not if the order of the following two rules      }
{ were changed (unless there was a recursive depth check).             }
{ NB.   Optimisation using filters may nullify the some effects of     }
{       ordering.                                                      }
{----------------------------------------------------------------------} disable_rule((_,_n),_r,_l1,_l):-
        update(remove,_n,_r,_l1,_l).
```

- 159 -

```
disable_rule((_x:_body,_n),_r1,_l1,_l):-
        push(delete,_l1,_r1,_r2),
        delete(_body,_r2,_l1,_l).
```

```
{---------------------------------------------------------------}
{   get_bag/3                                                   }
{                                                               }
{ Like bagof, but finds all solutions and never fails (ie. returns }
{ empty list rather than fail if there are no solutions).       }
{---------------------------------------------------------------} get_bag(_a,_b,_c):-
        bagof(_a,_b^_b,_c),
        !.
get_bag(_,_,[]).
```

- 160 - proof.pro

```prolog
:- module(proof).

:- global(proof/4).

{------------------------------------------------------------------}
{ proof/4                                                          }
{       Find a proof (by insertion) of arg1 for which there is at least }
{       one proof of arg2.                                         }
{                                                                  }
{       arg1: an expression                                        }
{       arg2: an expression                                        }
{       arg3: depth-related data                                   }
{       arg4: input hypothesis history record                      }
{                                                                  }
{------------------------------------------------------------------} proof(_x,_y,_r,_l1):-
        proof_level(_r,_pr),
        insert(_x,_pr,_l1,_l3),
        \+(\+(insert(_y,_pr,_l3,_))).
``` update.pro

```
:- module(update).
:- global(update/5).

{------------------------------------------------------------------}
{   update/5                                                       }
{                                                                  }
{ arg1: type of data to add.                                       }
{ arg2: the data.                                                  }
{ arg3: data related to the recursive depth of the corresponding   }
{       proof.                                                     }
{ arg4: the input data structure                                   }
{ arg5: the output data structure                                  }
{                                                                  }
{ These are the access predicates for updating the current state of}
{ the hypothesised KB in terms of what must be done to the actual  }
{ KB:                                                              }
{                                                                  }
{       kept in     - arg1 = 'preserve' (facts & rules)            }
{       kept out    - arg1 = 'prohibit' (positive literals)        }
{       put in      - arg1 = 'add' (positive literals)             }
{       taken out   - arg1 = 'remove' (positive literals)          }
{       deleted     - arg1 = 'deleted' (conjunctions)              }
{       constraint  - arg1 = 'constraint'(constraints on values)   }
{                                                                  }
{ You can't:                                                       }
{       Add something that's prohibited.                           }
{       Remove something that's preserved.                         }
{       Prohibit something that's added.                           }
{                                                                  }
{       Constraint satifaction: the abducer introduces individuals }
{       as prolog variables.  If at the end of the abduction, the  }
{       transaction contains such variables, then values have to be}
{       assigned to the variables (or they can be left as variables}
{       being universally quantified after assertion in the KB).   }
{       The constraint list contains pairs of lists, which define  }
{       constraints on the value of such variables.                }
{                                                                  }
{       Scope check: if a calling insert/delete is looking for     }
{       constrained solutions (eg. proofs only) then do not follow }
{       solutions that violate that constraint.                    }
{                                                                  }
{       Depth check: if a recursive depth limit is specified then  }
{       do not perform update operations beyond this depth.  ie.   }
{       ignore any solutions which would require SLDNF proof with  }
{       recursive depth > limit (except in the case of negation    }
{       by failure, where this depth may be exceeded as long as    }
{       there are mno related updated specified.                   }
{                                                                  }
{       Best so far: cost/4 calculates the cumulative cost of      }
{       the transaction being built.  If it becomes costlier than the}
{       best-to-date solution then force failure in order to abandon}
{       this particular solution.                                  }
{                                                                  }
{------------------------------------------------------------------}

{------------------------------------------------------------------}
{       If there is a constraint on feasible operations, check the }
{       operation type.                                            }
{------------------------------------------------------------------} update(_a,_x,_r,_,_):-
        rdata(scope,_r,_s),
        illegal(_a,_x,_s),
        !,
```

- 162 -

```
        fail.
```

{------------------------------------------------------------------}
{       If there is an operational check on recursive depth and the }
{       limit is reached then fail.                                 }
{       Depth limit is defined as an integer which is decremented   }
{       at each new level. If it starts +ve then it will terminate  }
{       when zero. If negative, this check always fails.            }
{------------------------------------------------------------------}

```
update(_,_,_r,_,_):-
        rdata(depth,_r,0),
        !,
        fail.
```

{------------------------------------------------------------------}
{       If it's in there already then don't add it.                }
{------------------------------------------------------------------}

```
 pdate(_a,_x,_r,_l1,_l):-
        data(_a,_l1,_y),
        list_member(_z,_y),
        _x == _z,
        !,
        constraint_satisfaction(_l1,_l).
```

{------------------------------------------------------------------}
{       You can add something to the KB if it is not prohibited.   }
{       If it matches something in the 'prohibited' list then this }
{       tries to constrain variables so that unification will not  }
{       occur when attempting a proof in the hypothesised KB.      }
{------------------------------------------------------------------}

```
update(add,_x,_r,_l1,_l):-
        data(prohibit,_l1,_plist),
        add_newvars(_x,_l1,_l2),
        add_constrain(_x,_plist,_l2,_l3),
        new_data(add,_l3,_x,_l4),
        constraint_satisfaction(_l4,_l5),
        cost(add,_x,_l5,_l).
```

{------------------------------------------------------------------}
{       Add any vars in args to the hypvars list, unless already there. }
{------------------------------------------------------------------}

```
add_newvars(_x,_l1,_l):-
        data(hypvars,_l1,_v1),
        addvars(_x,_v1,_v2),
        replace(hypvars,_v2,_l1,_l).
```

{------------------------------------------------------------------}
{       You can't remove something from the KB is your reasoning to date}
{       depends on it being present in the KB (preserved).         }
{------------------------------------------------------------------}

```
update(remove,_x,_r,_l,_):-
        data(preserve,_l,_p),
        list_member(_x,_p),
        !,
        fail.

update(remove,_x,_r,_l1,_l):-
        new_data(remove,_l1,_x,_l2),
``` update.pro

```
        constraint_satisfaction(_l2,_l3),
        cost(remove,_x,_l3,_l).

{---------------------------------------------------------------}
{       If you delete a conjunction then it is recorded here.  (it may  }
{       become proveable in the hypothesised KB by virtue of later      }
{       abductive steps, so you need to preserve this info for checking }
{       and - if required - further deleting later.                     }
{---------------------------------------------------------------} update(deleted,_x,_r,_l1,_l):-
        new_data(deleted,_l1,_x,_l2),
        constraint_satisfaction(_l2,_l3),
        cost(deleted,_x,_l3,_l).

{---------------------------------------------------------------}
{       You cannot preserve a KB clause that has already been removed   }
{       from the hypothesised KB.                                       }
{---------------------------------------------------------------} update(preserve,_x,_r,_l1,_):-
        data(remove,_l1,_p),
        list_member(_x,_p),
        !,
        fail.

update(preserve,_x,_r,_l1,_l):-
        new_data(preserve,_l1,_x,_l2),
        constraint_satisfaction(_l2,_l3),
        cost(preserve,_x,_l3,_l).

{---------------------------------------------------------------}
{       You cannot preserve a KB clause that has already been removed   }
{       from the hypothesised KB.                                       }
{---------------------------------------------------------------} update(prohibit,_x,_r,_l1,_l):-
        data(add,_l1,_plist),
        prohibit_constrain(_x,_plist,_l1,_l2),
        new_data(prohibit,_l2,_x,_l3),
        constraint_satisfaction(_l3,_l4),
        cost(prohibit,_x,_l4,_l).

update(constraint,_x,_r,_l1,_l):-
        new_data(constraint,_l1,_x,_l2),
        cost(constraint,_x,_l2,_l).

{---------------------------------------------------------------}
{ Find elements of a list of form _n:_x and return _x                   }
{---------------------------------------------------------------} list_member(_x,[_:_x|_]).
list_member(_x,[_|_t]):-
        list_member(_x,_t).

{---------------------------------------------------------------}
{ add_constraints/4                                                     }
{       On adding a new fact to the KB check the 'prohibit' list to     }
{       make sure that it can be asserted.  If its most general form    }
{       is prohibited (ie. where all variables are interpreted as       }
{       universally quantified), define constraints on the values such  }
{       that the 'add'ed element, after assigning of values to variables}
```

– 164 –

```
{       will be sure not to unify with the prohibited literal         }
{       example case:   insert  z(_x) then \+(z(a))                   }
{---------------------------------------------------------------------} add_constrain(_x,[_:_h|_t],_l1,_l):-
        _x ?= _h,
        \+ _x == _h,
        data(hypvars,_l1,_r),
        sigargs(_r,_x,_h,_xx/nil,_hh/nil),
        update(constraint,differ(_xx,_hh),nil,_l1,_l2),
        !,
        add_constrain(_x,_t,_l2,_l).

add_constrain(_x,[_:_h|_t],_l1,_l):-
        \+ _x = _h,
        add_constrain(_x,_t,_l1,_l).

add_constrain(_,[],_l,_l).

{---------------------------------------------------------------------}
{ prohibit_constraints/4                                              }
{       As for add_constraints/4, but instead of checking an 'added'  }
{       predicate against everything in the 'prohibit' list, you check}
{       a prohibited predicate against everything in the 'add' list   }
{       example case:   insert  \+(z(a)) then z(_x)                   }
{---------------------------------------------------------------------} prohibit_constrain(_x,[_:_h|_t],_l1,_l):-
        _x ?= _h,
        \+ _x == _h,
        data(hypvars,_l1,_r),
        sigargs(_r,_h,_x,_hh/nil,_xx/nil),
        update(constraint,differ(_hh,_xx),nil,_l1,_l2),
        !,
        prohibit_constrain(_x,_t,_l2,_l).

prohibit_constrain(_x,[_:_h|_t],_l1,_l):-
        \+ _x = _h,
        prohibit_constrain(_x,_t,_l1,_l).

prohibit_constrain(_,[],_l,_l).

{---------------------------------------------------------------------}
{ illegal/2                                                           }
{       Operation arg1 of data arg2 on the hypothesis history structure }
{       is illegal in the case that the solution looked for is to be  }
{       of type arg3.                                                 }
{---------------------------------------------------------------------} illegal(add,_,0).
illegal(remove,_,0).
illegal(remove,_,1).
illegal(remove,_/rule,2).
```

- 165 - consistent/3
If local optimisation is switched on then this checks
that the changes to the hypothesised KB since state arg1
(as logged in the hypothesis history in arg3) are consistent
with the type of solution currently being permitted by local
optimisation - if any - as specified in arg2) and fails if they
are not consisten t.

BACKTRACKING BEHAVIOUR

No backtracking into this definition.

– 166 – constrain_hypvars/4 where arg1 and arg2 are unifiable, this routine constraints the
potential values of variables that have been introduced to the hypothesis
history by virtue of being in the Add list (or been first introduced by
unification of a term or variable with such a variable) in such
a way that unifying arg1 and arg2 is not possible without violating the
constraint. Ie. adds the constraint that arg1 should not unify with
arg2.

arg1  a prolog term
    arg2  a prolog term
    arg3  hypothesis history structure to date
    arg4  hypothesis history structure augmented to define a
          constraint on the possible values of hypvars that
          occur in the prolog terms

BACKTRACKING BEHAVIOUR

No backtracking into this definition.

copy/2

```
        arg1: input: a prolog term
        arg2: output: a copy of the prolog term identical
              except that new variables replace the originals eg.?-  _a = p([_x, q(_x,_y)],
               copy(_a,_b),
               write('_a' =_a),
               nl,
               write('_b'= _b).

produces:  _a = [_x, q(_x,_y)]
                   _b = [_g, q(_g,_h)]
```

My code actually uses a BIM ProLog builtin to do this, but it is not documented. It's definition in prolog is:

```
copy(_x,_y):-
        asserta(copying(_x)),
        retract(copying(_y)).
```

BACKTRACKING BEHAVIOUR

No backtracking into this definition.

- 168 - data/3

Retrieve a data item from the hypothesis history record.

arg1: item type
        arg2: the hypothesis history record
        arg3: the item retrieved The following types of items are quoted in the code:

deleted: a list of conjunctions that must remain deleted because the soundness of the hypothesis to date relies on their negation by failure, each conjunction being recorded in the form n:exp, where n identifies the state of the hypothesis history at the point at which the deletion of exp was initiated (see 'state' below).

state: the current state of the hypothesis list (an integer) Initially zero, incremented each time the hypothesis list is updated. Required by the scope check routines to detect what type of changes have occurred in the hypothesis list since a specified previous state. (each update that involves augmenting the structure with a significant element (any of the above except 'state') is tagged with the current state integer, thus recording the order of operations during building of the list.

cost: information related to the cost of the current hypothesis. A triple (f,c,l), where f identifies the function to use to calculate the cost of the current transaction, using the information in the current hypothesis list plus the information passed to update/4 (ie. the type and content of the operation for which the additional cost is to be calculated); c is the cumulative cost to date (used where the update/4 info plus the current cost to date is enough to incrementally calculate the new cost; l is a list of the number of occurrences of each type of a subset of the above operations (eg. adds, removes). Operation counts may be subdivided (eg. remove-facts and remove-rules listed separately for use by the cost-calculating function) according to the formal properties of the data they are operating on eg. whether a clause is in the form of a fact or a rule.

hypvars: variables introduced by the abducer by the hypothesised adding of new facts.

BACKTRACKING BEHAVIOUR

No backtracking into this definition.

- 169 - id/4 construct a unique identifier used to reference a particular clause in the KB.

arg1: name of predicate of fact or rule conclusion
arg2: arity (number of arguments) of fact or rule conclusion
arg3: the clause in question is the arg3th definition of the given predicate
arg4: type (fact or rule)
arg5: the unique identifier

BACKTRACKING BEHAVIOUR

No backtracking into this definition.

- 170 - initial_state/2

This returns :

arg1 - an empty hypothesis history data structure, for the initial call to insert (for non-incremental calls to the abducer only).

arg2 - information defining the recursive depth to which processing will be allowed to go. This constraint is optional.

Also defines what types of constraints are applied if local optimisation is switched on (eg. proofs first, then asserts only, then fact assert/retract then anything involving rule deletion). See opt_insert/4 and opt_delete/4.

BACKTRACKING BEHAVIOUR

No backtracking into this definition.

initialize/0

– 171 –

Record the lowest cost so far to be a high-value (eg. the highest possible integer value in the particular implementation of prolog you are running).

In "least-costly-so-far" mode, this value represents the lowest cost so far. Setting it to a high-value ensures that the first cost found is recorded as the best so far, but any way of initializing that causes the first solution to be found to be recorded as the best so far would be satisfactory.

BACKTRACKING BEHAVIOUR

No backtracking into this definition.

optimise/2                         - 172 -

If local optimisation is switched on, then this backtracks through
the available options for local optimisation as defined in initial_state/2.
This causes the same number of solutions to be returned by opt_insert
or opt_delete as would be without local optimisation, but the order in
which they are returned is affected by the ranking defined in initial_state/2.
See opt_insert/4 and opt_delete/4.

BACKTRACKING BEHAVIOUR

Succeeds as many times as there are ranks of solution types.

- 173 - push/4

Augment the given data structure arg3 giving the new data structure arg4 to record the occurrence of recursive deepening in the proof that would be executed to prove the input goal in the hypothetical KB.

arg1 & arg2 are not used.

BACKTRACKING BEHAVIOUR

No backtracking into this definition.

- 174 - rdata/3 determines what the current scope of solutions
to be considered is (out of the possible constraints
defined for local optimisation). See opt_delete/4
and opt_insert/4.

arg1: scope
        arg2: the hypothesis history record
        arg3: the item to be retrieved

BACKTRACKING BEHAVIOUR

No backtracking into this definition.

- 175 - restore_hypvars/2

Take the current hypvar list (ie. uninstantiated objects introduced via the Add list) in arg1 and turn it into a flat list of the variables that occur in it.

Used to ensure that the hypvar list logs only variables.

arg1: input hypothesis history structure to date
    arg2: output hypothesis history structure to date eg. before some operation hypvars list = [_a,_b,_c,_d]

after some operation involving unification: [_a,p(10),_c,e(_f,_g)]

after restoration by restore_hypvars/2: [_a,_c,_f,_g]

Ie. ensures only the variables are in the list.

BACKTRACKING BEHAVIOUR

No backtracking into this definition.

insert.pro                                              - 176 -

```
:- module(insert).

:- global(insert/4).

{---------------------------------------------------------------------}
{   insert/4                                                          }
{       Hypothesise that arg1 is true in the KB-to-date.              }
{       arg1:   the goal to insert.                                   }
{       arg2:   Data required for depth recursive checks & optimisation }
{       arg3:   the cumulative history of the hypothesis building on  }
{               entry to insert/4                                     }
{       arg4:   the cumulative history of the hypothesis building on  }
{               exitting insert/4                                     }
{---------------------------------------------------------------------}

{---------------------------------------------------------------------}
{       Inserting 'fail' always fails.                                }
{---------------------------------------------------------------------} insert(fail,_r,_l,_l):-
        trace(insert,(fail,_r,_l)),
        !,
        fail.

{---------------------------------------------------------------------}
{       Trap interrupts.                                              }
{---------------------------------------------------------------------} insert(_,_,_l,_):-
        interrupt(_),
        trace(interrupt,_l),
        !,
        fail.

{---------------------------------------------------------------------}
{       Inserting truth:                                              }
{       Inserting 'true' always succeeds.                             }
{---------------------------------------------------------------------} insert(true,_r,_l,_l):-
        trace(insert,(true,_r,_l)),
        !.

{---------------------------------------------------------------------}
{   negation                                                          }
{       delete the negated expression.                                }
{       Any variables in the negation have limited scope, so take a   }
{       copy, making sure to preserve the 'hypvar' variables (variables }
{       representing values introduced in hypothesised facts in the   }
{       add list.                                                     }
{---------------------------------------------------------------------} insert(\+(_y),_r,_l1,_l):-
        !,
        trace(insert,(\+(_y),_r,_l1)),
        hh_data(hypvars,_l1,_vars),
        copy(_y:_vars,_ycopy:_vars),
        delete(_ycopy,_r,_l1,_l).

{---------------------------------------------------------------------}
{ optimisation                                                        }
{       Optimise the returns for the remaining definitions of 'insert' }
{---------------------------------------------------------------------}
``` insert.pro                                          - 177 -

```prolog
insert(_x,_r1,_l1,_l):-
        trace(insert,(_x,_r,_l1)),
        optimise(_r1,_r2),
        insert_opt(_x,_r2,_l1,_l),
        hh_data(state,_l1,_s),
        hh_rdata(scope,_r2,_c),
        hh_consistent(_s,_c,_l).
```

```
{-----------------------------------------------------------------------}
{   insert_opt/4                                                        }
{                                                                       }
{       Definition as for insert, but optimises the call to insert by   }
{       returning solutions in the following order by backtracking:     }
{               0 - proofs                                              }
{               1 - solutions with new KB adds and no new removes       }
{               2 - solutions with KB fact removes and no rule removes  }
{               3 - solutions with new rule removes                     }
{       The types of solutions (0-3) attempted is constrainted by the   }
{       value of 'scope' returned by rdata. Eg. if the calling routine  }
{       is currently considering solutions of type 2, then insert       }
{       will only backtrack to call be invoked with scopes, 0, 1 and 2  }
{       in turn.                                                        }
{-----------------------------------------------------------------------}

{-----------------------------------------------------------------------}
{           Inserting disjunction:                                      }
{           insert the left conjunct or the right one.                  }
{-----------------------------------------------------------------------}
```

```prolog
insert_opt((_x;_y),_r,_l1,_l):-
        !,
        (_z = _x;_z=_y),
        insert(_z,_r,_l1,_l).
```

```
{-----------------------------------------------------------------------}
{ conjunction                                                           }
{       insert the left conjunct then the right one                     }
{-----------------------------------------------------------------------}
```

```prolog
insert_opt((_x,_y),_r,_l1,_l):-
        !,
        insert(_x,_r,_l1,_l2),
        insert(_y,_r,_l2,_l).
```

```
{-----------------------------------------------------------------------}
{ positive literal                                                      }
{       Various types of thing to match against.                        }
{-----------------------------------------------------------------------}
```

```prolog
insert_opt(_x,_r,_l1,_l):-
        ordering(_ord),
        insert_member(_n,_ord),
        insert_typed(_n,_x,_r,_l1,_l).
```

```
{-----------------------------------------------------------------------}
{   insert_typed/5                                                      }
{                                                                       }
{       Definition as for insert_opt/4 but with an extra first argument }
{       used in conjunction with default predicates order_insert/1      }
{       to allow ordering of rule selection.                            }
{-----------------------------------------------------------------------}
```

```
insert.pro                         - 178 -
```

```
{---------------------------------------------------------------}
{ positive literal  #1                                          }
{       Succeeds if the goal arg1 matches an already-hypothesised fact }
{       in the hypothesised KB.  The resulting unification      }
{       This may cause a hypvar to unify with a term, so restore the }
{       hypvar list to a state where it has only variables in it }
{       (including any that occur in the hypvar that has become a term).}
{                                                               }
{       Not available unless factoring=on.                      }
{---------------------------------------------------------------} insert_typed(added,_x,_r,_l1,_l):-
        factoring(on),
        posited_kb(hypothesis,(_x,_l1,_l2)),
        hh_restore_hypvars(_l2,_l).

{---------------------------------------------------------------}
{ positive literal  #2                                          }
{       ADD a new fact to the hypothesised KB.                  }
{---------------------------------------------------------------} insert_typed(new,_x,_r,_l1,_l):-
        update(add,_x,_r,_l1,_l).

{---------------------------------------------------------------}
{ positive literal  #3                                          }
{       Succeeds if the goal arg1 matches a fact in the hypothesised KB }
{       that is also in the original KB .  The resulting unification }
{       may unify a hypvar with a term, so restore the hypvar   }
{       list to a state where it has only variables in it (including }
{       any that occur in the hypvar that has become a term.    }
{---------------------------------------------------------------} insert_typed(fact,_x,_r,_l1,_l):-
        posited_kb(fact,(_x,_l1,_n)),
        hh_restore_hypvars(_l1,_l2),
        update(preserve,_n,_r,_l2,_l).

{---------------------------------------------------------------}
{ positive literal  #4                                          }
{       Succeeds if the goal arg1 matches a rule conclusion     }
{       in the hypothesised KB.  The resulting unification      }
{       may unify a hypvar with a term, so restore the hypvar   }
{       list to a state where it has only variables in it (including }
{       any that occur in the hypvar that has become a term.    }
{       Putting this definition last ensures that solutions are }
{       generated even when a state of infinite recursion is    }
{       encountered.                                            }
{---------------------------------------------------------------} insert_typed(rule,_x,_r1,_l1,_l):-
        posited_kb(rule,(_x,_l1,_body,_n)),
        hh_restore_hypvars(_l1,_l2),
        update(preserve,_n,_r1,_l2,_l3),
        hh_push(insert,_l3,_r1,_r2),
        insert(_body,_r2,_l3,_l).

{---------------------------------------------------------------}
{ insert_member/2                                               }
{                                                               }
{       Selects list elements, head first.                      }
{---------------------------------------------------------------}
``` insert.pro

```
insert_member(_x,[_x|_]).
insert_member(_x,[_|_t]):-
        insert_member(_x,_t).
``` delete.pro                                                          - 180 -

```prolog
:- module(delete).

:- global(delete/4).

{----------------------------------------------------------------------}
{   delete/4                                                           }
{                                                                      }
{       Hypothesise that arg1 is not true in the KB-to-date.           }
{                                                                      }
{       arg1:   the goal to delete.                                    }
{       arg2:   Data required for depth recursive checks & optimisation}
{       arg3:   the cumulative history of the hypothesis building on   }
{               entry to delete/4                                      }
{       arg4:   the cumulative history of the hypothesis building on   }
{               exitting delete/4                                      }
{                                                                      }
{----------------------------------------------------------------------}

{----------------------------------------------------------------------}
{       Deleting falsehood:                                            }
{           Deleting 'fail' always succeeds.                           }
{----------------------------------------------------------------------} delete(fail,_r,_l,_l):-
        trace(delete,(fail,_r,_l1)),
        !.

{----------------------------------------------------------------------}
{       Trap interrupts.                                               }
{----------------------------------------------------------------------} delete(_,_,_l,_):-
        interrupt(_),
        trace(interrupt,_l),
        !,
        fail.

{----------------------------------------------------------------------}
{       Deleting truth:                                                }
{           Deleting 'true' always fails.                              }
{----------------------------------------------------------------------} delete(true,_r,_l1,_):-
        trace(delete,(true,_r,_l1)),
        !,
        fail.

{----------------------------------------------------------------------}
{ negation                                                             }
{                                                                      }
{       Delete not x by inserting x.                                   }
{       Any variables in the negation have limited scope, so take a    }
{       copy, making sure to preserve the 'hypvar' variables (variables}
{       representing values that have been introduced to the hypothesis}
{       history by virtue of being in the Add list).                   }
{----------------------------------------------------------------------} delete(\+(_y),_r,_l1,_l):-
        !,
        trace(delete,(\+(_y),_r,_l1)),
        hh_data(hypvars,_l1,_vars),
        copy(_y:_vars,_ycopy:_vars),
        insert(_ycopy,_r,_l1,_l).
``` delete.pro
- 181 -

```
{------------------------------------------------------------------}
{ optimisation                                                     }
{       Optimise the returns for the remaining definitions of 'delete' }
{------------------------------------------------------------------} delete(_x,_r1,_l1,_l):-
        trace(delete,(_x,_r,_l1)),
        optimise(_r1,_r2),
        delete_opt(_x,_r2,_l1,_l),
        hh_data(state,_l1,_s),
        hh_rdata(scope,_r2,_c),
        hh_consistent(_s,_c,_l).

{------------------------------------------------------------------}
{   delete_opt/4                                                   }
{                                                                  }
{       Definition as for delete, but optimises the call to delete by }
{       returning solutions in the following order by backtracking: }
{                                                                  }
{               0 - proofs                                         }
{               1 - solutions with new KB adds and no new removes  }
{               2 - solutions with KB fact removes and no rule removes }
{               3 - solutions with new rule removes                }
{                                                                  }
{       The types of solutions (0-3) attempted is constrainted by the }
{       value of 'scope' returned by rdata.  Eg. if the calling routine }
{       is currently considering solutions of type 2, then delete  }
{       will only backtrack to reinvoke delete with scopes, 0, 1 and 2 }
{       in turn.                                                   }
{------------------------------------------------------------------}

{------------------------------------------------------------------}
{ disjunction                                                      }
{       Delete the left conjunct and the right one.                }
{------------------------------------------------------------------} delete_opt((_x;_y),_r,_l1,_l):-
        !,
        delete_opt(_x,_r,_l1,_l2),
        delete_opt(_y,_r,_l2,_l).

{------------------------------------------------------------------}
{ conjunction                                                      }
{       Find all proofs of x and for each either delete x or y     }
{       Store the fact that the conjunction is deleted (in case it }
{       pops up again.                                             }
{                                                                  }
{       This routine assumes that x is not itself a conjunct.  Ie. }
{       rule premises and the input goal are represented such that in }
{       any expression, (_a,_b), _a is not a conjunction.          }
{       This does not affect the power of the logical language but }
{       requires that the KB rules and input goal are preprocessed if }
{       necessary (e.g. input goal ( (a,b),  c) would be represented }
{       internally as (a, (b,c)), which is logically equivalent as }
{       far as the prolog proof procedure is concerned.            }
{------------------------------------------------------------------} delete_opt((_x,_y),_r,_l1,_l):-
        !,
        update(deleted,(_x,_y),_r,_l1,_l2),
        _p = proof(_x,_y,_r,_l1),
        delete_get_bag((_x,_y),_p^_p,_set),
        delete_conjunctions(_set,_r,_l2,_l).
``` delete.pro                                                  - 182 -

```
{-------------------------------------------------------------------}
{ Positive literals                                                 }
{       Prohibit x from being ADDed                                 }
{       Get all the facts of the form x and delete each one         }
{       Get all the rules with head = x and either                  }
{               delete the rule                                     }
{            or delete the rule body                                }
{-------------------------------------------------------------------} delete_opt(_x,_r,_l1,_1):-
        update(prohibit,_x,_r,_l1,_l2),
        delete_get_bag(_n,posited_kb(fact,(_x,_l2,_n)),_s1),
        delete_per_facts(_x,_s1,_r,_l2,_l3),
        delete_get_bag((_x:_body,_n),posited_kb(rule,(_x,_l3,_body,_n)),_s2),
        delete_per_rules(_x,_s2,_r,_l3,_1).

{-------------------------------------------------------------------}
{ delete_conjunction/4                                              }
{       Ensure that there are currently no solutions to any of the  }
{       conjunctions in the given list.                             }
{       You do this by deleting either the LHS or RHS conjunct      }
{                                                                   }
{       arg1:   the conjuctions to delete.                          }
{       arg2:   Data required for depth recursive checks & optimisation }
{       arg3:   the cumulative history of the hypothesis building on }
{               entry to delete_conjuctions/4                       }
{       arg4:   the cumulative history of the hypothesis building on }
{               exiting delete_conjuctions/4                        }
{                                                                   }
{ Definition 1: no conjuncts to delete.                             }
{ Definition 2: Delete next conjunct by deleting the LHS.           }
{ Definition 3: ONLY IF the LHS is to be proveable do you need to   }
{               delete the RHS.                                     }
{-------------------------------------------------------------------} delete_conjunctions([],_,_l,_l).

delete_conjunctions([(_x,_)|_t],_r,_l1,_1):-
        delete(_x,_r,_l1,_l2),
        delete_conjunctions(_t,_r,_l2,_1).

delete_conjunctions([(_x,_y)|_t],_r,_l1,_1):-
        hh_proof_level(_r,_pr),
        insert(_x,_pr,_l1,_l2),
        delete(_y,_r,_l2,_l3),
        delete_conjunctions(_t,_r,_l3,_1).

{-------------------------------------------------------------------}
{ delete_per_facts/4                                                }
{                                                                   }
{       arg1:   the facts to delete.                                }
{       arg2:   Data required for depth recursive checks & optimisation }
{       arg3:   the cumulative history of the hypothesis building on }
{               entry to delete_per_facts/4                         }
{       arg4:   the cumulative history of the hypothesis building on }
{               exiting delete_per_facts/4                          }
{                                                                   }
{  For a given list of KB facts, add them to the list of REMOVEs    }
{  Unless you can constraint the value of the literal's hypvars so that }
{  the given literal is no longer proveable by the given fact.      }
{-------------------------------------------------------------------}
``` delete.pro                             - 183 -

```
delete_per_facts(_x,[_n|_t],_r,_l1,_l):-
        id(_f,_a,_m,_,_n),
        functor(_p,_f,_a),
        rclause(_p,true,_,_m),
        constraint_hypvars(_x,_p,_l1,_l2),
        delete_per_facts(_x,_t,_r,_l2,_l).

delete_per_facts(_x,[_n|_t],_r,_l1,_l):-
        update(remove,_n,_r,_l1,_l2),
        delete_per_facts(_x,_t,_r,_l2,_l).
delete_per_facts(_,[],_,_l,_l).
```

```
{------------------------------------------------------------------}
{ delete_per_rules/4                                               }
{                                                                  }
{       arg1:   the rules to delete.                               }
{       arg2:   Data required for depth recursive checks & optimisation }
{       arg3:   the cumulative history of the hypothesis building on }
{               entry to delete_per_rules/4                        }
{       arg4:   the cumulative history of the hypothesis building on }
{               exiting delete_per_rules/4                         }
{                                                                  }
{  For a given list of KB rules, make each non-provable for a given }
{  instantiation of the head.                                      }
{------------------------------------------------------------------} delete_per_rules(_x,[(_:_body,_n)|_t],_r,_l1,_l):-
        id(_f,_a,_m,_,_n),
        functor(_p,_f,_a),
        rclause(_p,_body,_,_m),
        constraint_hypvars(_x,_p,_l1,_l2),
        delete_per_rules(_x,_t,_r,_l2,_l).

delete_per_rules(_x,[(_head:_body,_n)|_t],_r,_l1,_l):-
        delete_unify(_x,_head),
        hh_restore_hypvars(_l1,_l2),
        delete_per_rule((_head:_body,_n),_r,_l2,_l3),
        delete_per_rules(_x,_t,_r,_l3,_l).

delete_per_rules(_x,[],_,_l,_l).
```

```
{------------------------------------------------------------------}
{ delete_per_rule/4                                                }
{                                                                  }
{       arg1:   the rule to delete.                                }
{       arg2:   Data required for depth recursive checks & optimisation }
{       arg3:   the cumulative history of the hypothesis building on }
{               entry to delete_per_rule/4                         }
{       arg4:   the cumulative history of the hypothesis building on }
{               exiting delete_per_rule/4                          }
{                                                                  }
{                                                                  }
{  Make a rule non-provable for a given instantiation of the head, }
{  either by deleting it, or deleting the corresponding body.      }
{                                                                  }
{  You can optimise this further for some KBs by preferring to     }
{  delete a body than to delete the rule (on the grounds that this }
{  is, by some measure, better.  However the danger in reordering the }
{  following two rules is that the processing does not terminate. eg. }
{  deleting p where p:-\+(p) will produce solutions in finite time }
{  currently but would not if the order of the following two rules }
{  were changed (unless there was a recursive depth check).        }
``` delete.pro                                    - 184 -

```
{                                                                          }
{  NB.  Optimisation using filters may nullify the some effects of         }
{       ordering.                                                          }
{--------------------------------------------------------------------------} delete_per_rule((_,_n),_r,_l1,_1):-
        update(remove,_n,_r,_l1,_1).

delete_per_rule((_x:_body,_n),_r1,_l1,_1):-
        hh_push(delete,_l1,_r1,_r2),
        delete(_body,_r2,_l1,_1).

{--------------------------------------------------------------------------}
{  delete_get_bag/3                                                        }
{                                                                          }
{ Like bagof, but finds all solutions and never fails (ie. returns         }
{ empty list rather than fail if there are no solutions).                  }
{--------------------------------------------------------------------------} delete_get_bag(_a,_b,_c):-
        bagof(_a,_b^_b,_c),
        !.
delete_get_bag(_,_,[]).

{ what if you have p(_1,_2,_3) and p(_4,_5,_4) ???? }
{ You can take a copy but you have to preserve the hypvars }
{ then if they get further unified during the deletion then }
{ you have to fork, allowing the unification to succeed, or
allowing the deletion of the stronger statement where the
rule head term has not been unified with the hypvar.
I think you can check on exit from the rule body deletion
 whether the hypvar list is intact or not }

{--------------------------------------------------------------------------}
{  delete_unify/2                                                          }
{                                                                          }
{ Unifies rule head arg2 to the extent that it would be further            }
{ instantiated by unifying with arg1, but without further instantiating    }
{ arg1.  Arg3 is a list of the variables in arg1 and what they would be    }
{ unified to.                                                              }
{--------------------------------------------------------------------------} delete_unify(_x,_y):-
        varsin(_x,_1),
        delete_unify(_x,_y,_1),
        delete_binding(_1,_1).

delete_unify(_x,_y,_1):-
        var(_x),
        delete_member(_m:_z,_1),
        _m==_x,
        _y = _z,
        !.

delete_unify(_x,_y,_1):-
        ground(_x),
        _x = _y,
        !.

delete_unify([_h1|_t1],[_h2|_t2],_1):-
``` delete.pro                                    - 185 -

```
        !,
        delete_unify(_h1,_h2,_l),
        delete_unify(_t1,_t2,_l).

delete_unify(_p1,_p2,_l):-
        nonvar(_p2),
        _p1 =.. [_f|_t1],
        _p2 =.. [_f|_t2],
        !,
        delete_unify(_t1,_t2,_l).

delete_unify(_p1,_p2,_l):-
        _p1 =.. [_f|_t1],
        !,
        delete_unify(_t1,_t2,_l),
        _p2 =.. [_f|_t2].

delete_binding([_h:_h|_t],_l):-
        delete_count(_h,_l,1),
        !,
        delete_binding(_t,_l).

delete_binding([_|_t],_l):-
        delete_binding(_t,_l).

delete_binding([],_l).

delete_count(_x,[_h:_|_t],_n):-
        nonvar(_h),
        !,
        fail.

delete_count(_x,[_h:_|_t],_n):-
        _x == _h,
        _m is _n - 1,
        !,
        delete_count(_x,_t,_m).

delete_count(_x,[_:_|_t],_n):-
        _n > -1,
        !,
        delete_count(_x,_t,_n).

{------------------------------------------------------------------}
{        delete_member/2                                           }
{------------------------------------------------------------------} delete_member(_x,[_x|_]).

delete_member(_x,[_|_t]):-
        delete_member(_x,_t).
delete_count(_x,nil,0).
``` update.pro  − 186 −

```
:- module(update).

:- global(update/5).

{---------------------------------------------------------------------}
{   update/5                                                          }
{                                                                     }
{ arg1: type of data to add.                                          }
{ arg2: the data.                                                     }
{ arg3: data related to the recursive depth of the corresponding      }
{       proof.                                                        }
{ arg4: the input data structure                                      }
{ arg5: the output data structure                                     }
{                                                                     }
{ These are the access predicates for updating the current state of   }
{ the hypothesised KB in terms of what must be done to the actual     }
{ KB:                                                                 }
{                                                                     }
{       kept in     - arg1 = 'preserve' (facts & rules)               }
{       kept out    - arg1 = 'prohibit' (positive literals)           }
{       put in      - arg1 = 'add'      (positive literals)           }
{       taken out   - arg1 = 'remove'   (positive literals)           }
{       deleted     - arg1 = 'deleted'  (conjunctions)                }
{       constraint  - arg1 = 'constraint'(constraints on values)      }
{                                                                     }
{ You can't:                                                          }
{       Add something that's prohibited.                              }
{       Remove something that's preserved.                            }
{       Prohibit something that's added.                              }
{                                                                     }
{       Constraint satifaction: the reasoner introduces individuals   }
{       as prolog variables.  If at the end of the reasoning, the     }
{       transaction contains such variables, then values have to be   }
{       assigned to the variables (or they can be left as variables   }
{       being universally quantified after assertion in the KB).      }
{       The constraint list contains pairs of lists, which define     }
{       constraints on the value of such variables.                   }
{                                                                     }
{       Scope check: if a calling insert/delete is looking for        }
{       constrained solutions (eg. proofs only) then do not follow    }
{       solutions that violate that constraint.                       }
{                                                                     }
{       Depth check: if a recursive depth limit is specified then     }
{       do not perform update operations beyond this depth.  ie.      }
{       ignore any solutions which would require SLDNF proof with     }
{       recursive depth > limit (except in the case of negation       }
{       by failure, where this depth may be exceeded as long as       }
{       there are no related updates specified.                       }
{                                                                     }
{       Best so far: cost/4 calculates the cumulative cost of         }
{       the transaction being built.  If it becomes costlier than the }
{       best-to-date solution then force failure in order to abandon  }
{       this particular solution.                                     }
{---------------------------------------------------------------------}

{---------------------------------------------------------------------}
{       If the reasoner is timing-out then fail.                      }
{---------------------------------------------------------------------}
update(_,_,_,_,_):-
        timing_out,
        !,
        fail.
``` update.pro - 187 -

```
{---------------------------------------------------------------}
{       If there is a constraint on feasible operations, check the    }
{       operation type.                                               }
{---------------------------------------------------------------} update(_a,_x,_r,_,_):-
        hh_rdata(scope,_r,_s),
        update_illegal(_a,_x,_s),
        !,
        fail.

{---------------------------------------------------------------}
{       If there is an operational check on recursive depth and the  }
{       limit is reached then fail.                                  }
{       Depth limit is defined as an integer which is decremented    }
{       at each new level.  If it starts +ve then the deepest        }
{       insertions will be when the depth limit is zero.  If negative}
{       then update fails.                                           }
{---------------------------------------------------------------} update(_,_,_r,_,_):-
        hh_rdata(depth,_r,0),
        !,
        fail.

{---------------------------------------------------------------}
{       If it's in there already then don't add it.                  }
{---------------------------------------------------------------} update(_a,_x,_r,_l1,_l):-
        hh_data(_a,_l1,_y),
        update_member(_z,_y),
        _x == _z,
        !,
        constraint_satisfaction(_l1,_l).

{---------------------------------------------------------------}
{       You cannot add an eventuality that is already instantiated.  }
{       It is set to a negative object number to make it unique but  }
{       "unreal".                                                    }
{                                                                    }
{       You can add something to the KB if it is not prohibited.     }
{       If it matches something in the 'prohibited' list then this   }
{       tries to constrain variables so that unification will not    }
{       occur when attempting a proof in the hypothesised KB.        }
{       If adds are disallowed then the operation fails.             }
{---------------------------------------------------------------} update(add,_x,_r,_l1,_l):-
        modality(add,fact,on),
        arg(1,_x,_v),
        var(_v),
        _v = - _obj,
        kb_next_object(_obj),
        hh_data(prohibit,_l1,_plist),
        update_add_newvars(_x,_l1,_l2),
        constraint_add(_x,_plist,_l2,_l3),
        update_eventuality_consistency(_x,_r,_l3,_l4),
        hh_new_data(add,_l4,_x,_l5),
        constraint_satisfaction(_l5,_l6),
        cost(add,_x,_l6,_l).

{---------------------------------------------------------------}
{       You can't remove something from the KB is your reasoning to date}
```

```
update.pro                        - 188 -

{       depends on it being present in the KB (preserved).          }
{       If remove are disallowed for this data then the operation fails.}
{-------------------------------------------------------------------} update(remove,_x,_r,_l,_):-
        hh_data(preserve,_l,_p),
        update_member(_x,_p),
        !,
        fail.

update(remove,_x,_r,_l1,_1):-
        update_removeable(_x),
        hh_new_data(remove,_l1,_x,_l2),
        constraint_satisfaction(_l2,_l3),
        cost(remove,_x,_l3,_1).

{-------------------------------------------------------------------}
{       If you delete a conjunction then it is recorded here.  (it may }
{       become proveable in the hypothesised KB by virtue of later  }
{       reasoning steps, so you need to preserve this info for checking }
{       and - if required - further deleting later.                 }
{-------------------------------------------------------------------} update(deleted,_x,_r,_l1,_1):-
        hh_new_data(deleted,_l1,_x,_l2),
        constraint_satisfaction(_l2,_l3),
        cost(deleted,_x,_l3,_1).

{-------------------------------------------------------------------}
{       You cannot preserve a KB clause that has already been removed }
{       from the hypothesised KB.                                   }
{-------------------------------------------------------------------} update(preserve,_x,_r,_l1,_):-
        hh_data(remove,_l1,_p),
        update_member(_x,_p),
        !,
        fail.

update(preserve,_x,_r,_l1,_1):-
        hh_new_data(preserve,_l1,_x,_l2),
        constraint_satisfaction(_l2,_l3),
        cost(preserve,_x,_l3,_1).

{-------------------------------------------------------------------}
{       You cannot prohibit a KB clause that has already been added }
{       to the hypothesised KB.                                     }
{-------------------------------------------------------------------} update(prohibit,_x,_r,_l1,_1):-
        hh_data(add,_l1,_plist),
        constraint_prohibit(_x,_plist,_l1,_l2),
        hh_new_data(prohibit,_l2,_x,_l3),
        constraint_satisfaction(_l3,_l4),
        cost(prohibit,_x,_l4,_1).

update(constraint,_x,_r,_l1,_1):-
        hh_new_data(constraint,_l1,_x,_l2),
        cost(constraint,_x,_l2,_1).

{-------------------------------------------------------------------}
{ update_add_newvars/3                                              }
{                                                                   }
``` update.pro  — 189 —

{ -  Add any vars in args to the hypvars list, unless already there. }
{-------------------------------------------------------------------}

```
update_add_newvars(_x,_l1,_1):-
        hh_data(hypvars,_l1,_v11),
        addvars(_x,_v11,_v12),
        hh_replace(hypvars,_v12,_l1,_1).
```

{-------------------------------------------------------------------}
{ update_member/2                                                   }
{                                                                   }
{ Find elements of a list of form _n:_x and return _x               }
{-------------------------------------------------------------------}

```
update_member(_x,[_:_x|_]).

update_member(_x,[_|_t]):-
        update_member(_x,_t).
```

{-------------------------------------------------------------------}
{ update_illegal/2                                                  }
{       Operation arg1 of data arg2 on the hypothesis history structure }
{       is illegal in the case that the solution looked for is to be }
{       of type arg3.                                               }
{-------------------------------------------------------------------}

```
update_illegal(add,_,0).
update_illegal(remove,_,0).
update_illegal(remove,_,1).
update_illegal(remove,_/rule,2).
```

{-------------------------------------------------------------------}
{ update_removeable/1                                               }
{       You can only remove facts/rules if the default is set to allow }
{       this.                                                       }
{-------------------------------------------------------------------}

```
update_removeable(_/_type):-
        modality(remove,_type,on).
```

{-------------------------------------------------------------------}
{ update_eventuality_consistency/4                                  }
{       If the added eventuality argument is a constant that is already }
{       in use as an eventuality argument in a fact, then the existing }
{       usage must be deleted before the insertion of the new one can }
{       be allowed.                                                 }
{-------------------------------------------------------------------}

```
update_eventuality_consistency(_x,_r,_l1,_1):-
        eventuality(on),
        _x =.. [_,_e|_],
        hh_data(add,_l1,_list),
        update_added_eventuality(_e,_list),
        !,
        fail.

update_eventuality_consistency(_x,_r,_l1,_1):-
        eventuality(on),
        _x =.. [_,_e|_],
        ground(_e),
``` update.pro                                    - 190 -

```
        kb_set(_internal),
        kb_eventuality_pred(ground,fact,_internal,_ref,_e,_pred),
        has_a_definition(_pred),
        call(_pred),
        rclause(_p,_,_,_ref),
        !,
        delete(_p,_r,_ll,_l).

update_eventuality_consistency(_x,_r,_l,_l).

{---------------------------------------------------------------------}
{ update_added_eventuality/2                                          }
{       Check if the added eventuality argument is already Add'ed.    }
{---------------------------------------------------------------------} update_added_eventuality(_e,[_:_p|_]):-
        _p =.. [_,_f|_],
        _e == _f.

update_added_eventuality(_e,[_:_p|_t]):-
        update_added_eventuality(_e,_t).
```

I claim:

1. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, said abducer being operable to define in said record facts or other statements whose presence in the knowledge base has been relied upon in said reasoning operations and to prohibit hypothesized or actual removal from said knowledge base of said defined facts or other statements during subsequent processing.

2. Apparatus according to claim 1, wherein said hypothesised changes comprise adding facts to said knowledge base.

3. Apparatus according to claim 1, wherein said record defines said facts added to said knowledge base.

4. Apparatus according to claim 1, wherein said hypothesised changes include removal of facts from said knowledge base.

5. Apparatus according to claim 4, wherein said record defines said facts removed from said knowledge base.

6. Apparatus according to claim 1, wherein said hypothesised changes include removal of rules from said knowledge base.

7. Apparatus according to claim 6, wherein said record defines said rules removed from said knowledge base.

8. Apparatus according to claim 1, wherein said abducer is operable to process goals in the form of negative conjunctions.

9. Apparatus according to claim 8, wherein said hypothesised changes include deleting conjunctions and said record defines said deleted conjunctions.

10. Apparatus according to claim 1, wherein said abducer is operable to perform said testing for contradictions after the completion of all of the first and second reasoning steps in the reasoning operation.

11. Apparatus according to claim 1, wherein said abducer is operable to perform said testing at least some of said second reasoning steps.

12. Apparatus according claim 11, wherein said abducer is operable to perform said testing at each of said second reasoning steps.

13. Apparatus according to claim 1, wherein said abducer is operable to perform some of said tests for contradiction at said second reasoning steps and at least one further test for contradiction after completion of all of said first and second reasoning steps.

14. Apparatus according to claim 1, wherein said abducer is operable to process goals in the form of positive and negative literals and positive and negative conjunctions; wherein said hypothesised changes comprise adding facts to the knowledge base, removing facts from the knowledge base, removing rules from the knowledge base, and deleting conjunctions; wherein said record defines facts whose presence in the knowledge base is relied on in said first reasoning steps, defines facts whose unprovability has been relied on in said first reasoning steps, defines said facts added to said knowledge base, defines said facts removed from said knowledge base, defines said rules removed from said knowledge base and defines said deleted conjunctions; wherein said abducer is operable to perform at said second reasoning steps tests for contradiction with said defined facts whose presence is relied upon, said defined facts whose unprovability is relied upon, said defined facts added, said defined facts removed, and said defined rules removed; and wherein said abducer is operable to perform tests for contradiction with said defined deleted conjunctions after completion of all of said first and second reasoning steps.

15. Apparatus according to claim 1, wherein, upon detection of a contradiction in a partially completed reasoning operation, processing of said partially completed reasoning operation is terminated or suspended.

16. Apparatus according to claim 1, wherein, upon detection of a contradiction in a partially completed reasoning operation, said abducer is operable to determine whether processing of said partially completed reasoning operation may continue without contradiction by constraining variables in said data and/or in said goals, and to continue said processing with constraints on said variables to avoid said contradictions.

17. Apparatus according to claim 16, wherein processing of said partially completed reasoning operation is terminated or suspended when said abducer determines that said contradiction cannot be avoided by effecting said constraining.

18. Apparatus according to claim 1, wherein said abducer is operable to assign a cost to said reasoning steps and to determine on the basis of said assigned cost, a total cost for a reasoning operation.

19. Apparatus according to claim 18, wherein said abducer is operable to calculate the cumulative cost of the reasoning operation at intervals during said reasoning operation.

20. Apparatus according to claim 19, wherein said intervals are such that said abducer calculates the cumulative cost of the reasoning operation at each said second reasoning step.

21. Apparatus according to claim 19, wherein said abducer is operable at each said interval to compare the cumulative cost of the partially completed reasoning operation currently being processed to the cumulative cost of the least costly of any previously completed reasoning operations, and to terminate or suspend said partially completed reasoning operation if its cumulative cost has reached the cumulative cost of said least costly of said previously completed reasoning operations.

22. Apparatus according to claim 21, wherein said abducer is operable to select, from different reasoning operations proving the same goal, that operation having total cost indicating that it is likely to provide the best solution.

23. Apparatus according to claim 1, wherein said abducer is operable to group solutions to the same goal according to the nature of the reasoning steps performed in the reasoning operation.

24. Apparatus according to claim 23, wherein said hypothesised changes comprise adding facts to said knowledge base; said hypothesised changes include removal of facts from said knowledge base; and said grouping comprises placing in a first group reasoning operations in which only said first reasoning steps are performed, placing in a second group reasoning operations relying upon facts hypothetically added to the knowledge base and placing in a third group reasoning operations relying upon data hypothetically removed from the knowledge base.

25. Apparatus according to claim 24, wherein said groups are numbered according to a predetermined criterion, and wherein said abducer is operable to select solutions in a lower-numbered said group in preference to solutions in a higher-numbered said group.

26. Apparatus according to claim 23, wherein said hypothesised changes comprise adding facts to said knowledge base; said hypothesised changes include removal of facts from said knowledge base; said hypothesised changes include removal of rules from said knowledge base; and said grouping comprises placing in a first group reasoning operations in which only said first reasoning steps are performed, placing in a second group reasoning operations in which data representing hypothesised addition of facts to the knowledge base is relied upon, placing in a third group reasoning operations in which data representing hypothesised removal of facts from the knowledge base is relied upon, and placing in a fourth group reasoning operations in which data representing hypothesised removal of rules from the knowledge base is relied upon.

27. Apparatus according to claim 23, wherein said grouping of said reasoning operations is performed during the performance of said reasoning steps.

28. Apparatus according to claim 23, wherein the grouping of said reasoning operations is performed after completion of the reasoning operation.

29. Apparatus according to claim 1, wherein said abducer is operable to seek said proof of a goal by pursuing reasoning operations involving only said first reasoning steps before seeking a said proof of a goal by pursuing reasoning operations involving said second reasoning steps.

30. Apparatus according to claim 29, wherein said abducer is operable, when pursuing said proof of a goal by reasoning operations involving said second reasoning steps, to pursue reasoning operations involving a predetermined type or types of said second reasoning steps before pursuing reasoning operations involving a different type or types of said second reasoning steps.

31. Apparatus according to claim 30, wherein said hypothesised changes comprise adding facts to said knowledge base; said hypothesised changes include removal of facts from said knowledge base; said hypothesised changes include removal of rules from said knowledge base; and said abducer is operable, when performing reasoning operations involving said second reasoning steps:

(a) to pursue in a first phase reasoning operations wherein hypothesised changes consisting of adding facts are permitted but hypothesised changes consisting of removing facts or rules are not permitted;

(b) thereafter to pursue in a second phase reasoning operations wherein hypothesised changes consisting of adding facts and removing facts are permitted but hypothesised changes consisting of removing rules are not permitted; and (c) subsequently to pursue in a third phase reasoning operations wherein hypothesised changes consisting of adding and removing facts and removing rules are permitted.

32. Apparatus according to claim 31, wherein:

(a) said first phase comprises a plurality of sub-phases in each of which reasoning operations involving only said first reasoning steps are first permitted and thereafter hypothesised changes consisting of adding facts are permitted but removing facts and rules is not permitted;

(b) said second phase comprises a plurality of sub-phases in each of which, firstly, reasoning operations involving only said first reasoning steps are permitted, then, hypothesised changes consisting of adding facts are permitted but removing facts and rules is not permitted, and thereafter hypothesised changes consisting of adding facts and removing facts are permitted but removing rules is not permitted; and (c) said third phase comprises a plurality of sub-phases in each of which, firstly, reasoning operations involving only said first reasoning steps are permitted, then hypothesised changes involving the addition of facts are permitted but removing facts and rules is not permitted, thereafter hypothesised changes involving the addition or removal of facts are permitted but the removal of rules is not permitted, and subsequently hypothesised changes involving adding and removing facts and removing rules are permitted.

33. Apparatus according to claim 1, wherein said abducer is operable for performing successive said reasoning operations for obtaining proofs of successive goals, said abducer further being operable in each said successive reasoning operation to test for contradictions in the reasoning operation utilising both said record provided in the current reasoning operation and said record or records provided in the previous reasoning operation or operations in said succession.

34. Apparatus according to claim 1, including means for deductively checking proofs obtained by said abductive reasoning operations.

35. Apparatus according to claim 1, including means for hypothesising rules and recording said hypothesised rules, said abducer being further operable to perform said abductive reasoning operations relying upon said hypothesised rules.

36. Apparatus according to claim 1, wherein said abducer is operable to refer to data identifying non-abduceable facts and in response thereto to avoid providing proofs relying upon said non-abduceable facts.

37. Data processing apparatus comprising means for storing a knowledge base containing data defining a plurality of facts and/or rules; and an abducer operable to perform deductive reasoning operations for providing a proof of a goal, said reasoning operations including first reasoning steps relying upon the data in the knowledge base and second reasoning steps relying upon data representing hypothesized changes in the knowledge base, said abducer being operable to provide in said memory means a record defining the data relied on in the reasoning steps, to test for contradictions in said reasoning operation utilizing said record, and to determine subsequent processing dependent on the result of the testing, said abducer being operable to define in said record facts whose unprovability has been relied upon in said reasoning operations and to prohibit abductive addition to said knowledge base of said defined unprovable facts during subsequent processing.

38. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, processing of said partially completed reasoning operation is terminated or suspended, and wherein said abducer is operable to perform said abductive reasoning operations by a process which includes a plurality of choice points from each of which processing may continue along any of a number of processing paths, and wherein upon a said termination or suspension of a reasoning operation, processing backtracks to a previous choice point and continues from said choice point along a processing path not previously used in said reasoning operation.

39. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesised changes in the knowledge base, wherein said abducer is operable to test for predetermined contradictions during said reasoning operation and, upon detection of a said predetermined contradiction in a partially completed reasoning operation, to determine whether processing of said partially completed reasoning operation may continue without contradiction by constraining variables in said data and/or in said goals, and to continue said processing with constraints on said variables to avoid said contradictions.

40. Apparatus according to claim 39, wherein processing of said partially completed reasoning operation is terminated or suspended when said abducer determines that said contradiction cannot be avoided by effecting said constraining.

41. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, wherein said abducer is operable to assign a cost to said reasoning steps and to determine on the basis of said assigned cost, a total cost for a reasoning operation, wherein said abducer is operable to calculate the cumulative cost of the reasoning operation at intervals during said reasoning operation, and wherein said abducer is operable at each said interval to compare the cumulative cost of the partially completed reasoning operation currently being processed to the cumulative cost of the least costly of any previously completed reasoning operations, and to terminate or suspend said partially completed reasoning operation if its cumulative cost has reached the cumulative cost of said least costly of said previously completed reasoning operations.

42. Apparatus according to claim 41, wherein said intervals are such that said abducer calculates the cumulative cost of the reasoning operation at each said second reasoning step.

43. Apparatus according to claim 41, wherein said abducer is operable to select, from different reasoning operations proving the same goal, that operation having total cost indicating that it is likely to provide the best solution.

44. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesised changes in the knowledge base, wherein said abducer is operable, when performing reasoning operations involving said second reasoning steps:

(a) to pursue in a first phase reasoning operations wherein hypothesised changes consisting of adding facts are permitted but hypothesised changes consisting of removing facts or rules are not permitted, said first phase comprising a plurality of sub-phases in each of which reasoning operations involving only said first reasoning steps are first permitted and thereafter hypothesised changes consisting of adding facts are permitted but removing facts and rules is not permitted;

(b) thereafter to pursue in a second phase reasoning operations wherein hypothesised changes consisting of adding facts and removing facts are permitted but hypothesised changes consisting of removing rules are not permitted, said second phase comprising a plurality of sub-phases in each of which, firstly, reasoning operations involving only said first reasoning steps are permitted, then, hypothesised changes consisting of adding facts are permitted but removing facts and rules is not permitted, and thereafter hypothesised changes consisting of adding facts and removing facts are permitted but removing rules is not permitted; and (c) subsequently to pursue in a third phase reasoning operations wherein hypothesised changes consisting of adding and removing facts and removing rules are permitted, said third phase comprising a plurality of sub-phases in each of which, firstly, reasoning operations involving only said first reasoning steps are permitted, then hypothesised changes involving the addition of facts are permitted but removing facts and rules is not permitted, thereafter hypothesised changes involving the addition or removal of facts are permitted but the removal of rules is not permitted, and subsequently hypothesised changes involving adding and removing facts and removing rules are permitted.

45. Apparatus for producing control signals relating to a predetermined process or system, comprising:

(a) input means for receiving input signals from said process or system and for converting said signals into goals;

(b) data processing apparatus comprising means for storing a knowledge base containing data defining a plurality of facts and rules relating to said process or system, and an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and (c) output means arranged to receive from said data processing apparatus said output data and operable to convert said commands to said control signals, wherein said input means comprises a look-up table containing a list of goals which may be supplied to the data processing apparatus, said input means being operable to apply said input signals to said look-up table to obtain therefrom a corresponding goal.

46. Apparatus according to claim 45, wherein said commands are made available for output as a consequence of a said second reasoning step in which data representing said command is relied upon in a hypothesized change in the knowledge base.

47. Apparatus according to claim 45, wherein said commands are made available as hypothesized addition of facts corresponding to said commands to the knowledge base.

48. Apparatus according to claim 45, including means for changing the data in the knowledge base in response to signals received by said input means and output data from said data processing apparatus.

49. Apparatus for producing control signals relating to a predetermined process or system, comprising:
  (a) input means for receiving input signals from said process or system and for converting said signals into goals;
  (b) data processing apparatus comprising means for storing a knowledge base containing data defining a plurality of facts and rules relating to said process or system, and an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and
  (c) output means arranged to receive from said data processing apparatus said output data and operable to convert said commands to said control signals,
wherein said output means comprises a look-up table defining control signals to be output dependent upon the output data from said data processing apparatus, said output means being operable to apply said output data to said look-up table for obtaining said control signals.

50. Apparatus for producing control signals relating to a predetermined process or system, in combination with a machine controlled thereby, said apparatus comprising:
  (a) input means for receiving input signals from said process or system and for converting said signals into goals;
  (b) data processing apparatus comprising means for storing a knowledge base containing base defining a plurality of facts and rules relating to said process or system, and an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and
  (c) output means arranged to receive from said data processing apparatus said output data and operable to convert said commands to said control signals,
and said machine including means for generating signals indicative of the status of at least a part or parts thereof and supplying said signals to said input means for conversion to goals, and control means arranged to receive said control signals from said control signal generating apparatus and operable to control said machine in accordance with said control signals.

51. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, processing of said partially completed reasoning operation is terminated or suspended.

52. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, said abducer is operable to determine whether processing of said partially completed reasoning operation may continue without contradiction by constraining variables in said data and/or in said goals, and to continue said processing with constraints on said variables to avoid said contradictions.

53. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to assign a cost to said reasoning steps and to determine on the basis of said assigned cost, a total cost for a reasoning operation, wherein said abducer is operable to calculate the cumulative cost of the reasoning operation at intervals during said reasoning operation, and
  wherein said abducer is operable at each said interval to compare the cumulative cost of the partially completed reasoning operation currently being processed to the cumulative cost of the least costly of any previously completed reasoning operations, and to terminate or suspend said partially completed reasoning operation if its cumulative cost has reached the cumulative cost of said least costly of said previously completed reasoning operations.

54. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to seek said proof of a goal by pursuing reasoning operations involving only said first reasoning steps before seeking a said proof of a goal by pursuing reasoning operations involving said second reasoning steps.

55. Data processing apparatus comprising means for storing a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to refer to data identifying non-abduceable facts and in response thereto to avoid providing proofs relying upon said non-abduceable facts.

56. A computer-readable memory medium storing instructions for causing a programmable apparatus to store a knowledge base containing data defining a plurality of facts and/or rules; and to act as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, said abducer being operable to define in said record facts or other statements whose presence in the knowledge base has been relied upon in said reasoning operations and to prohibit hypothesized or actual removal from said knowledge base of said defined facts or other statements during subsequent processing.

57. A computer-readable memory medium storing instructions for causing a programmable apparatus to store a knowledge base containing data defining a plurality of facts and/or rules; and to act as an abducer operable to perform deductive reasoning operations for providing a proof of a goal, said reasoning operations including first reasoning steps relying upon the data in the knowledge base and second reasoning steps relying upon data representing hypothesized changes in the knowledge base, said abducer being operable to provide in said memory means a record defining the data relied on in the reasoning steps, to test for contradictions in said reasoning operation utilizing said record, and to determine subsequent processing dependent on the result of the testing, said abducer being operable to define in said record facts whose unprovability has been relied upon in said reasoning operations and to prohibit abductive addition to said knowledge base of said defined unprovable facts during subsequent processing.

58. A computer-readable memory medium storing instructions for causing a programmable apparatus to store a knowledge base containing data defining a plurality of facts and/or rules; and to act as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, processing of said partially contemplated reasoning operation is terminated or suspended, and wherein said abducer is operable to perform said abductive reasoning operations by a process which includes a plurality of choice points from each of which processing may continue along any of a number of processing paths, and wherein upon a said termination or suspension of a reasoning operation, processing backtracks to a previous choice point and continues from said choice point along a processing path not previously used in said reasoning operation.

59. A computer-readable member memory medium storing instructions for causing a programmable apparatus to store a knowledge base containing data defining a plurality of facts and/or rules; and an abducer operable to perform abductive reasoning operations for providing a proof of a goal, said reasoning operations including first reasoning steps relying upon the data in the knowledge base and second reasoning steps relying upon data representing hypothesized changes in the knowledge base, wherein said abducer is operable to assign a cost to said reasoning steps and to determine on the basis of said assigned cost, a total cost for a reasoning operation, wherein said abducer is operable to calculate the cumulative cost of the reasoning operation at intervals during said reasoning operation, and wherein said abducer is operable at each said interval to compare the cumulative cost of the partially completed reasoning operation currently being processed to the cumulative cost of the least costly of any previously completed reasoning operations, and to terminate or suspend said partially completed reasoning operation if its cumulative cost has reached the cumulative cost of said least costly of said previously completed reasoning operations.

60. A computer-readable memory medium storing instructions for causing a programmable apparatus to produce control signals relating to a predetermined process or system, by performing a method comprising the steps of:

(a) receiving input signals from said process or system and for converting said signals into goals by referring to a look-up table containing a list of goals;

(b) storing a knowledge base containing data defining a plurality of facts and rules relating to said process or system, and acting as an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and (c) receiving said output data and converting said commands to said control signals.

61. A computer-readable memory medium storing instructions for causing a programmable apparatus to produce control signals relating to a predetermined process or system, and to perform a method comprising the steps of:

(a) receiving input signals from said process or system and for converting said signals into goals;

(b) storing a knowledge base containing data defining a plurality of facts and rules relating to said process or system, and acting as an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and (c) receiving said output data and operable to convert said commands to said control signals, by applying said output data to a look-up table defining control signals to be output dependent upon the output data.

62. A computer-readable memory medium storing instructions for causing a programmable apparatus to produce control signals relating to a predetermined process or system, and to perform, in combination with a machine controlled thereby, a method comprising the steps of:

(a) receiving input signals from said process or system and for converting said signals into goals;

(b) storing a knowledge base containing data defining a plurality of facts and rules relating to said process or system, and acting as an abducer operable to perform abductive reasoning operations for providing a proof of a said goal, said reasoning operations including first reasoning steps relying upon the data in the knowledge base and second reasoning steps relying upon data representing hypothesized changes in the knowledge base, said rules containing premises in the form of commands defining control signals to be produced and said abducer being operable to provide said commands in output data dependent upon proof of a said goal; and (c) receiving said output data and converting said commands to said control signals, and said machine including means for generating signals indicative of the status of at least a part or parts thereof and supplying said signals for conversion to goals, and control means arranged to receive said control signals and operable to control said machine in accordance with said control signals.

63. A computer-readable memory medium storing instructions for causing a programmable apparatus to perform a method comprising the steps of: storing a knowledge base containing data defining a plurality of facts and/or rules; and acting as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, processing of said partially completed reasoning operation is terminated or suspended.

64. A computer-readable memory medium storing instructions for causing a programmable apparatus to perform a method comprising the steps of: storing a knowledge base containing data defining a plurality of facts and/or rules; and acting as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein, upon detection of a contradiction in a partially completed reasoning operation, said abducer is operable to determine whether processing of said partially completed reasoning operation may continue without contradiction by constraining variables in said data and/or in said goals, and to continue said processing with constraints on said variables to avoid said contradictions.

65. A computer-readable memory medium storing instructions for causing a programmable apparatus to perform a method comprising the steps of: storing a knowledge base containing data defining a plurality of facts and/or rules; and acting as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to assign a cost to said reasoning steps and to determine on the basis of said assigned cost, a total cost for a reasoning operation, wherein said abducer is operable to calculate the cumulative cost of the reasoning operation at intervals during said reasoning operation, and wherein said abducer is operable at each said interval to compare the cumulative cost of the partially completed reasoning operation currently being processed to the cumulative cost of the least costly of any previously completed reasoning operations, and to terminate or suspend said partially completed reasoning operation if its cumulative cost has reached the cumulative cost of said least costly of said previously completed reasoning operations.

66. A computer-readable memory medium storing instructions for causing a programmable apparatus to perform a method comprising the steps of: storing a knowledge base containing data defining a plurality of facts and/or rules; and acting as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to seek said proof of a goal by pursuing reasoning operations involving only said first reasoning steps before seeking a said proof of a goal by pursuing reasoning operations involving said second reasoning steps.

67. A computer-readable memory medium storing instructions for causing a programmable apparatus to perform a method comprising the steps of: storing a knowledge base containing data defining a plurality of facts and/or rules; and acting as an abducer operable to perform abductive reasoning operations for providing a proof of a goal, said reasoning operations including first reasoning steps relying upon the data in the knowledge base and second reasoning steps relying upon data representing hypothesized changes in the knowledge base, said abducer being operable to provide a record defining the data relied on in the reasoning steps, to test for contradictions in said reasoning operation utilizing said record, and to determine subsequent processing dependent on the result of the testing, wherein said abducer is operable to refer to data identifying non-abduceable facts and in response thereto to avoid providing proofs relying upon said non-abduceable facts.

* * * * *

UNITED STATES PATENT AND TRADEMARK OFFICE
CERTIFICATE OF CORRECTION

PATENT NO. : 5,812,994

DATED : September 22, 1998

INVENTOR(S) : WILLIAM GEORGE IMLAH

Page 1 of 4

It is certified that error appears in the above-identified patent and that said Letters Patent is hereby corrected as shown below:

Item [30] Foreign Application Priority Data,
"9310410" should read --9310410.7--.
Item [56] References Cited, OTHER PUBLICATIONS, under
Thirunarayan, "cybernatics" should read --cybernetics--.

In the Drawings:

SHEET 25

Figure 24:
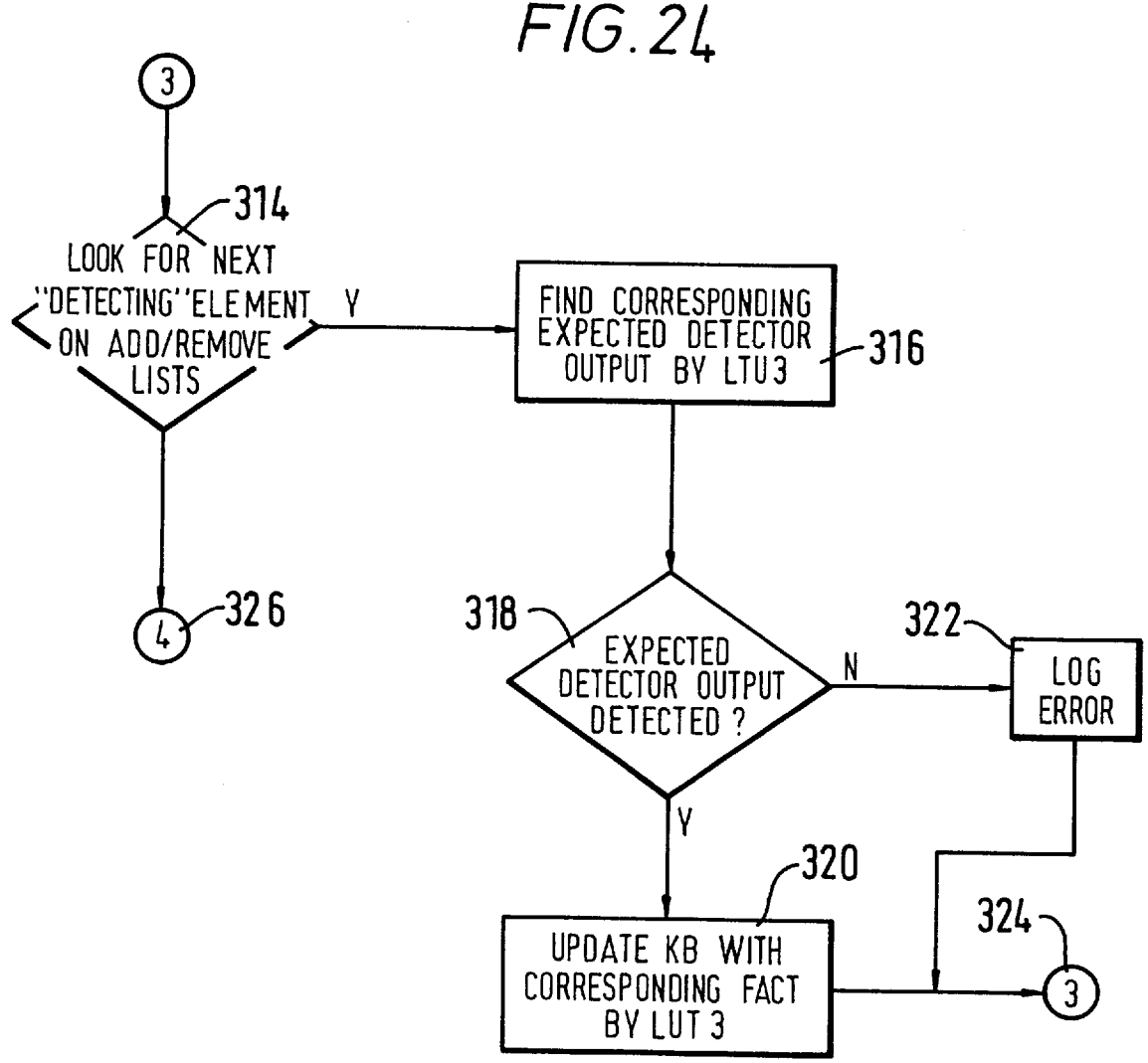

Figure 24, "LTU3" should read --LUT3--.

COLUMN 1

Line 10, "Infor-" should read --infor- --.

COLUMN 4

Line 11, "A4,2)" should read --(A4,2)--.
Line 45, "condition ie." should read --condition, i.e.--.

COLUMN 7

Line 16, "photocorrectly" should read --photocopier 10--.
Line 38, "(x)))" should read --(x))--.

COLUMN 12

Line 1, "recovery" should read --recovery- --.

UNITED STATES PATENT AND TRADEMARK OFFICE
CERTIFICATE OF CORRECTION

PATENT NO. : 5,812,994

DATED : September 22, 1998

INVENTOR(S) : WILLIAM GEORGE IMLAH

It is certified that error appears in the above-identified patent and that said Letters Patent is hereby corrected as shown below:

COLUMN 13

Line 42, "clear" should read --is clear--.

COLUMN 14

Line 15, "hypothesised" should read --hypothesise--.

COLUMN 20

Line 2, "hypothesised" should read --hypothesise--.

COLUMN 22

Line 4, "fact" should read --fact to--.

COLUMN 24

Line 32, "a includes a negative" should read --any particular time--.

COLUMN 25

Line 11, "solution being," should read --solution being found,--.
    Line 14, "to return" should read --return to--.
    Line 26, "return" should read --return to--.
    Line 62, "removed" should read --be removed--.

UNITED STATES PATENT AND TRADEMARK OFFICE
CERTIFICATE OF CORRECTION

PATENT NO. : 5,812,994

DATED : September 22, 1998

INVENTOR(S) : WILLIAM GEORGE IMLAH

Page 3 of 4

It is certified that error appears in the above-identified patent and that said Letters Patent is hereby corrected as shown below:

COLUMN 38

Line 40, "eg." should read --e.g.,--.

COLUMN 39

Line 65, "anfailurus" should read --and status--.

COLUMN 47

Line 25, "esised" should read --esise--.
Line 33, "hypothesised" should read --hypothesise--.
Line 37, "esised" should read --esise--.
Line 51, "ie." should read --i.e.,--.

COLUMN 48

Line 51, "ie." should read --i.e.,--.

COLUMN 51

Line 6, "hard wired" should read --hard-wired--.
Line 8, "hard wired" should read --hard-wired--.

UNITED STATES PATENT AND TRADEMARK OFFICE
CERTIFICATE OF CORRECTION

PATENT NO. : 5,812,994

DATED : September 22, 1998

INVENTOR(S) : WILLIAM GEORGE IMLAH

Page 4 of 4

It is certified that error appears in the above-identified patent and that said Letters Patent is hereby corrected as shown below:

COLUMN 137

Line 48, "according" should read --according to--.

COLUMN 143

Line 44, "base" (2nd occurrence) should read --data--.

This certificate supersedes Certificate of Correction issued July 20, 1999.

Signed and Sealed this

Seventh Day of September, 1999

Attest:

Q. TODD DICKINSON

Attesting Officer

Acting Commissioner of Patents and Trademarks